United States Patent
Mori et al.

(10) Patent No.: US 7,626,350 B2
(45) Date of Patent: Dec. 1, 2009

(54) MOTOR DRIVE APPARATUS AND MOTOR DRIVE METHOD

(75) Inventors: Hideaki Mori, Nishinomiya (JP); Yasunori Yamamoto, Hirakata (JP)

(73) Assignee: Panasonic Corporation, Osaka (JP)

( * ) Notice: Subject to any disclaimer, the term of this patent is extended or adjusted under 35 U.S.C. 154(b) by 759 days.

(21) Appl. No.: 11/220,006

(22) Filed: Sep. 6, 2005

(65) Prior Publication Data

US 2006/0055352 A1    Mar. 16, 2006

(30) Foreign Application Priority Data

Sep. 3, 2004    (JP)    ............................. 2004-256911
Aug. 5, 2005    (JP)    ............................. 2005-227816

(51) Int. Cl.
  *H02P 7/00*    (2006.01)
(52) U.S. Cl. ...................................... 318/432; 318/811
(58) Field of Classification Search .................. 318/432, 318/811
  See application file for complete search history.

(56) References Cited

U.S. PATENT DOCUMENTS 5,729,113 A * 3/1998 Jansen et al. ................. 318/799
6,400,107 B1 * 6/2002 Nakatani et al. ....... 318/400.21
6,512,343 B1 * 1/2003 Yasohara ..................... 318/437
7,151,354 B2 * 12/2006 Yoshinaga et al. .......... 318/611
2004/0104704 A1   6/2004 Hirono

FOREIGN PATENT DOCUMENTS

| CN | 1505255 A  | 6/2004 |
|----|------------|--------|
| JP | 7-245982   | 9/1995 |
| JP | 3424307    | 5/2003 |
| JP | 2004-187407| 7/2004 |

\* cited by examiner

*Primary Examiner*—Bentsu Ro
*Assistant Examiner*—Erick Glass
(74) *Attorney, Agent, or Firm*—RatnerPrestia

(57) ABSTRACT

A motor drive apparatus and motor drive method reduce vibration and acoustic noise by not requiring a non-activation period for rotor position detection, and enable stable, high efficiency motor drive. A control voltage generator generates a control voltage based on the frequency of the speed signal FG output from a speed detection unit, and the amplitude of the control voltage is controlled based on a torque control signal EC. The phase difference generator detects the phase difference between the control voltage and the zero cross signal of the motor current detected from the motor terminal voltages. A control voltage generator controls the phase of the control voltage so that the phase difference goes to zero, thus accomplishing sensor-less motor drive.

28 Claims, 42 Drawing Sheets

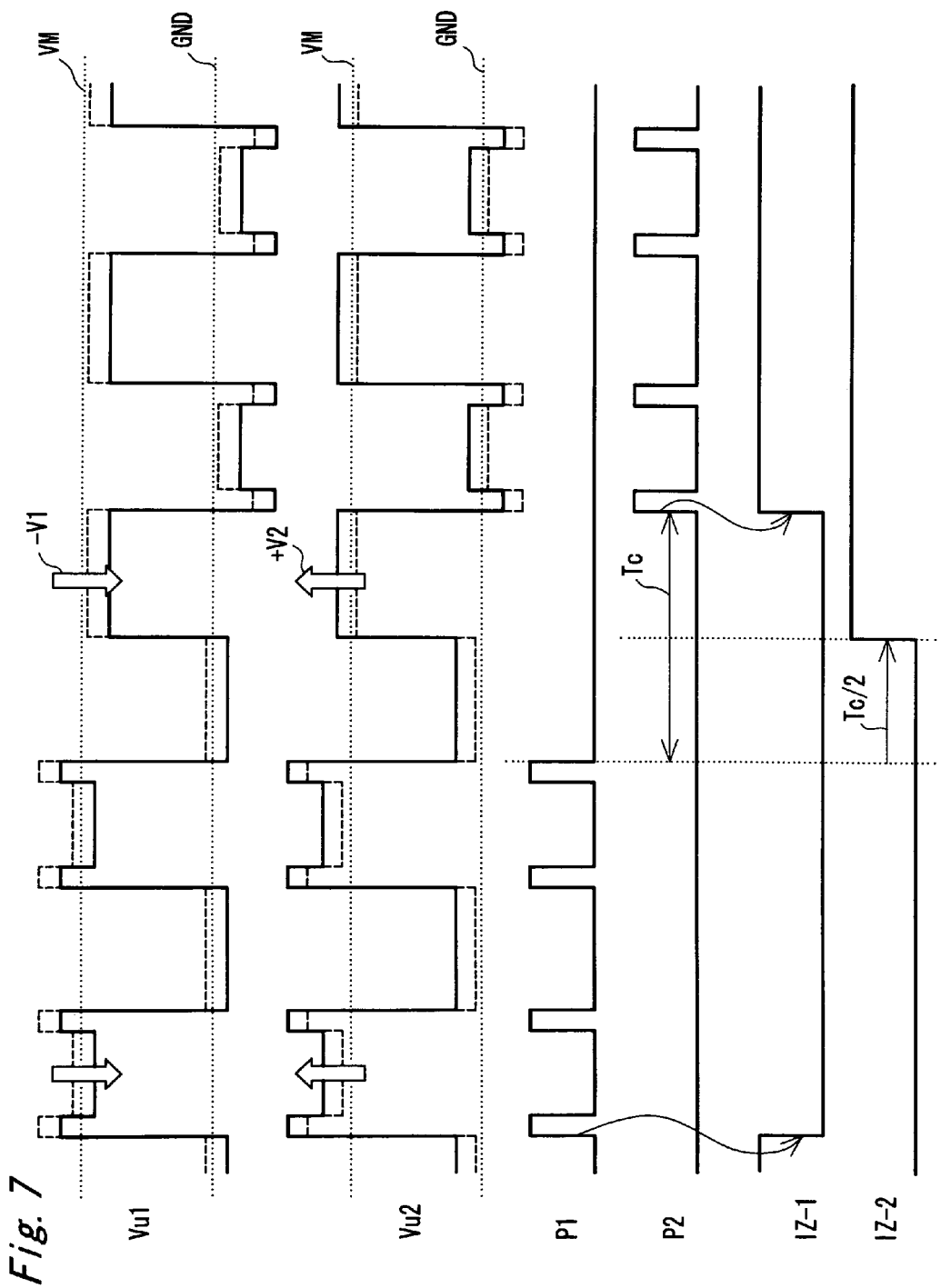

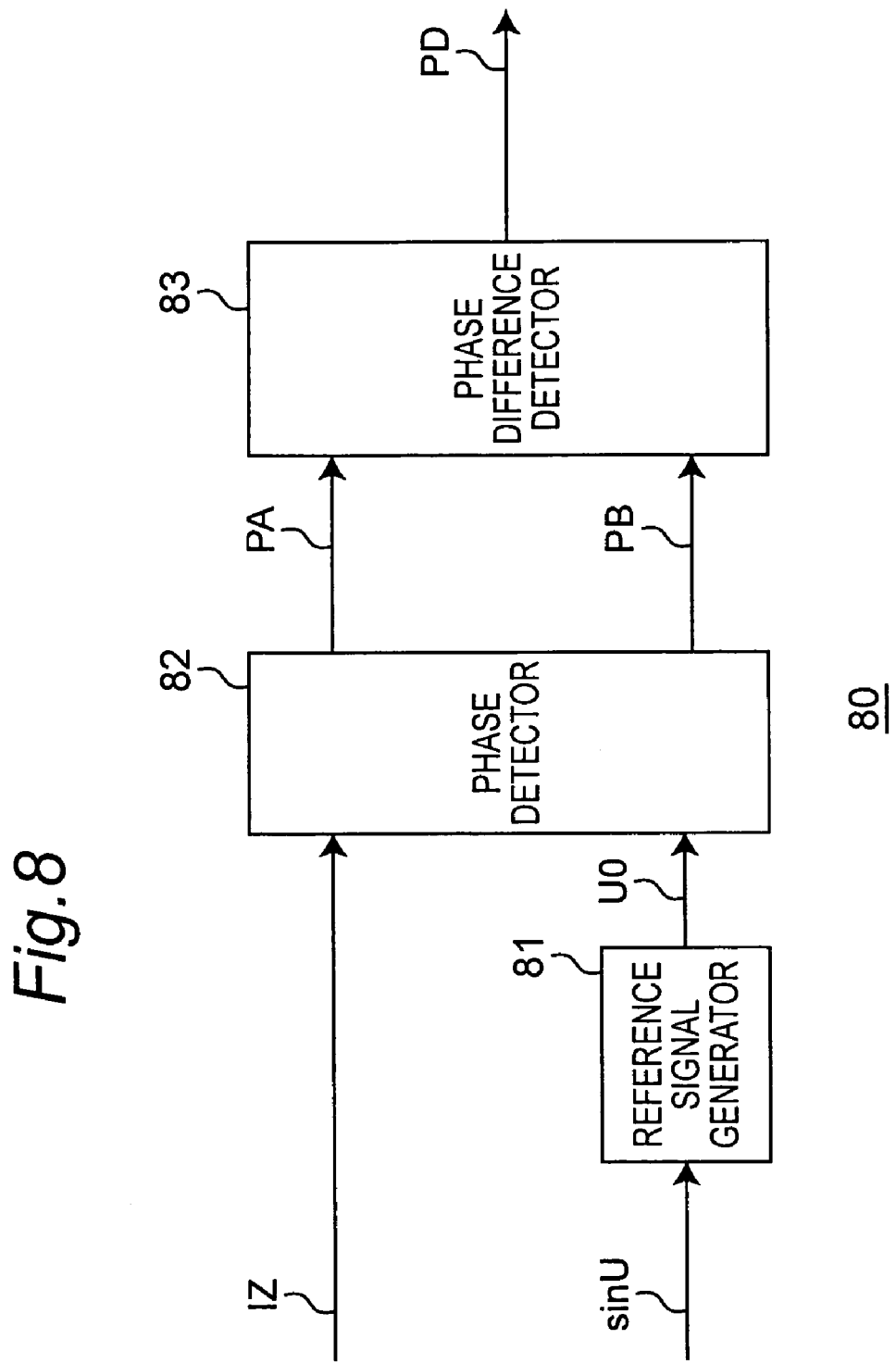

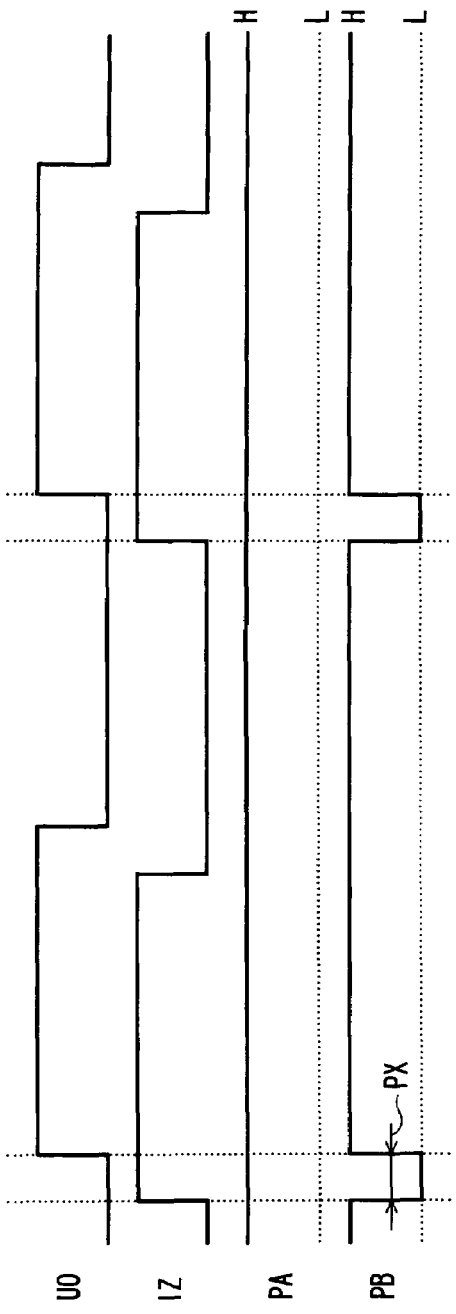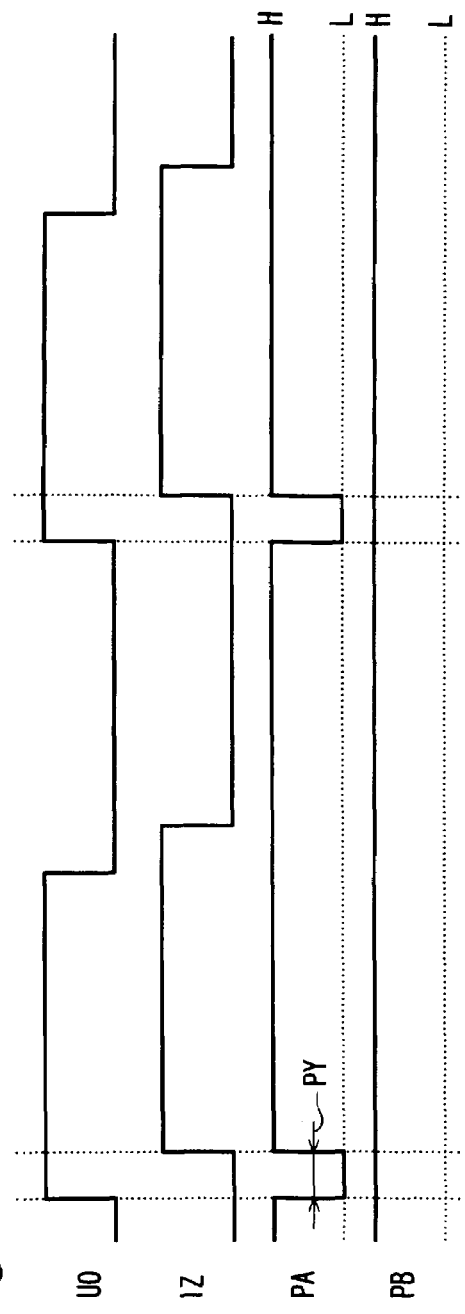

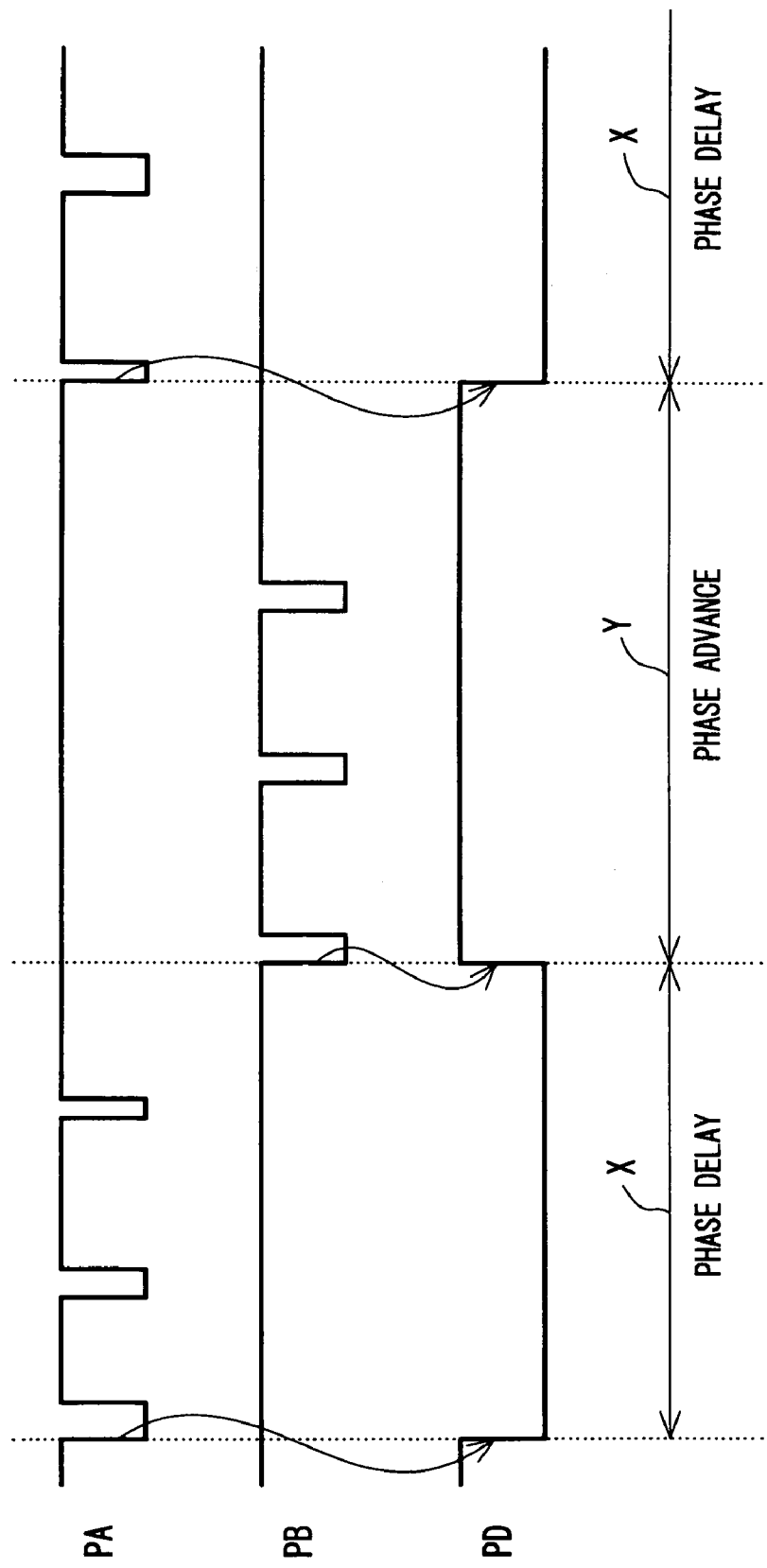

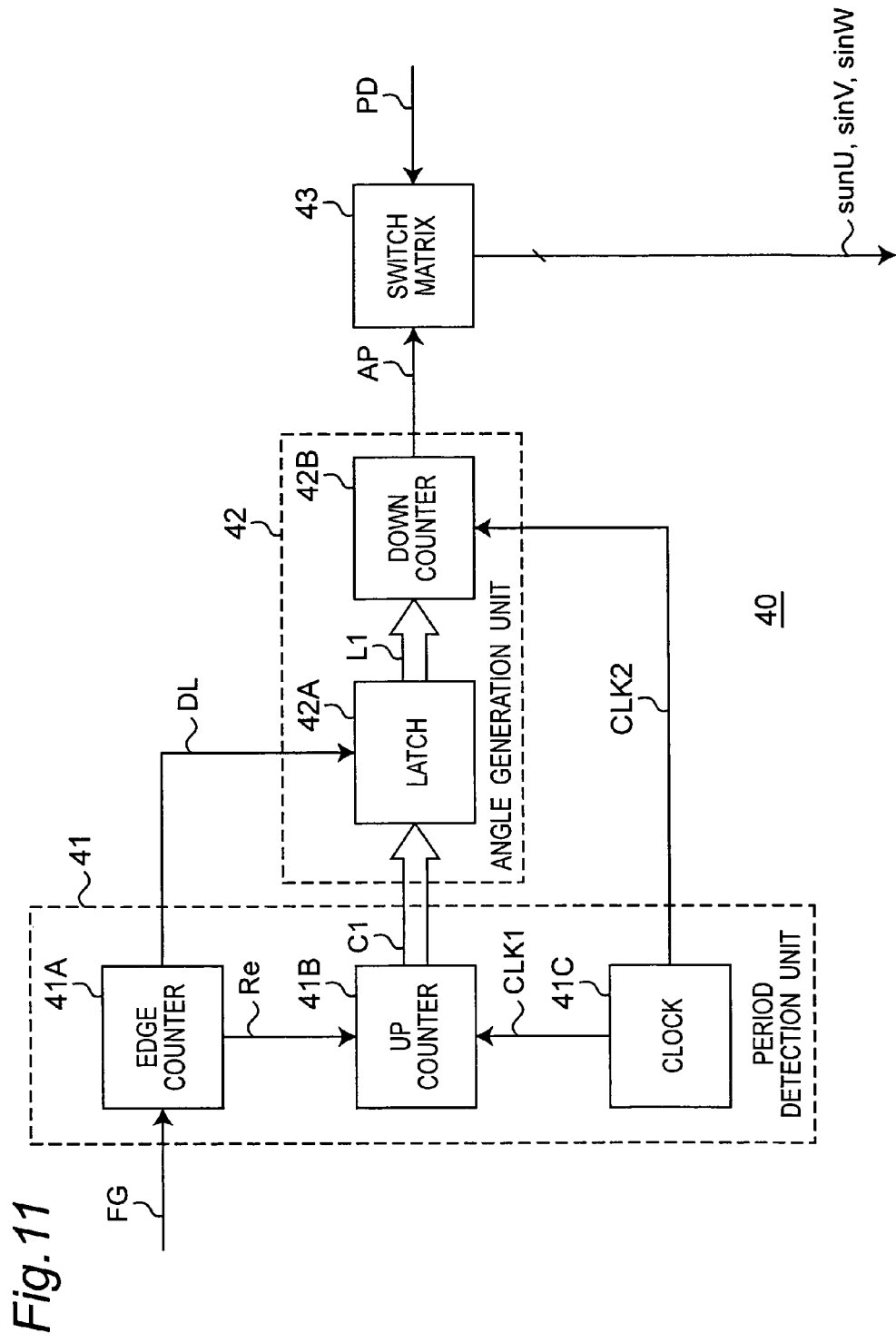

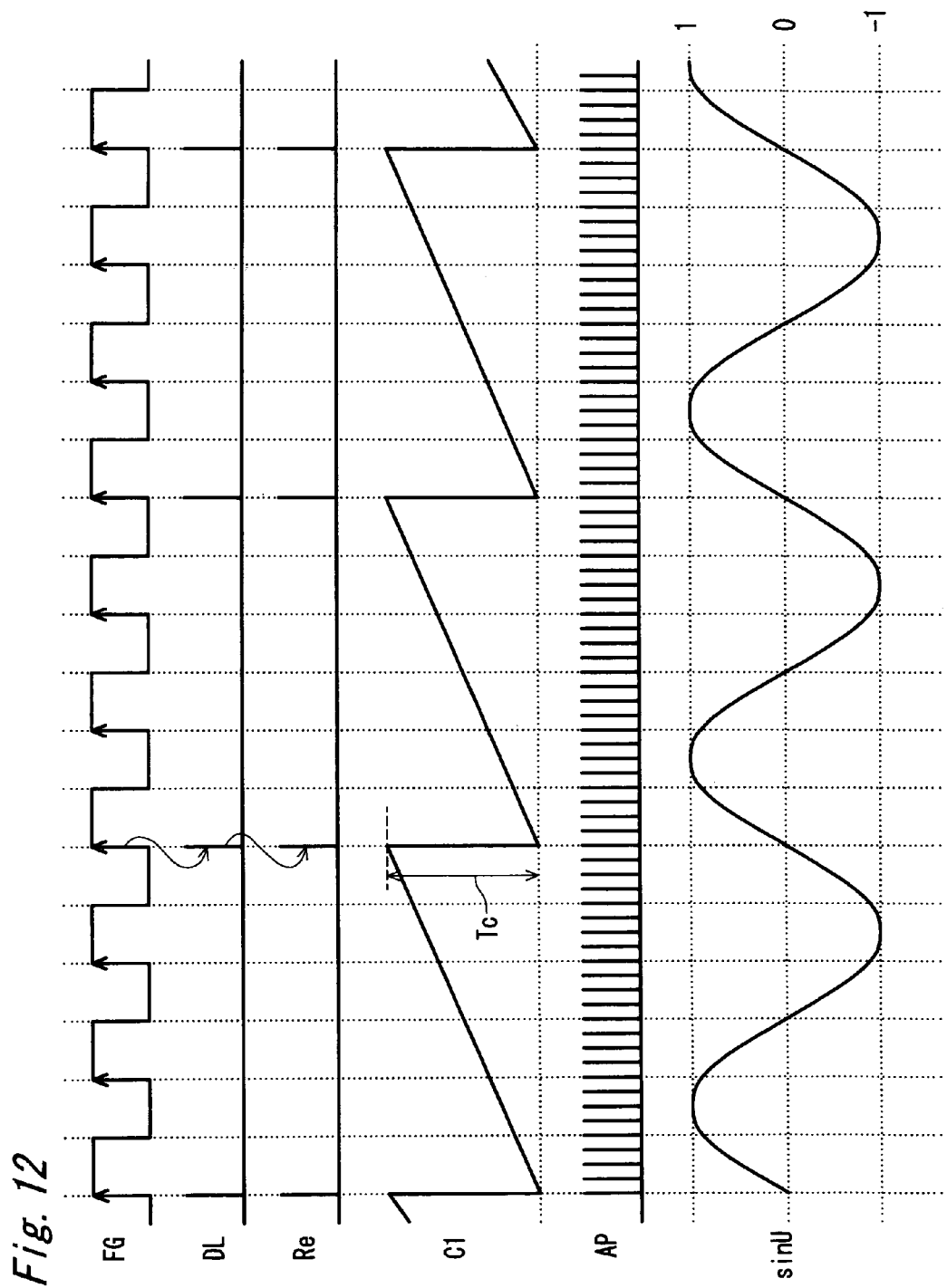

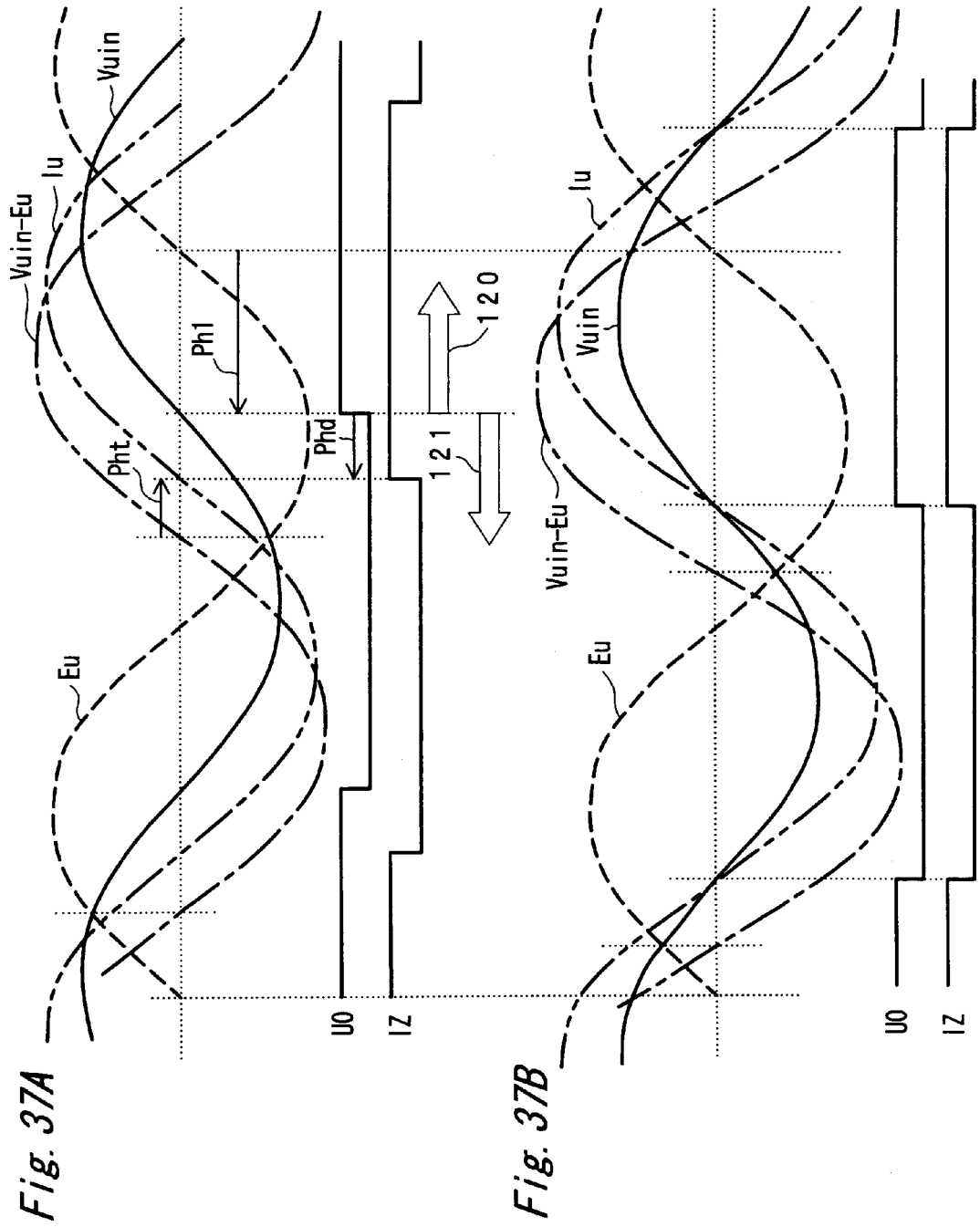

MOTOR DRIVE APPARATUS AND MOTOR DRIVE METHOD

BACKGROUND OF THE INVENTION

1. Field of Technology

The present invention relates to a sensor-less motor drive apparatus and motor drive method which do not require a non-activation period for rotor position detection.

2. Description of Related Art

Brushless motors are now generally used for the spindle motor in hard disk drive and optical disc drive devices, as well as for air conditioner fan motors and compressor drive motors. An inverter and PWM drive control are used to drive brushless motors in order to achieve variable speed control over a wide range of speeds and to reduce power consumption. Hall elements or other position sensors are normally disposed every 120 electrical degrees in a brushless motor with a three-phase winding in order to detect the magnetic pole position of the rotor. This brushless motor is substantially sinusoidal wave driven with the width of 180-degree activation using signals from these position sensors denoting the rotational position of the rotor.

Sensor-less drive technology has also been developed in order to reduce cost and size. One method of achieving sensor-less drive uses an energizing period of 120° or other angle less than 180°, and detects the zero cross of the induced voltage generated in the non-activation period. The presence of a non-activation period in this prior art method however, causes vibration at the activation changing timing and this vibration results in acoustic noise. Japanese Patent 3424307 addresses this problem and teaches motor drive control technology for detecting the rotor position without requiring a non-activation period for rotor position detection.

The content taught in Japanese Patent 3424307 is described briefly below with reference to FIG. 39 and FIG. 40. FIG. 39 is a block diagram showing the general configuration of a conventional motor drive apparatus. As shown in FIG. 39, this conventional motor drive apparatus has a power source $1p$, the motor $10p$ that is driven, a drive unit $20p$, a position detection unit $100p$, and a microprocessor $200p$.

The drive unit $20p$ has a three-phase bridge circuit with power transistors $21p$, $22p$, $23p$, $24p$, $25p$, $26p$ disposed between the power source $1p$ and ground GNDp, and switches according to an activation controlling signal from the microprocessor $200p$ to control driving the motor $10p$. The position detection unit $100p$ detects the third harmonic component contained in the induced voltage to detect the rotor position. This detection operation is described in further detail below. The detected position detection signal PSp is input to the microprocessor $200p$.

The microprocessor $200p$ generates an activation controlling signal used to control driving the power transistors $21p$ to $26p$ of the drive unit $20p$. More specifically, the microprocessor $200p$ generates a voltage pattern signal timed to the edge of the position detection signal PSp, and generates a control voltage according to the difference between a frequency acquired from the position detection signal PSp and the frequency of the frequency control signal Frp. The activation controlling signal is generated according to this voltage pattern signal and control voltage.

The foregoing motor drive apparatus can thus detect the rotor position without requiring a non-activation period for rotor position detection. This motor $10p$ enables sensor-less drive with the width of 180-degree activation.

The detection operation of the position detection unit loop is described in detail next with reference to the timing chart shown in FIG. 40.

The position detection unit $100p$ is composed of pseudo neutral point generator $90p$ having three resistors $91p$, $92p$, $93p$, a differential amplifier $101p$, an integrator $102p$, a lowpass filter $103p$, and a comparator $104p$. One end of each of the resistors $91p$, $92p$, $93p$ is connected to a common node, and the other end is respectively connected to the node between a corresponding three-phase winding Lup, Lvp, Lwp and the drive unit $20p$. The voltage produced at the common node is thus the pseudo neutral point voltage Vnp averaging the terminal voltages Vup, Vvp, Vwp of the motor $10p$.

The differential amplifier $101p$ differentially amplifies the neutral point voltage Vcp of the motor $10p$ and the pseudo neutral point voltage Vnp, and outputs difference signal Vdp. FIG. 40 shows the induced voltage Eup, Evp, Ewp occurring in phases U, V, W, and difference signal Vdp. The third harmonic component of the induced voltage can thus be detected as a result of the differential amplifier $101p$ differentially amplifying neutral point voltage Vcp and pseudo neutral point voltage Vnp, and the frequency of difference signal Vdp is three times the induced voltage frequency.

Difference signal Vdp is input to integrator $102p$ and integrated. The integrated signal Vdip output by the integrator $102p$ is shown in FIG. 40. As indicated by the offset component shown in FIG. 40, the cumulative offset is superimposed on the result of the integration operation. The integrated signal Vdip is then input to lowpass filter $103p$ and the DC component Vdilp is detected as shown in FIG. 40. The integrated signal Vdip output from the integrator $102p$ and the DC component Vdilp from the lowpass filter $103p$ are input to the comparator $104p$, which compares the effect of the DC component. More specifically, the normal zero cross of the integrated signal Vdip can thus be detected. This zero cross is denoted by the solid dots on the integrated signal Vdip in FIG. 40. The comparator $104p$ then outputs the result of this comparison to the microprocessor $200p$ as the position detection signal PSp shown in FIG. 40. The position detection unit $100p$ can thus detect the normal zero cross point by comparing the offset component superimposed during integration of the difference signal Vdp with the DC component acquired by the lowpass filter $103p$.

The motor drive apparatus according to the prior art described above thus detects the third harmonic component of the induced voltage by differentially amplifying the neutral point voltage Vcp of the motor and the pseudo neutral point voltage Vnp, and detecting the rotor position using an integrator $102p$, lowpass filter $103p$, and comparator $104p$. The microprocessor $200p$ also generates an activation controlling signal according to the detected rotor position, and provides sensor-less drive control of the motor $10p$ through drive unit $20p$.

The arrangement of the foregoing prior art leaves the following problems.

First, the method taught in Japanese Patent 3424307 enables position detection reflecting the offset component of the integrator $102p$, but the effect of this is little when the comparator $104p$ has an offset. Because the third harmonic is typically small, the effect of the offset component of the comparator $104p$ cannot be ignored as the position detection signal will contain significant position detection error.

Furthermore, if the frequency of the integrated signal Vdip is lower than the cutoff frequency of the lowpass filter when the DC component of the integrated signal Vdip is detected by the lowpass filter, it will not be possible to correctly detect the DC component. In this case, too, the position detection signal will contain significant position detection error.

If significant position detection error is contained in the position detection signal, error will also be introduced in the activation start timing of the activation controlling signal, and a loss of efficiency cannot be avoided. Furthermore, error in the activation start timing of the activation controlling signal increases as the position detection error increases, leading to such problems as motor undulations and loss of synchronization due to insufficient torque, and eventually to a loss of ability to provide sensor-less drive control.

It should be noted that because the zero cross of the induced voltage can be detected during the non-activation period when sensor-less drive control using a non-activation period for rotor position detection is applied, the foregoing method enables stable sensor-less drive control. A problem with this method, however, is that this non-activation period causes vibration when the activation changes, and this results in acoustic noise.

The present invention is directed to solving the foregoing problems and an object of this invention is to provide a motor drive apparatus and motor drive method whereby vibration and acoustic noise can be reduced and a motor can be stably driven with high efficiency by sensor-less drive that does not require a non-activation period for rotor position detection.

SUMMARY OF THE INVENTION

A motor drive apparatus according to a first aspect of the present invention drives an N phase (where N is an integer of 2 or more) motor by an N phase PWM drive signal, and has a speed detection unit for detecting the rotor speed of the N phase motor and outputting a speed signal containing a frequency component related to the rotor speed; a drive control signal generating unit operable to generate a drive control signal defined by phase, amplitude, and frequency; a drive signal generating unit operable to generate the PWM drive signal based on the drive control signal; a drive output unit for supplying power to the motor based on the PWM drive signal; a current-phase detection unit for detecting the phase of motor current flowing to the N phase motor; and a phase difference generating unit operable to generate a phase difference signal representing the phase difference between the phase of the motor current and the phase of the drive control signal. The drive control signal generating unit controls the phase of the drive control signal based on the speed signal and the phase difference signal.

A motor drive method according to another aspect of the invention drives an N phase (where N is an integer of 2 or more) motor by an N phase PWM drive signal, comprising: detecting the rotor speed of the N phase motor and outputting a speed signal containing a frequency component related to the rotor speed; generating a drive control signal defined by phase, amplitude, and frequency; generating the PWM drive signal based on the drive control signal; detecting the phase of a motor current flowing to the N phase motor; and generating a phase difference signal representing the phase difference between the phase of the motor current and the phase of the drive control signal; wherein the phase of the drive control signal is controlled based on the speed signal and the phase difference signal.

The motor drive apparatus and motor drive method of the present invention can thus reduce cost and size by sensor-less drive. Vibration and acoustic noise can also be reduced because a non-activation period is not required for rotor position detection. A loss of efficiency resulting from rotor position detection error, and undulations and loss of synchronization due to insufficient torque are also prevented, and high efficiency, stable motor drive is thus possible.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 is a timing chart describing the operation of the current-phase detection unit 70 shown in FIG. 6;

FIG. 8 is a block diagram showing the arrangement of the phase difference generator 80 in FIG. 1;

FIG. 9A is a timing chart describing the operation of the phase difference generator 80 shown in FIG. 8;

FIG. 9B is a timing chart describing the operation of the phase difference generator 80 shown in FIG. 8;

FIG. 10 is a timing chart describing the operation of the phase difference detector 83 shown in FIG. 8;

FIG. 11 is a block diagram showing the arrangement of the control voltage generator 40 in FIG. 1;

FIG. 12 is a timing chart describing the operation of the control voltage generator 40 shown in FIG. 11;

FIG. 37A is a timing chart describing the phase relationship of the control voltage and motor current during reverse braking;

FIG. 37B is a timing chart describing the phase relationship of the control voltage and motor current during reverse braking;

DETAILED DESCRIPTION OF THE PREFERRED EMBODIMENTS

Preferred embodiments of a motor drive apparatus and motor drive method according to the present invention are described below with reference to the accompanying figures. The motor that is controlled by this motor drive apparatus and motor drive method is an N phase (where N is an integer of 2 or more) with N phase windings. The embodiments described below use a value of N=3, but the invention shall not be so limited and can be applied to motors have a different number of phases. The numeric values used in the following embodiments are also used by way of example only for descriptive purposes, and the invention shall not be so limited.

Embodiment 1

Figure 1:
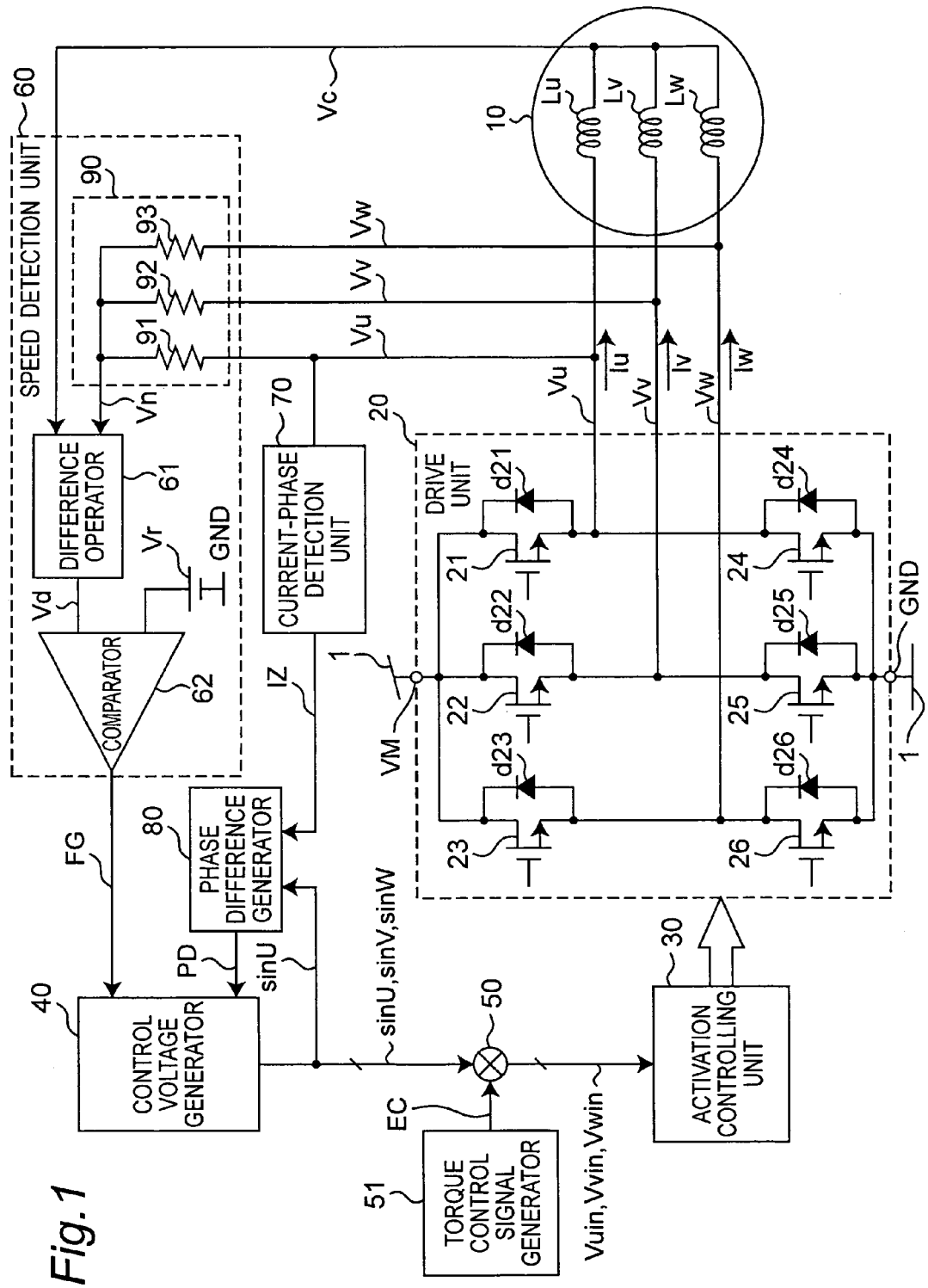
FIG. 1 is a block diagram of a motor drive apparatus and motor drive method enabling sensor-less drive according to the present invention.

A motor drive apparatus and motor drive method according to a first embodiment of the present invention are described below with reference to FIG. 1 to FIG. 16. FIG. 1 is a block diagram showing the arrangement of a motor drive apparatus according to this first embodiment. As shown in FIG. 1, a motor drive apparatus according to this first embodiment is composed of a power supply source 1, motor 10, drive unit 20, activation controlling unit 30, control voltage generator 40, multiplier 50, speed detection unit 60, current-phase detection unit 70, and phase difference generator 80.

The motor 10 which is driven by this motor drive apparatus is composed of a rotor with a field portion in the form of a permanent magnet not shown, and a stator having three-phase windings Lu, Lv, Lw in a Y connection. The drive unit 20 is arranged between terminal VM to which a specific high potential (supply voltage) is supplied from the power supply source 1, and the ground GND to which a specific low potential is supplied, and has a three-phase bridge circuit design with power transistors 21, 22, 23, 24, 25, 26. The power transistors 21 to 26 are switched according to PWM (pulse width modulation) pulses where the supply voltage is HIGH according to the activation controlling signal from the activation controlling unit 30, and drive the motor 10 by the switched PWM drive signal. The specified low potential is the ground potential in this embodiment of the invention, but any low potential capable of operating power transistors 21 to 26 can be used.

The control voltage generator 40 generates and outputs to the multiplier 50 three-phase sinusoidal signals sinU, sinV, sinW with a 120-degree phase difference at a frequency determined by speed signal FG from speed detection unit 60.

The multiplier 50 multiplies the three-phase sinusoidal signals sinU, sinV, sinW from the control voltage generator 40 and the torque control signal EC specifying the torque of motor 10, and outputs the result as control voltages Vuin, Vvin, Vwin to the activation controlling unit 30. The torque control signal EC is generated by torque control signal generator 51.

The activation controlling unit 30 pulse width modulates the control voltages Vuin, Vvin, Vwin output from multiplier 50, and thus generates the activation controlling signal. This activation controlling signal causes the power transistors 21 to 26 of the drive unit 20 to PWM switch pulses of which the supply voltage level is HIGH, and thus apply PWM drive signals to drive the motor 10.

The motor terminal voltages Vu, Vv, Vw of motor 10 and neutral point voltage Vc are input to speed detection unit 60, which generates and outputs to the control voltage generator 40 speed signal FG according to the rotor speed of the motor 10, that is, the rotational speed of the rotor.

Motor terminal voltage Vu is input to current-phase detection unit 70, which detects and outputs the zero cross of motor current Iu as current zero cross signal IZ to phase difference generator 80.

The current zero cross signal. IZ from current-phase detection unit 70 and U-phase sinusoidal signal sinU from control voltage generator 40 are input to the phase difference generator 80, which detects and outputs the phase difference between the two input signals as phase difference signal PD to control voltage generator 40.

Based on this phase difference signal PD, control voltage generator 40 controls the phase of the three-phase sinusoidal signals sinU, sinV, sinW. The detailed operation is further described below.

The control voltage generator 40, multiplier 50, and torque control signal generator 51 together constitute a drive control signal generator. The three-phase sinusoidal signals sinU, sinV, sinW and control voltages Vuin, Vvin, Vwin all denote drive control signals. The drive control signals in the output from control voltage generator 40 are the three-phase sinusoidal signals sinU, sinV, sinW, and the drive control signals in the multiplier 50 output are control voltages Vuin, Vvin, Vwin. By thus generating the drive control signals, the phase, amplitude, and frequency of the drive control signals are determined by the drive control signal generating unit.

The activation controlling unit 30 constitutes a drive signal generator, and the drive signal generator generates the PWM drive signal based on the drive control signals.

The drive unit 20 constitutes a drive output unit that supplies power to the motor according to the PWM drive signal.

The operation of the various parts of this first embodiment of the invention is described in detail below.

The drive unit 20 has six power transistors 21 to 26 in a bridge connection with a power diode d21, d22, d23, d24, d25, d26 inverse-parallel connected to each power transistors 21 to 26. Power transistors 21 and 24 are series connected with one end of winding Lu connected to the connection node. Power transistors 22 and 25 are series connected with one end of winding Lv connected to the connection node. Power transistors 23 and 26 are series connected with one end of winding Lw connected to the connection node. Each of the power transistors 21 to 26 switches according to the activation controlling signal output from activation controlling unit 30, and supply power from terminal VM to the three-phase windings Lu, Lv, Lw of motor 10.

The power transistors 21 to 26 of the drive unit 20 could be n-channel field effect transistors (FETs). Alternatively, the power transistors 21 to 23 on the upper arm could be p-channel FETs and the power transistors 24 to 25 on the lower arm could be n-channel FETs. Bipolar Junction Transistors (BJT) or Insulated Gate Bipolar Transistors (IGBT) could alternatively be used. The power diodes d21 to d26 can be parasitic diodes that are structurally dependent on the power transistors 21 to 26.

The multiplier 50 multiplies the three-phase sinusoidal signals sinU, sinV, sinW output from control voltage generator 40 with the torque control signal EC, and outputs the result as control voltages Vuin, Vvin, Vwin to activation controlling unit 30. The control voltages Vuin, Vvin, Vwin are thus three-phase sinusoidal signals with amplitude determined according to the torque control signal EC.

Figure 2:
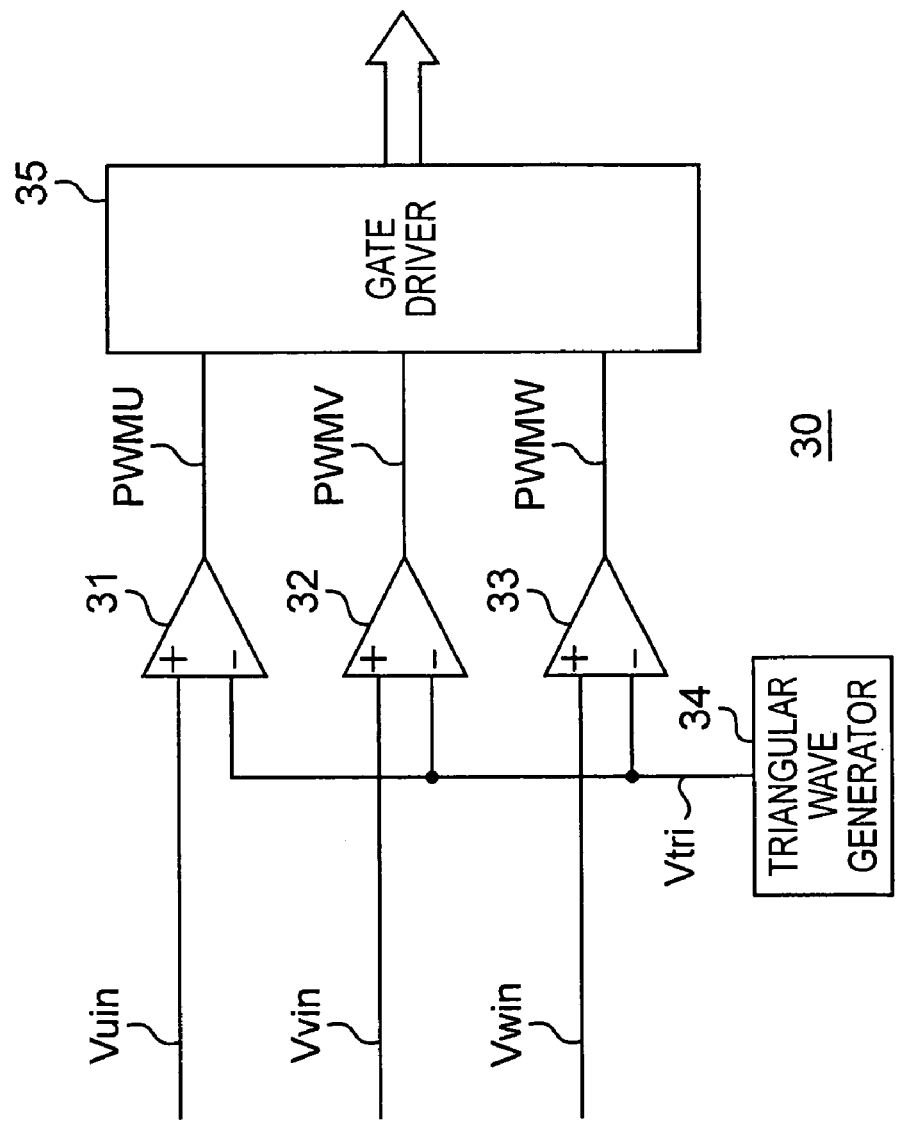
FIG. 2 is a block diagram of the activation controlling unit 30 shown in FIG. 1.

FIG. 2 is a block diagram showing the specific arrangement of the activation controlling unit 30.

Activation controlling unit 30 pulse width modulates the control voltages Vuin, Vvin, Vwin from multiplier 50, and generates the activation controlling signal for drive control of the power transistors 21 to 26 in drive unit 20. The activation controlling unit 30 has three comparators 31, 32, 33, a triangular wave generator 34, and gate driver 35.

The triangular wave generator 34 outputs a high frequency (approximately 20 kHz to approximately 200 kHz) triangular wave signal Vtri to the input of each of the three comparators 31, 32, 33. The control voltages Vuin, Vvin, Vwin from the multiplier 50 are input to the other input of comparators 31, 32, 33, respectively.

The comparators 31, 32, 33 thus compare control voltages Vuin, Vvin, Vwin with triangular wave signal Vtri, and output pulse signals PWMU, PWMV, PWMW with a duty ratio determined by the amplitude of control voltages Vuin, Vvin, Vwin.

The gate driver 35 generates the activation controlling signal for drive control of the power transistors 21 to 26 in drive unit 20 according to the pulse signals PWMU, PWMV, PWMW from the comparators 31, 32, 33.

The motor terminal voltages Vu, Vv, Vw of motor 10 and neutral point voltage Vc are input to speed detection unit 60, which generates and outputs to the control voltage generator 40 speed signal FG containing a frequency component related to the rotational speed of the rotor.

The speed detection unit 60 is composed a pseudo neutral point generator 90, which is composed of three resistors 91, 92, 93, a difference operator 61, comparator 62, and reference voltage Vr.

The three resistors 91, 92, 93 each have the same resistance, have one end connected to a common node, and the other end connected to the node between the three windings Lu, Lv, Lw and drive unit 20, respectively. The voltage produced at the common node is thus the pseudo neutral point voltage Vn that is the average of the motor terminal voltages Vu, Vv, Vw of the motor 10.

The difference operator 61 is a differential amplifier circuit, for example. The neutral point voltage Vc of the motor 10 and the pseudo neutral point voltage Vn output from pseudo neutral point generator 90 are input to the difference operator 61, which then amplifies the difference between the voltages and outputs the result as difference signal Vd to comparator 62.

The reference voltage Vr is input to the other input to comparator 62, which thus compares difference signal Vd and reference voltage Vr. The result is output as speed signal FG to control voltage generator 40.

The difference operator 61 and comparator 62 thus constitute a neutral point comparison unit.

Figure 3:
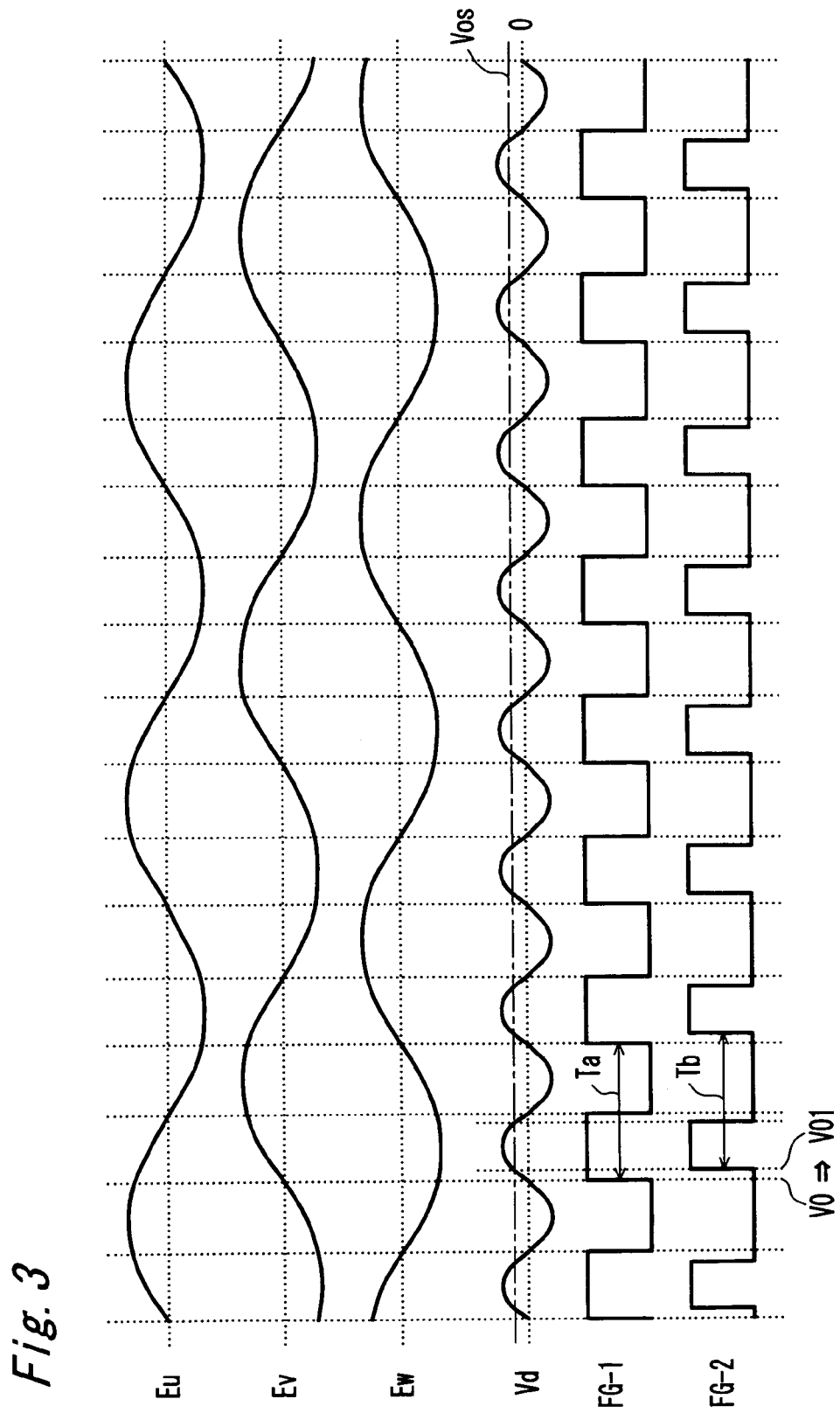
FIG. 3 is a timing chart describing the operation of the speed detection unit 60 shown in FIG. 1.

The operation of the component parts of the speed detection unit 60 is described next with reference to the timing chart shown in FIG. 3. Signals Eu, Ev, Ew in FIG. 3 denote the induced voltage produced at phase U, phase V, and phase W. The induced voltage waveforms are sinusoidal waves in FIG. 3, but are actually waves with a harmonic component. Signal Vd is the difference signal Vd output from difference operator 61. In general, the 3×K harmonic component (where K is an integer) contained in the induced voltage appears in the difference signal of the motor's neutral point voltage and pseudo neutral point voltage. The difference signal Vd shown in FIG. 3 shows the waveform when K is 1. The frequency of difference signal Vd is therefore three times the frequency of the induced voltage, and the amplitude is equal to the gain of the difference operator 61 times the voltage equivalent to M % of the induced voltage amplitude where M % is the percentage content of the third harmonic component.

The comparator 62 compared difference signal Vd and reference voltage Vr, and outputs speed signal FG. FIG. 3 shows two output signal FG in two possible states. Output signal FG-1 is the result of comparison with reference voltage Vr=0. As will be known from the figure, the result is a pulse signal with a 50% duty and the edge of each pulse matching the zero cross timing of the induced voltage Eu, Ev, Ew at each phase. However, if the comparator 62 has a positive offset Vos, the output will be as indicated by signal FG-2 in FIG. 3, that is, a pulse signal with a duty ratio other than 50%. Each pulse edge is also offset significantly from the zero cross timing V0 of each phase induced voltage Eu, Ev, Ew to V01. As a result, position detection error caused by the offset of the comparator 62 is contained in the position detection signal when using the comparator output as a position detection signal for sensor-less drive, and high efficiency driving is not possible.

The amplitude of difference signal Vd also depends upon the amplitude of the induced voltage and the speed of the rotor, and the amplitude is low when the rotor is turning at a low speed. The effect of position detection error caused by the comparator 62 offset is thus increased. The amplitude is increased by increasing the gain of the difference operator 61, but the effect of the difference operator 61 offset is also increased and, as a result, the effect of position detection error is also increased.

With the speed detection unit 60 of this first embodiment, however, the output signal of the comparator 62 is used as speed signal FG and not as the position detection signal. That is, position information is not acquired and only speed information is acquired from the output signal of the comparator 62. The speed information is the same regardless of any offset there may be in the comparator 62, as will be known from the equal time interval (Ta=Tb) between the rising edge of each pulse in signals FG-1 and FG-2 in FIG. 3. The speed detection unit 60 in this first embodiment of the invention thus detects only frequency, that is, period, from the rotor speed.

Note that reference voltage Vr is described as Vr=0 above, but reference voltage Vr can be set as desired to any value whereby the sum of reference voltage Vr and the offset voltage Vos of the comparator 62 is low relative to the amplitude of the difference signal Vd.

Furthermore, because PWM drive is used in this first embodiment of the invention, switching noise from PWM drive is imposed on the difference signal Vd, and this could result in the output from comparator 62 being unstable. A lowpass filter could therefore be inserted after the difference operator 61 to avoid the effects of this switching noise.

Furthermore, the speed detection unit 60 in this first embodiment of the invention could be arranged to detect speed signal FG by directly comparing neutral point voltage Vc and pseudo neutral point voltage Vn. In this case the difference operator 61 and reference voltage Vr are not needed, and the speed detection unit 60 can be more simply constructed. To avoid the effects of switching noise from PWM drive in this case, a masking processor could be provided to apply a masking process to the comparator output before and after the switching timing and output the result as speed signal FG.

Other arrangements for detecting the rotor speed (speed signal FG) using neutral point voltage Vc and pseudo neutral point voltage Vn are also possible.

Yet further, the speed detection unit 60 could be constructed with a speed sensor for detecting the rotor speed, and output the speed information from the speed sensor as the speed signal.

Motor terminal voltage Vu of motor 10 is input to current-phase detection unit 70, which detects and outputs the zero cross of motor current Iu as current zero cross signal IZ to phase difference generator 80. In this first embodiment of the invention the zero cross timing of the motor current is detected from the motor terminal voltage. Why the zero cross timing of the motor current is detected from the motor terminal voltage is described below with reference to FIG. 4, FIG. 5, and FIG. 6.

Figure 4:
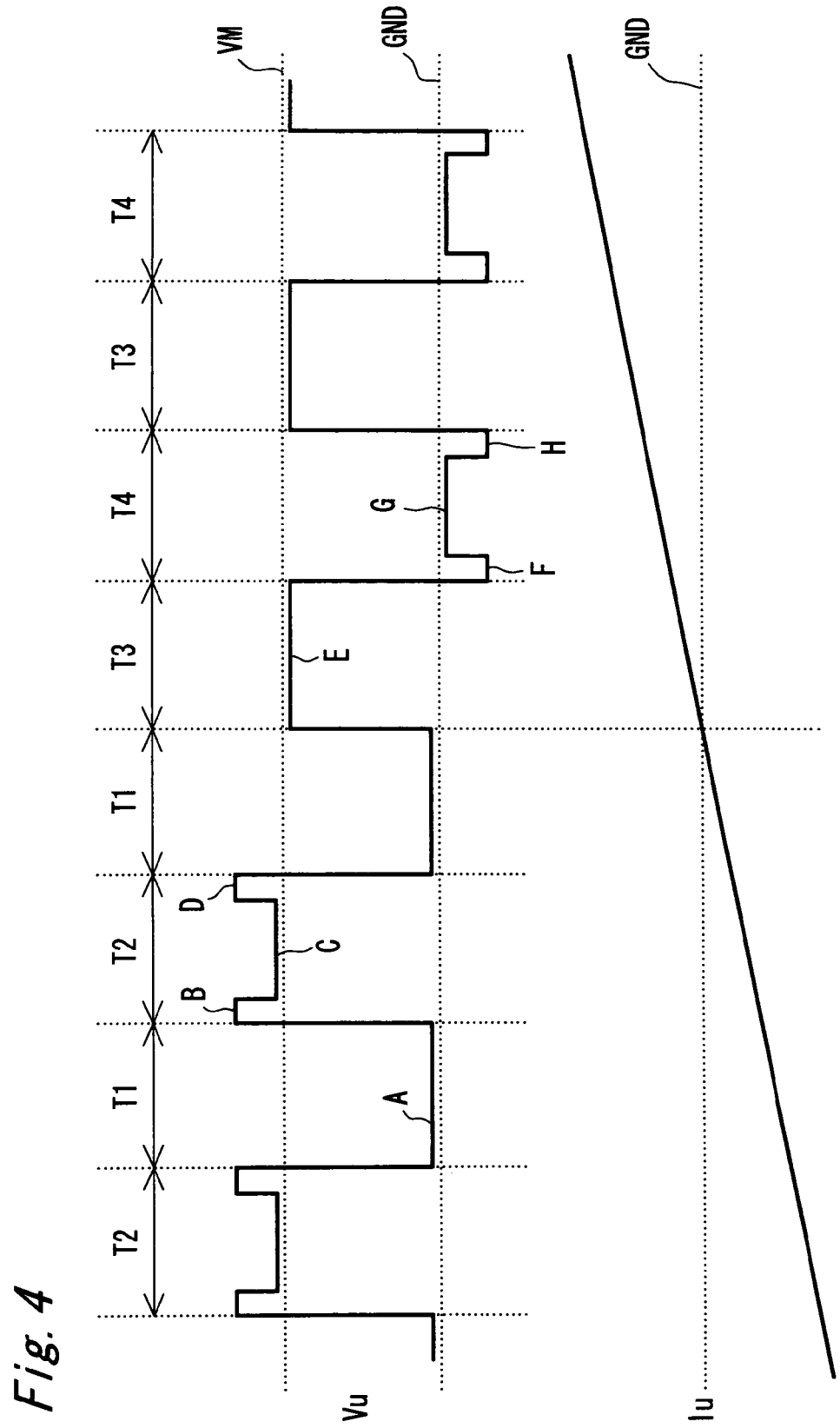
FIG. 4 describes the operation of the current-phase detection unit 70 in FIG. 1.
Figure 5A:
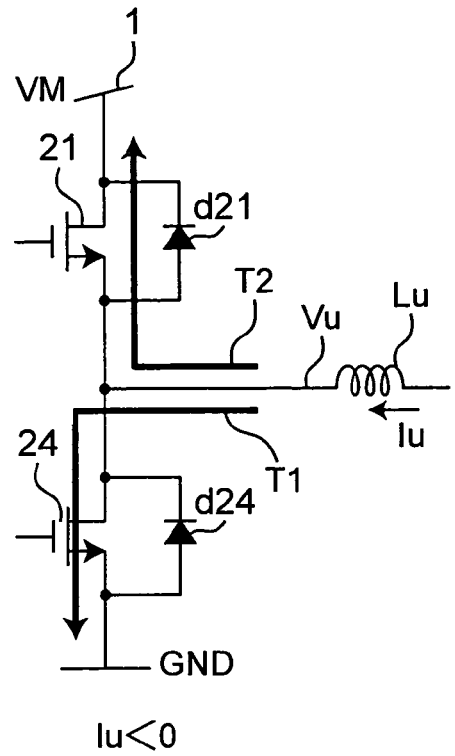
FIG. 5A describes the operation of the current-phase detection unit 70 in FIG. 1.

FIG. 4 shows the relationship between motor current Iu and motor terminal voltage Vu when motor current Iu goes from negative to positive. FIG. 5A describes operation when motor current Iu flows in the negative direction, that is, when motor current flows from motor 10 to drive unit 20, and FIG. 5B describes operation when motor current Iu flows in the positive direction, that is, when motor current flow from drive unit 20 to motor 10. The U phase portion of the drive unit 20 is extracted and shown in FIG. 5A and FIG. 5B.

Figure 5B:
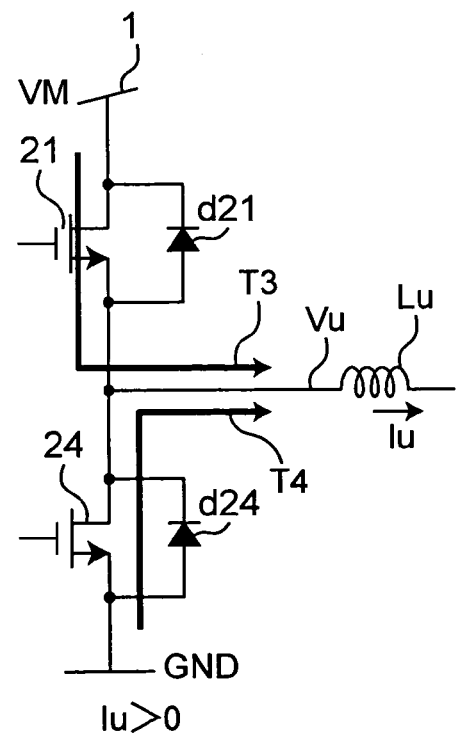
FIG. 5B describes the operation of the current-phase detection unit 70 in FIG. 1.

As shown in FIG. 5A and FIG. 5B, there are two operating states T1 and T2 when motor current Iu flows negatively, and there are two operating states T3 and T4 when motor current Iu flows positively. These states T1, T2, T3, T4 correspond to the states identified by the same reference numbers in FIG. 4. In state T1 the motor current flow from winding Lu through power transistor 24 and ground GND to power supply source 1. As shown by A in FIG. 4, the motor terminal voltage Vu at this time is low and substantially equal to the ground potential (GND). More accurately, a voltage determined by product of the ON resistance of power transistor 24 and motor current Iu appears on the positive side of the ground potential (GND).

When PWM operation causes power transistor 24 to turn off, the motor current flowing through winding Lu passes power diode d21 and terminal VM and is regenerated to power supply source 1 (state T2). The motor terminal voltage Vu at this time is the supply voltage plus the forward diode voltage of power diode d21 (B and D in FIG. 4). Synchronous rectification is performed in this first embodiment (C in FIG. 4), and motor terminal voltage Vu at this time is high, substantially equal to the supply voltage. More specifically, motor terminal voltage Vu goes to the voltage drop determined by the product of the ON resistance of power transistor 21 and motor current Iu added to the supply voltage.

In state T3 the motor current flows from terminal VM through 21 to winding Lu, and the motor terminal voltage Vu at this time is high, substantially equal to the supply voltage as shown by E in FIG. 4. More specifically, motor terminal voltage Vu goes to a high level equal to the voltage drop determined by the product of the ON resistance of power transistor 21 and motor current Iu subtracted from the supply voltage.

When PWM operation causes power transistor 21 to turn off, the motor current flowing through winding Lu is supplied from ground GND through power diode d24 to winding Lu (T4). The motor terminal voltage Vu at this time is the voltage equal to the ground potential (GND) minus the forward diode voltage of power diode d24 (F and H in FIG. 4). Synchronous rectification (G in FIG. 4) causes motor terminal voltage Vu to go to a low level substantially equal to the ground potential at this time. More specifically, the motor terminal voltage Vu appears on the negative side of the ground potential due to the voltage drop determined by the product of the ON resistance of power transistor 24 and motor current Iu.

The motor terminal voltage Vu waveform thus differs according to the polarity of motor current Iu. That is, the polarity of the motor current Iu, that is, the zero cross, can be detected by detecting the portion (B, C, D) where the motor terminal voltage Vu is greater than the supply voltage and the portion (F, G, H) where the motor terminal voltage Vu is less than the ground potential.

Figure 6:
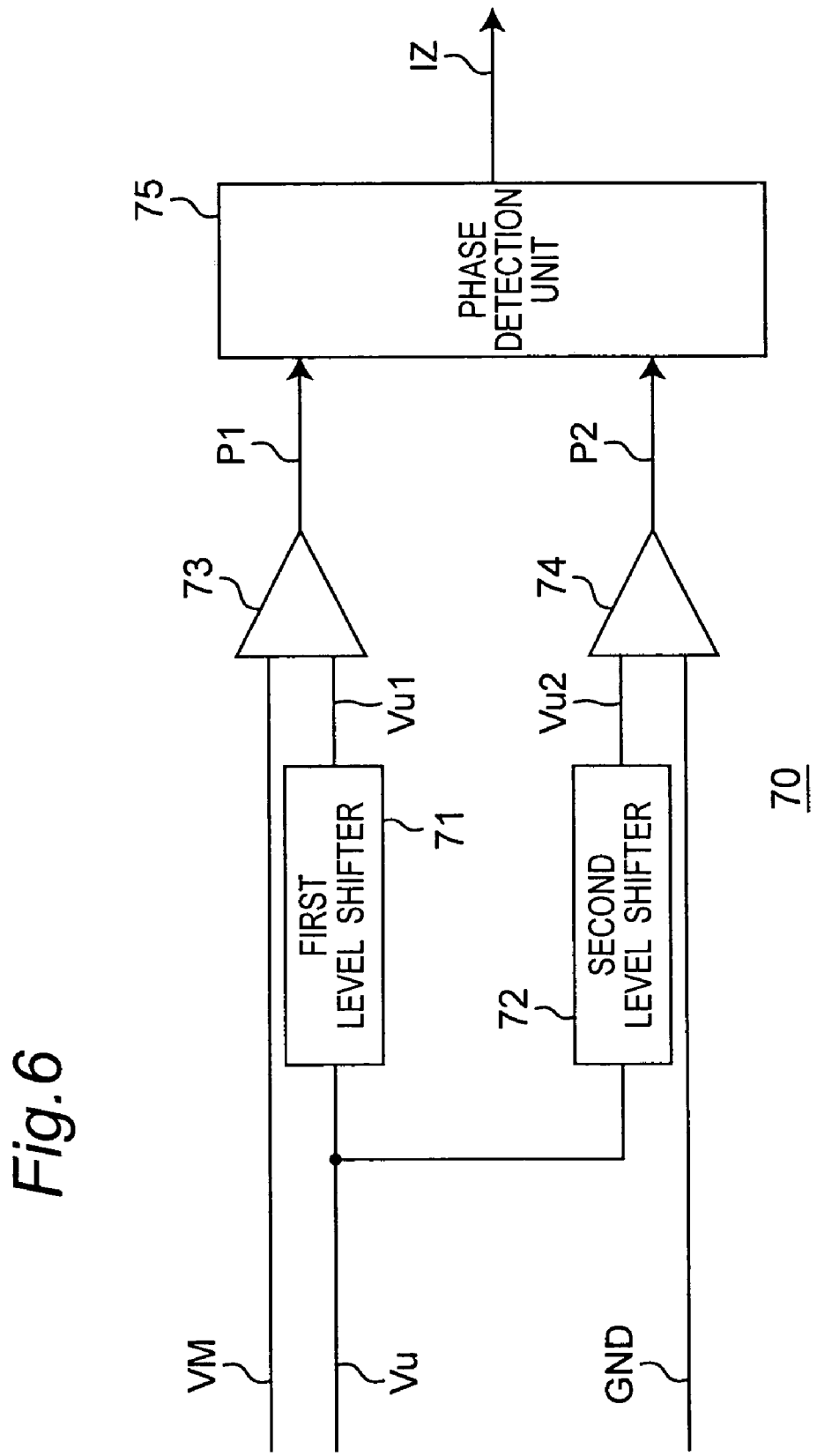
FIG. 6 is a block diagram showing the arrangement of the current-phase detection unit 70 shown in FIG. 1.

FIG. 6 is a block diagram showing the specific arrangement of the current-phase detection unit 70. As shown in FIG. 6 the current-phase detection unit 70 is composed of a first level shifter 71, second level shifter 72, comparators 73 and 74, and phase detection unit 75. FIG. 7 is a timing chart describing operation of the current-phase detection unit 70.

The U phase motor terminal voltage Vu is input to first level shifter 71 and second level shifter 72. As shown by voltage Vu1 in FIG. 7, first level shifter 71 negative shifts the U phase motor terminal voltage Vu by first offset level V1, and outputs the result as first level shifted voltage Vu1 to comparator 73.

The second level shifter 72 positive shifts U phase motor terminal voltage Vu by second offset level V2 as indicated by voltage Vu2 in FIG. 7, and outputs the result as second level shifted voltage Vu2 to comparator 74. Note that first offset level V1 and second offset level V2 are set to the same voltage (V1=V2) in this embodiment, and more specifically to a level enabling detection of the forward diode voltage of the power diode.

Comparator 73 compares first level shifted voltage Vu1 and the supply voltage of terminal VM, and outputs pulse signal P1. Comparator 74 compares second level shifted voltage Vu2 with the ground potential, and outputs pulse signal P2.

The phase detection unit 75 latches pulse signals P1 and P2 as reset/set signals to output current zero cross signal IZ. IZ-1 in FIG. 7 denotes one state of this current zero cross signal IZ.

Because this current zero cross signal IZ-1 can only be detected at the PWM frequency, however, it differs from the zero cross timing of the actual motor current Iu. Period Tc in FIG. 7 therefore increases when the PWM frequency is low and when the value of motor current Iu is low. More specifically, the error between current zero cross signal IZ-1 and the actual zero cross increases. To avoid this, a circuit for measuring period Tc can be provided to output current zero cross signal IZ-2 with an edge at half the measured time (Tc/2).

As described above, the current-phase detection unit 70 detects the zero cross timing of motor current Iu using motor terminal voltage Vu in this embodiment of the invention. The invention shall not be so limited, however, and arrangements in which the zero cross timing of the motor current Iv is detected using motor terminal voltage Vv, or in which the zero cross timing of motor current Iw using motor terminal voltage Vw, could be used. Further alternatively, instead of detecting the zero cross timing of just one phase, the zero cross timing of the motor current Iu, Iv, Iw for two or three phases could be detected using the motor terminal voltage Vu, Vv, Vw for two or three phases. Thus detecting the zero cross timing of the current for two or three phases instead of just one phase can improve the precision of phase control as described below.

Furthermore, if the comparators 73 and 74 are designed with a predetermined offset, the first level shifter 71 and second level shifter 72 can be omitted, thus affording a simpler construction.

Alternatively, comparator 73 could be arranged to compare motor terminal voltage Vu with the sum of the supply voltage (VM) plus first offset level V1, and comparator 74 could be arranged to compare the motor terminal voltage Vu with the difference of the ground potential (GND) minus second offset level V2.

FIG. 8 is a block diagram showing the specific arrangement of the phase difference generator 80. The phase difference generator 80 detects the phase difference between the current zero cross signal IZ from current-phase detection unit 70 and the U-phase sinusoidal signal sinU from the control voltage generator 40, and outputs the result as phase difference signal PD to control voltage generator 40.

As shown in FIG. 8, the phase difference generator 80 has a reference signal generator 81, phase detector 82, and phase difference detector 83. The operation of the phase difference generator 80 is described next with reference to the timing chart in FIG. 9A and FIG. 9B.

The U-phase sinusoidal signal sinU from control voltage generator 40 is input to the reference signal generator 81, which outputs reference signal U0 with an edge at the zero cross of the U-phase sinusoidal signal sinU.

This reference signal U0 and the current zero cross signal IZ from current-phase detection unit 70 are input to the phase detector 82, which detects the phase difference between the two input signals. For example, the phase detector 82 could be a feedback flip-flop circuit. More specifically, the reference signal U0 and current zero cross signal IZ are input to the clock input of two D flip-flops of which the D terminal is set HIGH, and the NOT-OR of the inverted outputs is fed back to the respective clear terminals to acquire the non-inverted output of the two D flip-flops denoting the phase difference.

As shown in FIG. 9A, if the current zero cross signal IZ is advanced PX to the reference signal U0, pulse signal PB outputs low at a phase advance of PX to the rising edge of the current zero cross signal IZ. Pulse signal PA thus outputs high. Conversely as shown in FIG. 9B, if the current zero cross signal IZ is delayed PY from reference signal U0, pulse signal PA outputs low at a phase delay of PY to the rising edge of reference signal U0. Pulse signal PB thus outputs high.

As a result, the phase detector 82 detects the phase advance or delay of the current zero cross signal IZ to the reference signal U0.

As a result, if the phase of current zero cross signal IZ to the reference signal U0 is advanced, phase detector 82 outputs a low pulse signal PB for a period equal to the phase advance. If the phase is delayed, the phase detector 82 outputs a low pulse signal PA for a period equal to the phase delay.

The phase difference detector 83 detects a phase advance or delay by determining whether a pulse of pulse signal PA or PB is output, and outputs the result as phase difference signal PD to control voltage generator 40. FIG. 10 is a timing chart showing the operation of the phase difference detector 83.

The phase difference detector 83 generates phase difference signal PD by using pulse signals PA, PB as a reset signal and set signal. That is, if pulse signal PA is output, phase difference signal PD goes low, and if pulse signal PB is output, phase difference signal PD goes high. When the phase difference signal PD is low (period X in FIG. 10), the phase of the current zero cross signal IZ is delayed with respect to reference signal U0, and when the phase difference signal PD is high (period Y in FIG. 10) the phase of the current zero cross signal IZ is advanced relative to the reference signal U0. The phase difference signal PD thus outputs a binary signal (phase advance or phase delay) that does not contain information about the absolute value of the phase difference.

The arrangement of the phase difference generator 80 shall not be limited to the foregoing, however, and could be arranged in many ways to detect the phase advance or phase delay.

FIG. 11 is a block diagram of the control voltage generator 40. The control voltage generator 40 generates and outputs to the multiplier 50 three-phase sinusoidal signals sinU, sinV, sinW with a 120-degree phase difference at a frequency determined by speed signal FG from speed detection unit 60. The control voltage generator 40 also controls the phase of the three-phase sinusoidal signals sinU, sinV, sinW according to the phase difference signal PD from phase difference generator 80.

The control voltage generator 40 is composed of a period detection unit 41, angle generation unit 42, and switch matrix 43. The operation of the control voltage generator 40 is described next with reference to the timing charts in FIG. 12 and FIG. 13.

The period detection unit 41 is composed of an edge counter 41A, up counter 41B, and clock 41C. The edge counter 41A counts the rising edges of the speed signal FG from speed detection unit 60, and after reaching a specified count (count=3 in FIG. 12) sequentially outputs data latch signal DL and then reset signal Re (FIG. 12). Because the speed signal FG is a pulse signal with a rising edge every 120 electric degrees (see FIG. 3), three rising edges equal one electric period. In other words, the edge counter 41A outputs data latch signal DL and reset signal Re once every electric period.

The reset signal Re from edge counter 41A resets up counter 41B, which starts counting up according to the clock CLK1 supplied from clock 41C. In other words, the up counter 41B detects a period equal to three periods (1 electric period) of the speed signal FG (up-count data C1 in FIG. 12). The detected up-count data C1 is then output to the latch 42A of the angle generation unit 42.

The period detection unit 41 thus detects the rotor speed and frequency based on speed signal FG.

A rising edge count of 3 is used in the present embodiment, but the invention shall not be so limited and the count can be set as desired. An arrangement using a hold circuit and an averaging circuit to hold a number of up count data and output the average thereof as the up-count data C1 could alternatively be used. This arrangement enables more accurately detecting the rotor speed. Other variations are also possible insofar as the rotor speed and frequency can be detected from the speed signal FG.

The angle generation unit 42 is composed of latch 42A and down counter 42B. The latch 42A latches and outputs the up-count data C1 based on the data latch signal DL output from edge counter 41A. The latch data L1 is loaded to down counter 42B, which repeats counting down based on clock CLK2 from clock 41C. The output signal from down counter 42B is input to switch matrix 43 as angle pulse signal AP. If the relationship between the set frequency of clock CLK1 and clock CLK2 of clock 41C is 1:J, the angle pulse signal AP is a pulse signal equal to the period detection result Tc of three periods (1 electric period) of the speed signal FG divided by J (see up-count data C1 and signal AP in FIG. 12).

More specifically, if the edge counter 41A counts to 3 and the frequency ratio of CLK1 and CLK2 is set to J=360, the angle pulse signal AP is a pulse signal of 1 electric degree. An angle pulse signal AP of a desired electric angle can thus be generated by adjusting the edge counter 41A counts and the clock frequency ratio J. The angle pulse signal AP is thus a signal equal to the period detected by the period detection unit 41 divided by a value determined by the frequency ratio J of CLK1 and CLK2, and angle generation unit 42 outputs this angle pulse signal AP.

The switch matrix 43 outputs the three-phase sinusoidal signals sinU, sinV, sinW with an amplitude of 1 based on the angle pulse signal AP (sinU in FIG. 12). The sinusoidal signal sinU in FIG. 12 appears to be a smooth sinusoidal wave in macro view, but in a micro view is actually a step signal dependent on clock frequency ratio J. These three-phase sinusoidal signals sinU, sinV, sinW can be generated in various ways, including, for example, by reading and generating the sinusoidal wave from a ROM storing predefined relationships between angle and sinusoidal wave value, or calculating the sinusoidal waves in a software operation based on the period detection result Tc (frequency information) from period detection unit 41 and the angle pulse signal AP (angle information). Further alternatively, resistance divided voltages acquired from a resistor group dividing a specified voltage by a specified number of resistors could be selectively output by switch control. In addition, if the amplitude of the three-phase sinusoidal signals sinU, sinV, sinW is constant, the amplitude shall not be limited to 1.

The phase difference signal PD is also input to the switch matrix 43 for phase control of the three-phase sinusoidal signals sinU, sinV, sinW according to the phase difference signal PD.

Figure 13:
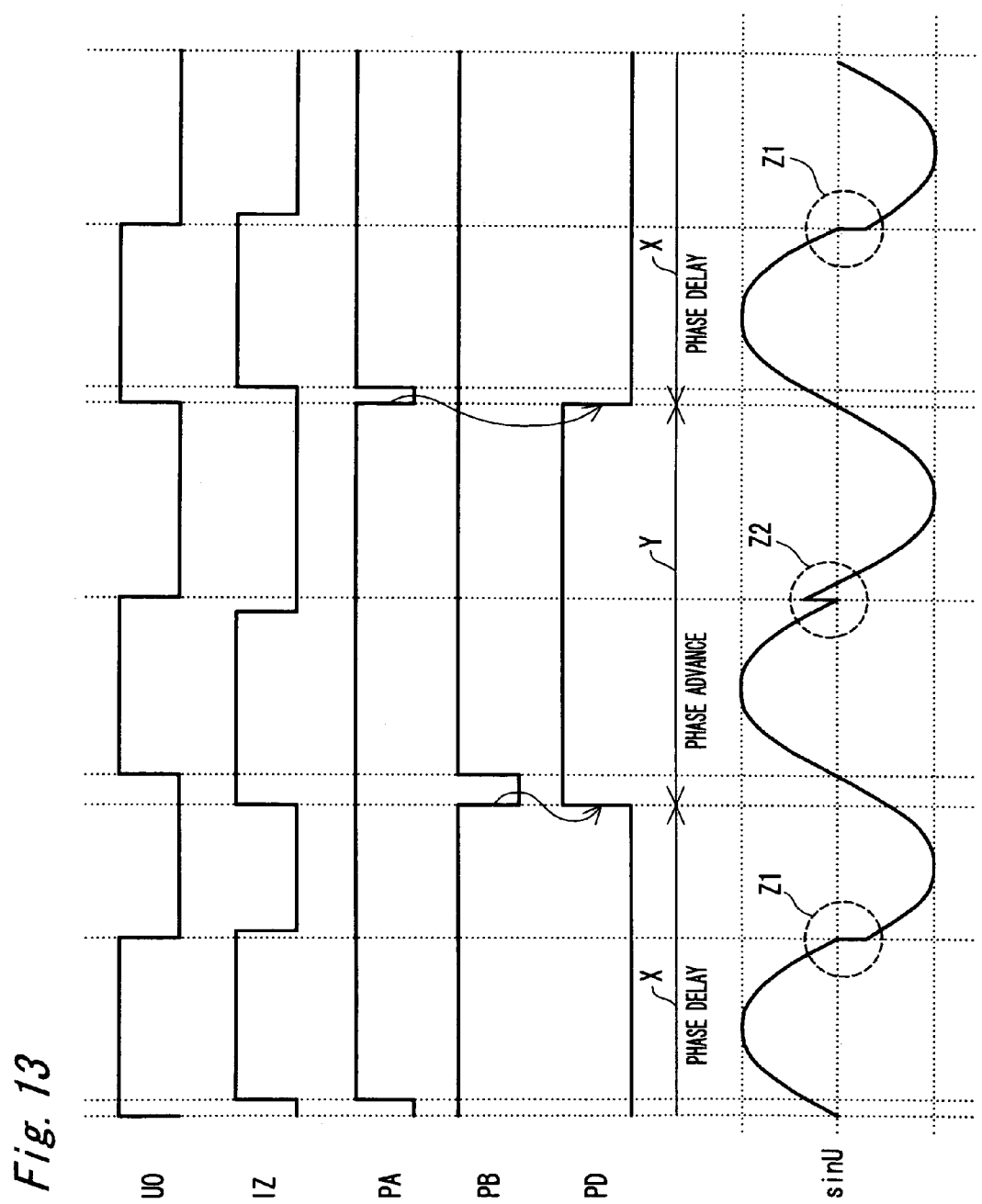
FIG. 13 is a timing chart describing the phase control operation of the control voltage generator 40 shown in FIG. 11.
Figure 14:
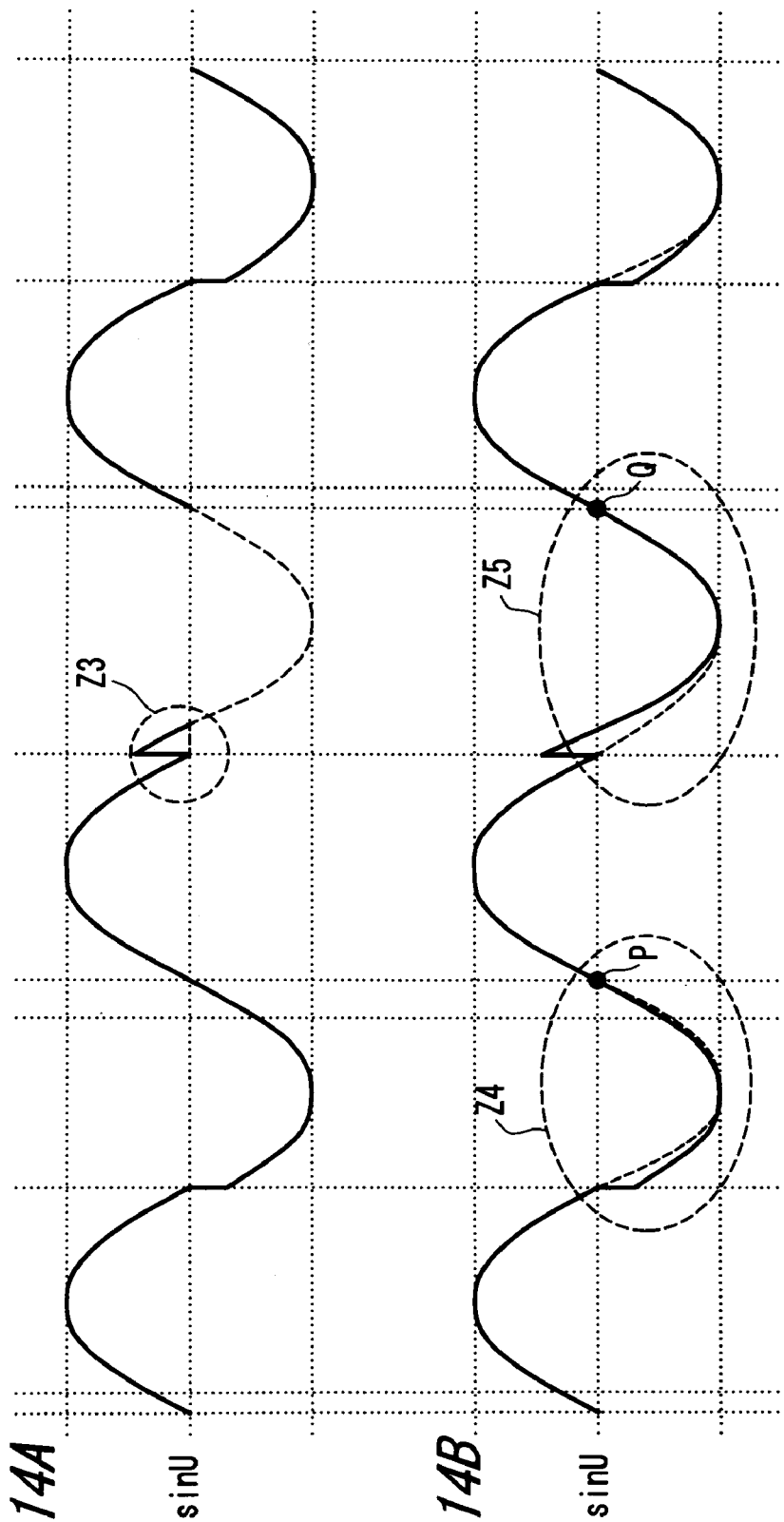
FIG. 14A is another timing chart describing the phase control operation of the control voltage generator 40 shown in FIG. 11.
FIG. 14B is another timing chart describing the phase control operation of the control voltage generator 40 shown in FIG. 11.

FIG. 13 is a timing chart describing the method of controlling the phase of U-phase sinusoidal signal sinU based on the phase difference signal PD. When the relationship between the reference signal U0 and current zero cross signal IZ is as shown in FIG. 13, the pulse signals PA and PB in the phase difference generator 80 output pulse signals as shown in FIG. 13. As a result, the phase difference signal PD is a pulse signal as also shown in FIG. 13.

The current zero cross signal IZ is delayed from the reference signal U0 during period X when the phase difference signal PD is low. The phase is therefore advanced a specific angle AS at the zero cross of the falling edge of the U-phase sinusoidal signal sinU (Z1 in FIG. 13). On the other hand, during period Y when the phase difference signal PD is high, the current zero cross signal IZ is advanced relative to the reference signal U0. The phase is therefore delayed a specific angle AS at the zero cross of the falling edge of the U-phase sinusoidal signal sinU (Z2 in FIG. 13). The phase is thus controlled at the zero cross of the falling edge of the U-phase sinusoidal signal sinU depending on the state of the phase difference signal PD. Note that the V and W phases are also controlled simultaneously to the phase control timing of the U phase. This phase control method is further described below with reference to FIG. 16.

The switch matrix 43 thus controls the phase at the zero cross timing of the falling edge of the U-phase sinusoidal signal sinU based on the phase difference signal PD while generating the three-phase sinusoidal signals sinU, sinV, sinW according to the angle pulse signal AP.

Note that the phase control timing is set to the zero cross of the falling edge of the U-phase sinusoidal signal sinU because the phase difference generator 80 generates the phase difference signal PD at the zero cross of the rising edge of the U-phase sinusoidal signal sinU. If phase control is applied at the rising edge zero cross of the U-phase sinusoidal signal sinU, the phase difference signal is generated simultaneously to phase control, and operation thus becomes unstable.

This is because when the phase is delayed at the zero cross of the rising edge of the U-phase sinusoidal signal sinU, for example, another rising edge zero cross immediately follows the phase control. The phase control timing is therefore set to the zero cross of the falling edge of the U-phase sinusoidal signal sinU.

Note that phase control is not limited to the falling edge zero cross of the U-phase sinusoidal signal sinU, and if the falling edge zero cross is at 0 degree, phase control can be applied at 90 degrees, 270 degrees, or other angle.

Furthermore, phase control is also not limited to once at the falling edge zero cross of the U phase, and could also be applied at the zero cross of the rising edge or falling edge of the V phase and W phase. Yet further, this first embodiment of the invention is arranged to detect the phase difference signal PD for the U phase, but the phase difference could be likewise detected for the V phase or W phase and the resulting phase difference signal could be used for phase control. Such arrangements enable more accurate phase control.

The phase control method of the present invention shall not be limited to the foregoing, and a U-phase sinusoidal signal sinU as shown in FIG. 14A and FIG. 14B could be generated.

More specifically, when the phase is delayed as indicated by Z2 in FIG. 13, the triangular wave portion of the U-phase sinusoidal signal sinU can be smoothed as indicated by Z3 in FIG. 14A. Alternatively, as shown by Z4 and Z5 in FIG. 14B, the falling edge zero cross of the U-phase sinusoidal signal sinU and the rising-edge zero cross points P and Q coming after the phase is adjusted specific angle AS can be generated to connect in a sinusoidal wave pattern. The other two phases can be likewise controlled simultaneously to the timing of phase control for the U phase. The waveforms shown in FIG. 14A and FIG. 14B can be easily generated by storing the values for the required waveforms in ROM and reading the waveform from the lookup table.

The control voltage generator 40 thus controls phase according to the phase difference signal PD while generating three-phase sinusoidal signals sinU, sinV, sinW of amplitude 1 according to the frequency of the speed signal FG. The resulting three-phase sinusoidal signals sinU, sinV, sinW are the multiplied with the torque control signal EC output by torque control signal generator 51, and the results are impressed through activation controlling unit 30 and drive unit 20 to the windings Lu, Lv, Lw of the motor 10 as control voltages Vuin, Vvin, Vwin. As a result, motor current Iu, Iv, Iw flows and motor 10 drives. The current-phase detection unit 70 detects current zero cross signal IZ at this time, and phase difference generator 80 detects the phase difference between U-phase sinusoidal signal sinU and current zero cross signal IZ and outputs phase difference signal PD. Based on this result, the control voltage generator 40 controls the phase of the three-phase sinusoidal signals sinU, sinV, sinW. By repeating this loop, the motor 10 drives with the phase of the U-phase sinusoidal signal sinU from control voltage generator 40 matching the phase of motor current Iu. That is, this first embodiment of the invention drives the motor 10 so that the phase of control voltage Vuin matches the phase of motor current Iu.

The general operation of the foregoing first embodiment of the invention is described next below. This first embodiment of the invention affords sensor-less drive of the motor 10 by controlling the phase of three-phase sinusoidal signals sinU, sinV, sinW so that the actual phase difference between current zero cross signal IZ and control voltage Vuin is zero.

Figure 15:
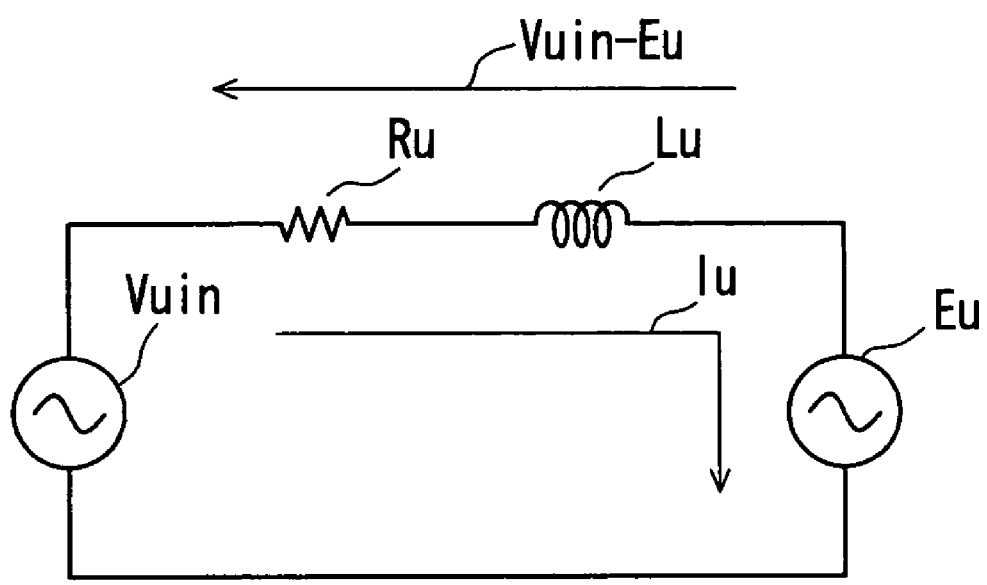
FIG. 15 is a circuit diagram showing a U-phase equivalence circuit in motor 10.
Figure 16:
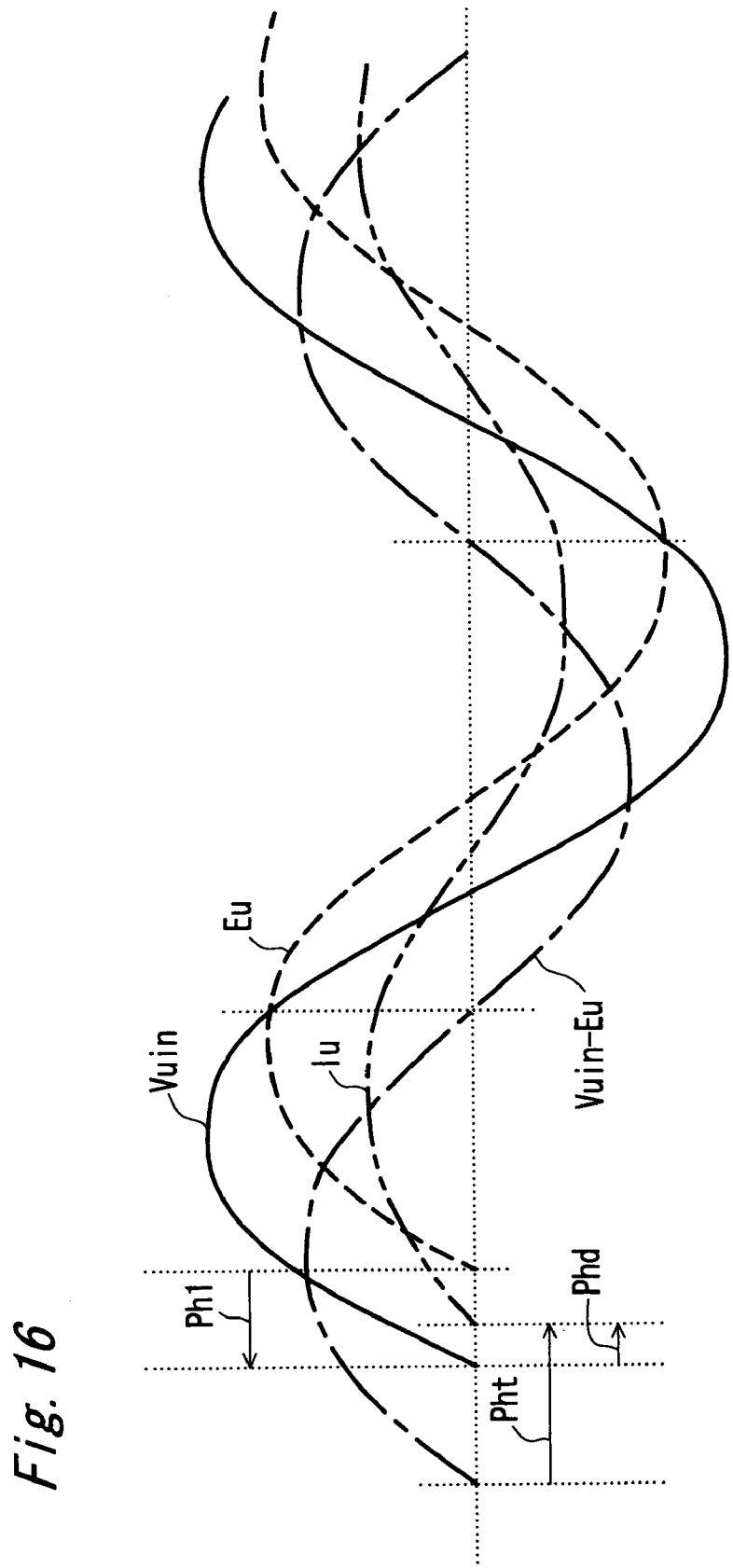
FIG. 16 is a waveform diagram describing signal operations in the motor 10 U-phase equivalence circuit.

FIG. 15 is a circuit diagram showing an equivalence circuit for one phase (U phase) of the motor 10, and FIG. 16 shows the operating signals from the parts of this equivalence circuit. The equivalence circuit in FIG. 15 has control voltage Vuin, the U-phase winding inductance Lu, resistance Ru, and induced voltage Eu of motor 10 connected in series. FIG. 16 shows the control voltage Vuin applied at a phase advanced Ph1 degree to induced voltage Eu. The difference voltage Vuin−Eu of control voltage Vuin and induced voltage Eu is applied to both ends of U-phase winding inductance Lu and resistance Ru at this time. As a result, motor current Iu flows at phase delay Pht, which is determined by inductance Lu, resistance Ru, and the operating frequency f at that time.

In general, the phase of motor current Iu and the phase of induced voltage Eu are preferably matched in order to drive the motor with high efficiency. In the case shown in FIG. 16, however, the phase of motor current Iu is advanced to induced voltage Eu. The phase of motor current Iu can be delayed in this case by phase control that reduces the phase difference Ph1 of control voltage Vuin relative to induced voltage Eu, that is, by delaying the phase of control voltage Vuin. If the phase of control voltage Vuin is only delayed a specific amount, the phase of difference voltage Vuin−Eu will be delayed more than the specified amount and, as a result, the phase of motor current Iu will be delayed more than the specified amount.

Conversely, if the phase of motor current Iu is delayed from induced voltage Eu, the phase of motor current Iu can be advanced by phase control that advances the phase of control voltage Vuin. By repeating this phase control of control voltage Vuin, the phase of induced voltage Eu and the phase of motor current Iu can be aligned.

However, because the phase of induced voltage Eu is not directly knowable in this first embodiment of the invention which does not detect the rotor position, the phase difference Ph1 of control voltage Vuin to induced voltage Eu cannot be set as desired. This first embodiment of the invention therefore applies phase control that aligns the phase of control voltage Vuin and motor current Iu without detecting the phase difference Ph1 of the control voltage Vuin to induced voltage Eu. More specifically, in the case shown in FIG. 16, phase control advances the phase of control voltage Vuin because the phase of motor current Iu is delayed Phd to control voltage Vuin, and thus advances the phase of motor current Iu. If the phase of control voltage Vuin is advanced a specified amount, the phase of difference voltage Vuin−Eu advances more than the specified amount, and the phase of motor current Iu is thus advanced more than the specified amount.

Conversely, if the phase of motor current Iu is advanced to control voltage Vuin, the phase of motor current Iu can be delayed by phase control that delays the phase of control voltage Vuin. By repeating this phase control of control voltage Vuin, the phase of control voltage Vuin and the phase of motor current Iu can be aligned.

More specifically, control voltage Vuin is applied at the appropriate phase, the current-phase detection unit 70 detects the zero cross of motor current Iu flowing at that time, and phase difference generator 80 detects the phase difference between control voltage Vuin and motor current Iu. The phase of control voltage Vuin is then controlled according to the detected phase difference signal PD. By repeating this control loop the difference between the control voltage Vuin and motor current Iu can be driven to substantially zero.

If the desired phase difference between control voltage Vuin and motor current Iu is the "target value," the target value in this first embodiment of the invention is zero.

Figure 17:
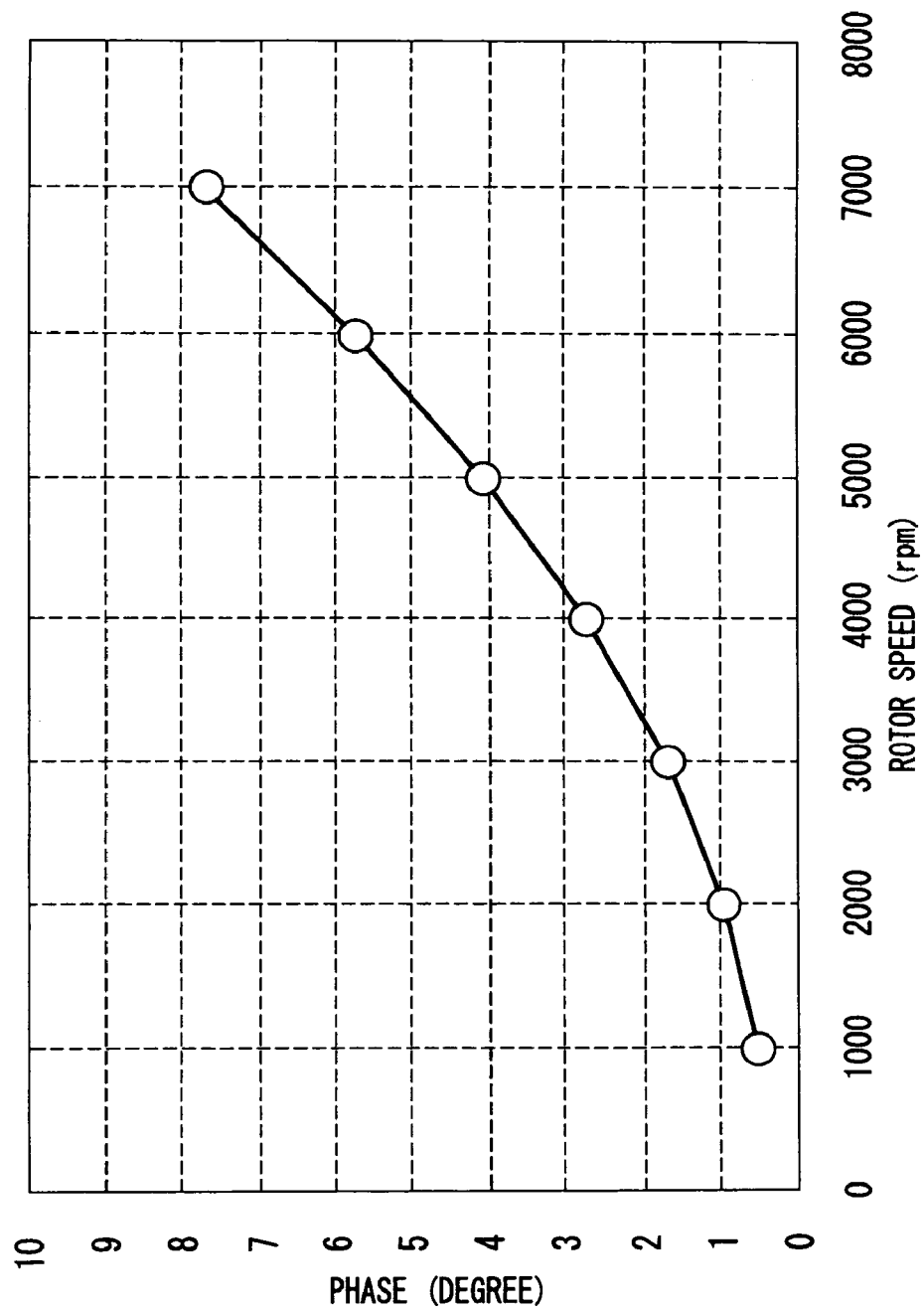
FIG. 17 describes the phase relationship for synchronizing the phase of the control voltage and the motor current.

FIG. 17 is a graph showing the relationship in a small motor between rotor speed (rpm) and the phase difference Ph1 (degree) of the control voltage Vuin to the induced voltage Eu when the phase of control voltage Vuin and the phase of motor current Iu match. As will be known from the figure, the phase difference Ph1 changes according to rotor speed when the phase of control voltage Vuin is aligned with the phase of motor current Iu. If the rotor is turning at a constant 5000 rpm, for example, and the phase of control voltage Vuin and motor current Iu match, the phase difference Ph1 between control voltage Vuin and induced voltage Eu is approximately 4 degrees. Driving the motor in this state to match the phase of control voltage Vuin and motor current Iu is equivalent to driving the motor to advance control voltage Vuin Ph1 degrees to induced voltage Eu as shown in FIG. 17.

In order to drive the motor so that the phase of control voltage Vuin and motor current Iu match, control voltage Vuin is applied at a phase advanced Ph1 degrees to induced voltage Eu. The motor current Iu is thus driven at a phase advanced Ph1 degrees to induced voltage Eu.

FIG. 17 shows the relationship for a small motor such as used in information devices. The time constant of such small motors is typically smaller than the time constant of motors used in air conditioners and washing machines, for example. The phase Ph1 of the control voltage Vuin to the induced voltage Eu required to align the phase of control voltage Vuin and motor current Iu is therefore extremely small, that is, only a few degrees. The likelihood of phase shift causing a loss of efficiency is therefore small when applying drive control to match the phase of control voltage Vuin and motor current Iu, that is, when the motor current Iu is advanced phase Ph1 to induced voltage Eu. More specifically, sensor-less drive not requiring rotor position detection is possible.

The amplitude of control voltages Vuin, Vvin, Vwin in this first embodiment of the invention is derived from the torque control signal EC generated by torque control signal generator 51, and the operating frequency f is calculated from the speed signal FG output by a new speed detection unit 60. As a result of speed detection unit 60, the operating frequency f of the control voltage thus always reflects the present rotor speed. This affords sensor-less drive of the motor 10 following the torque control signal EC even if the torque control signal EC is input in steps. It is therefore not necessary to apply linear torque control and speed control signals to generate the control voltage in order to prevent a loss of motor 10 synchronization, and the input conditions are thus not limited.

Thus driving the motor to match the phase of control voltage Vuin and motor current Iu enables sensor-less drive without requiring a non-activation period for rotor position detection. More specifically, a loss of efficiency due to position detection error can be prevented.

Furthermore, by generating control voltage Vuin as a sinusoidal wave signal, the motor current Iu is also a sinusoidal wave signal, and the vibration and acoustic noise that occur at activation/non-activation switching can be reduced compared with 120-degree activation or wide angle activation of less than 180 degrees. Furthermore, torque control signal EC is the only required input command, and the input conditions are not specifically limited.

The control voltage is a sinusoidal wave signal in this first embodiment of the invention, but the invention shall not be so limited. The control voltage could, for example, contain the 3×K harmonic component (where K is an integer) contained in the induced voltage. Efficiency can be further improved by using this control voltage. The control voltage could further alternatively contain ⅙ of the third harmonic. Using this control voltage improves the voltage utilization factor. The wave shape can also be desirably configured, including a two-phase modulated wave with a 120 degree zero.

Detection of the current zero cross signal in the current-phase detection unit 70 shall not be limited to the U phase, and detection could use the V phase or W phase, or the current zero cross signal could be detected in both V and W phases. The phase difference generator 80 shall also not be limited to generating the phase difference signal for the U phase in this case, and could generate the phase difference signal for the V phase or W phase or both V phase and W phase.

Furthermore, phase control by the control voltage generator 40 shall not be limited to the falling edge zero cross of the U-phase sinusoidal signal sinU, and phase control could be applied at any desired position. Phase control could also be applied a plurality of times in one electric period using the phase difference signals generated for another phase. This arrangement can improve phase control precision.

During starting and low speed operation when the amplitude of the third harmonic component of the induced voltage detected by speed detection unit 60 is low, forced commutation drive using a set frequency, or sensor-less drive using 120-degree activation or wide angle activation with a non-activation period, could be used. The drive mode can be switched for driving using the method of this first embodiment of the invention when the third harmonic component of the induced voltage can be reliably detected at times other than during startup and low speed operation.

More specifically, by providing a low speed period detector for detecting a low speed period denoting startup or low speed operation, and a drive control signal generator for setting the frequency of the drive control signal, the drive control signal can be generated based on the output frequency of the drive control signal generator during the low speed period. This arrangement enables stable sensor-less drive regardless of the rotor speed. The drive mode can be switched according to the speed signal FG or based on external input. Other variations will also be apparent to one with ordinary skill in the related art, and such variations and modifications are also included in the scope of the present invention.

Embodiment 2

Figure 18:
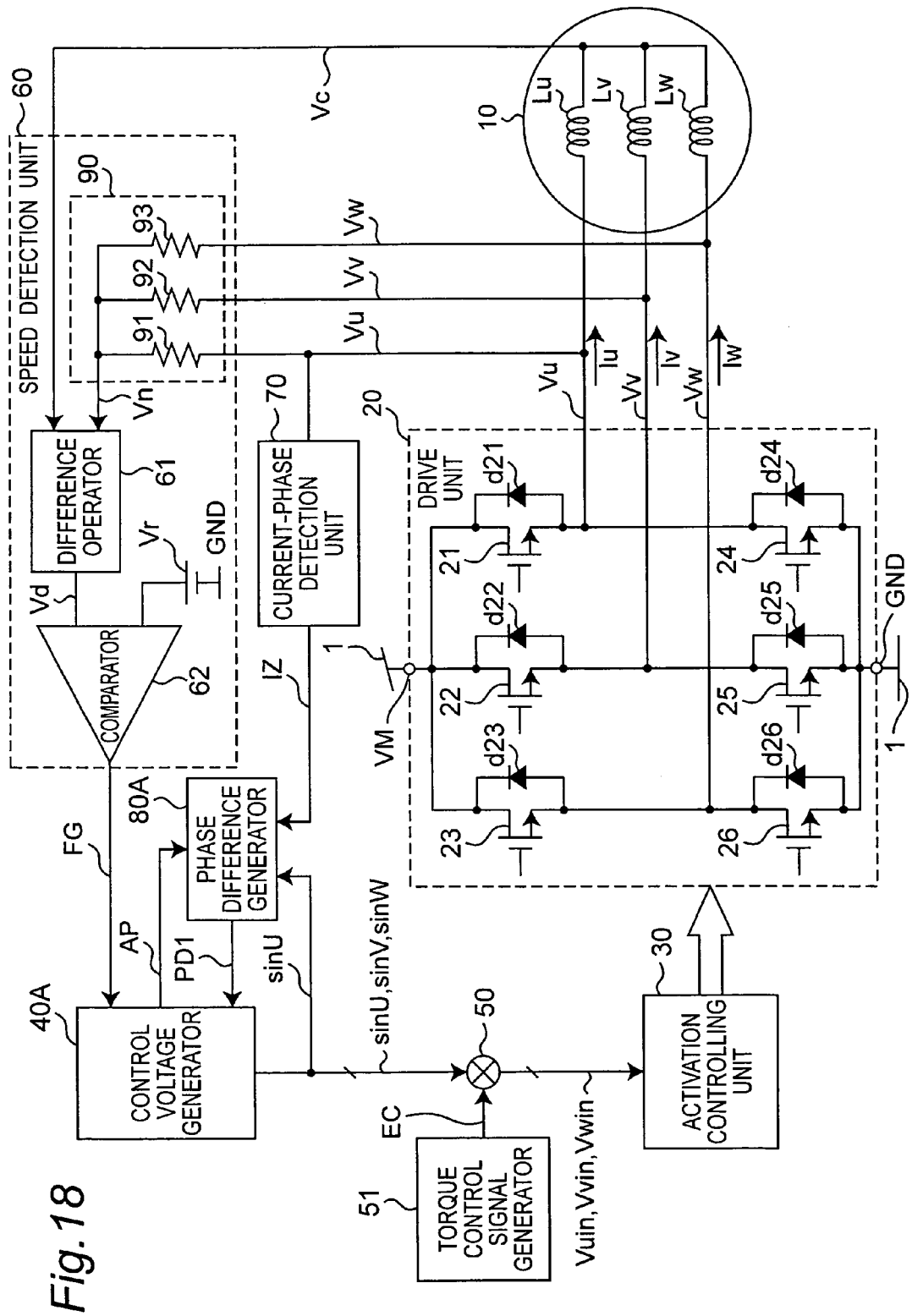
FIG. 18 is a block diagram showing the arrangement of a motor drive apparatus according to a second embodiment of the present invention.

A motor drive apparatus and motor drive method according to a second embodiment of the invention are described next with reference to FIG. 18 to FIG. 24. FIG. 18 is a block diagram of a motor drive apparatus according to a second embodiment of the invention. This second embodiment differs from the first embodiment in the configuration of the control voltage generator 40A and phase difference generator 80A. Other aspects of the arrangement and operation of this embodiment are the same as described in the first embodiment.

Figure 19:
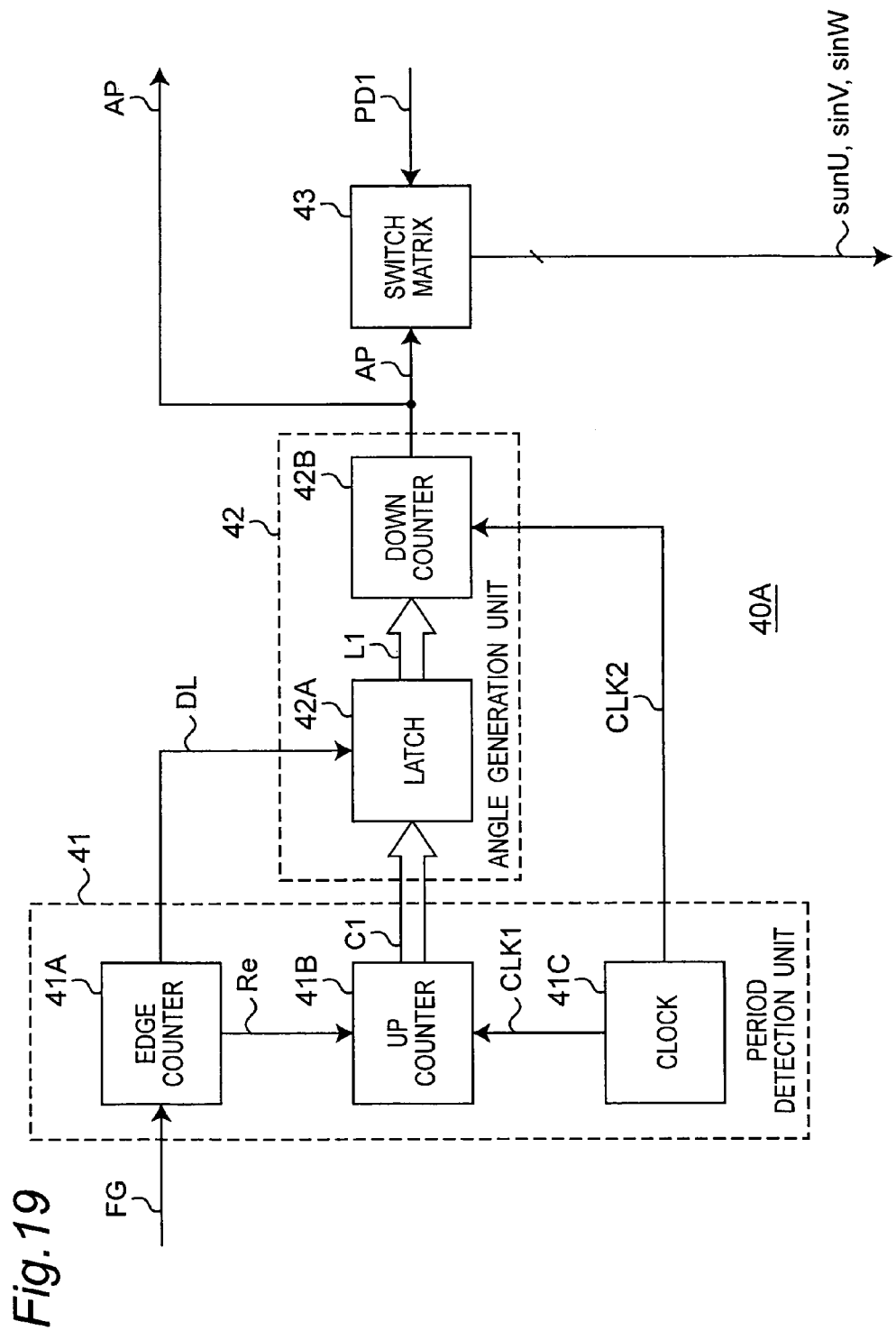
FIG. 19 is a block diagram showing the arrangement of the control voltage generator 40A in FIG. 18.

FIG. 19 is a block diagram showing the specific arrangement of the control voltage generator 40A. The components of this control voltage generator 40A are the same as the control voltage generator 40 in the first embodiment, and differ in that this control voltage generator 40A outputs angle pulse signal AP to phase difference generator 80A.

Figure 20:
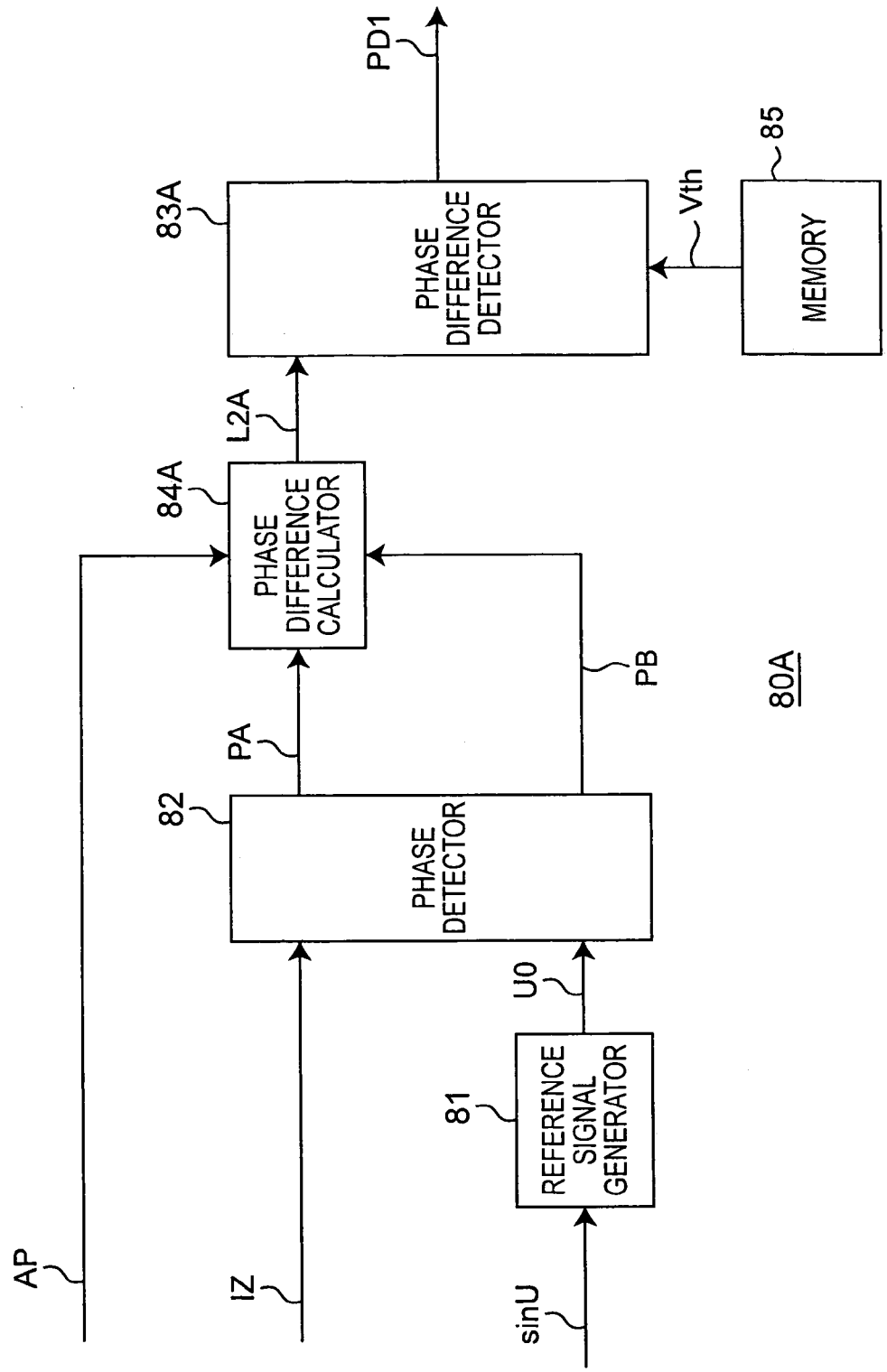
FIG. 20 is a block diagram showing the arrangement of the phase difference generator 80A in FIG. 18.

FIG. 20 is a block diagram of the phase difference generator 80A. This phase difference generator 80A differs from the phase difference generator 80 of the first embodiment in the inclusion of phase difference calculator 84A, memory 85, and phase difference detector 83A. Operation of the phase difference generator 80A is described with reference to the timing chart in FIG. 21. Note that the timing chart in FIG. 21 simply describes the operation of the phase difference generator 80A and the waveforms of the actual operating signals differ from those shown in the figure.

The process through comparing the phase of the current zero cross signal IZ and the phase of the U-phase sinusoidal signal sinU, and outputting pulse signal PA (phase delay signal) and pulse signal PB (phase advance signal), is the same as in the first embodiment of the invention and further description thereof is thus omitted below. Pulse signals PA, PB and the angle pulse signal AP from control voltage generator 40A are input to phase difference calculator 84A.

Figure 21:
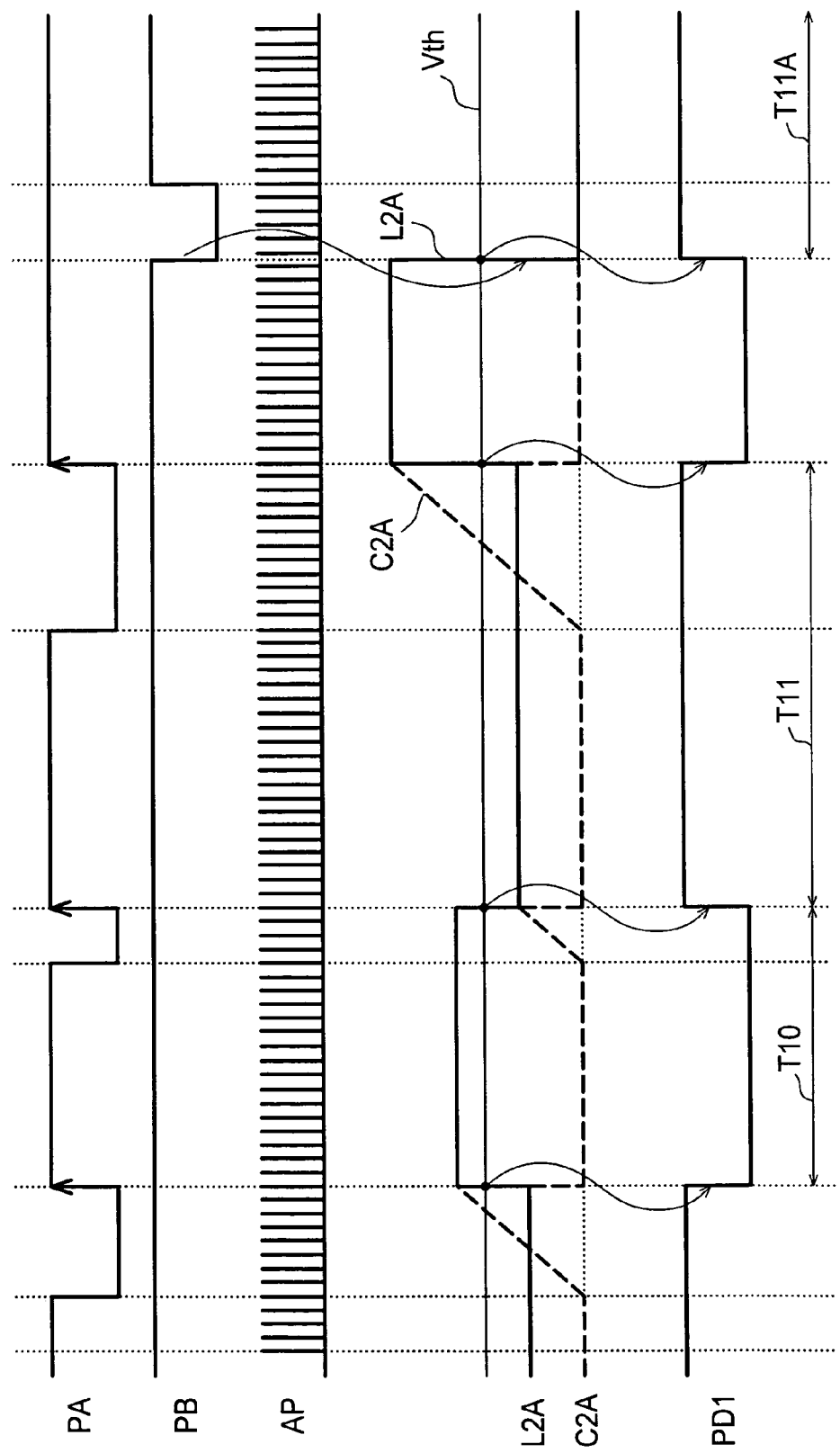
FIG. 21 is a timing chart describing the operation of the phase difference generator 80A in FIG. 20.

The phase-difference calculator 84A measures the low level period of pulse signal PA. More specifically, the phase difference calculator 84A starts up counting synchronized to the falling edge of pulse signal PA using the angle pulse signal AP as a clock, latches up count data C2A at the rising edge of pulse signal PA, and resets the up counter. Latch data L2A and up count data C2A in FIG. 21 are shown with the same zero level. The latch data L2A which latched up count data C2A is output to phase difference detector 83A. The angle pulse signal AP has a pulse at 1 electric degree increments. During the low period of pulse signal PA, the latch data L2A measured by the up counter matches the phase delay of the current zero cross signal IZ to the reference signal U0, which has an edge at the zero cross of U-phase sinusoidal signal sinU. In other words, latch data L2A matches the phase delay of motor current Iu to control voltage Vuin.

Figures 22A, 22B:
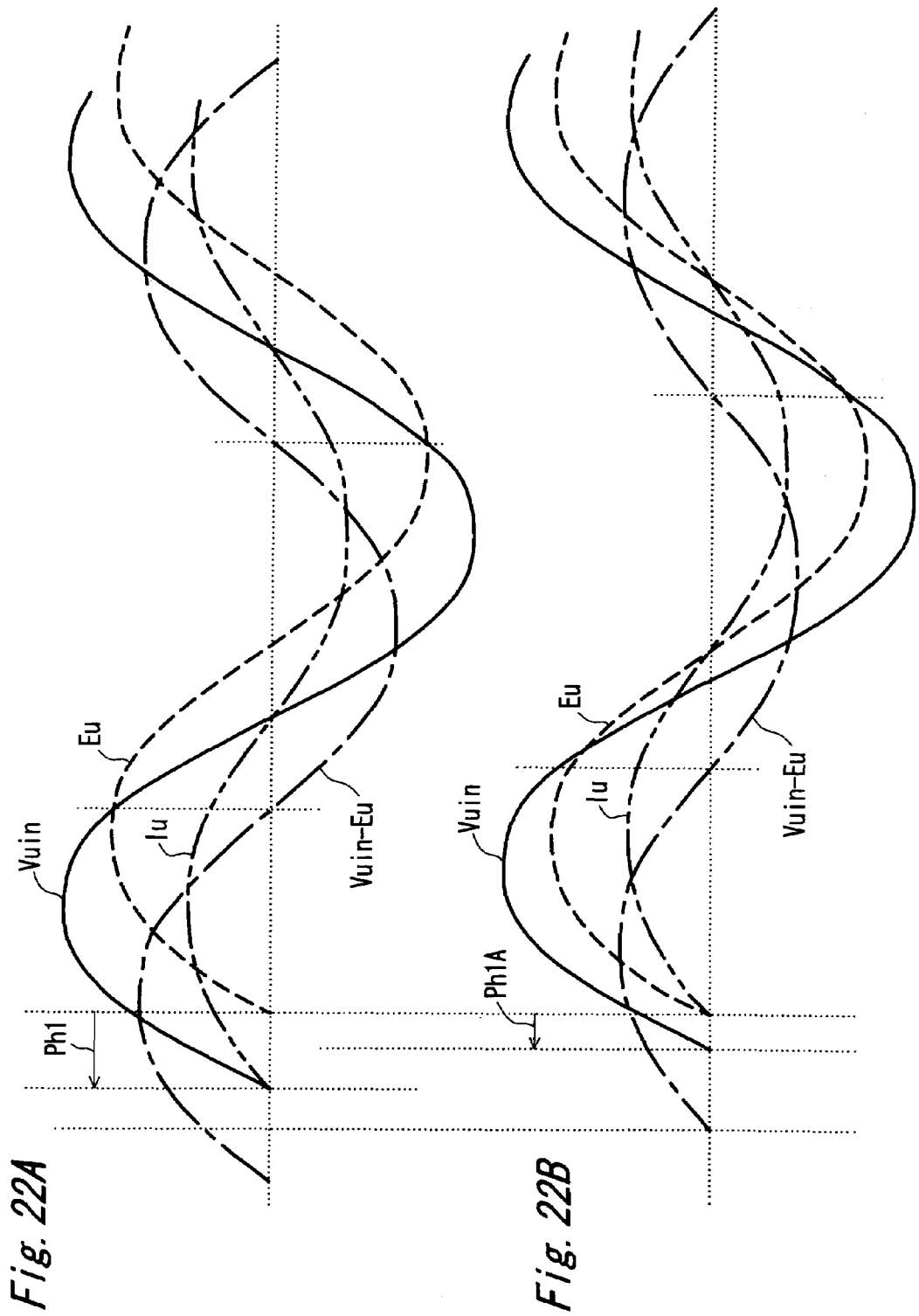
FIG. 22A is a waveform diagram of the phase relationship of the control voltage and motor current.
FIG. 22B is a waveform diagram of the phase relationship of the control voltage and motor current.

The memory 85 is described next. The first embodiment drives the actual phase difference between U-phase sinusoidal signal sinU, that is, control voltage Vuin, and motor current Iu to zero. That is, the target value is zero. FIG. 22A shows the signal waveforms when control voltage Vuin and motor current Iu are same phase. The phase difference of control voltage Vuin to induced voltage Eu is Ph1 at this time, and the phase of motor current Iu is advanced relative to induced voltage Eu. In general, motor drive is most efficient when the phase of induced voltage Eu and the phase of motor current Iu are the same.

Figure 23:
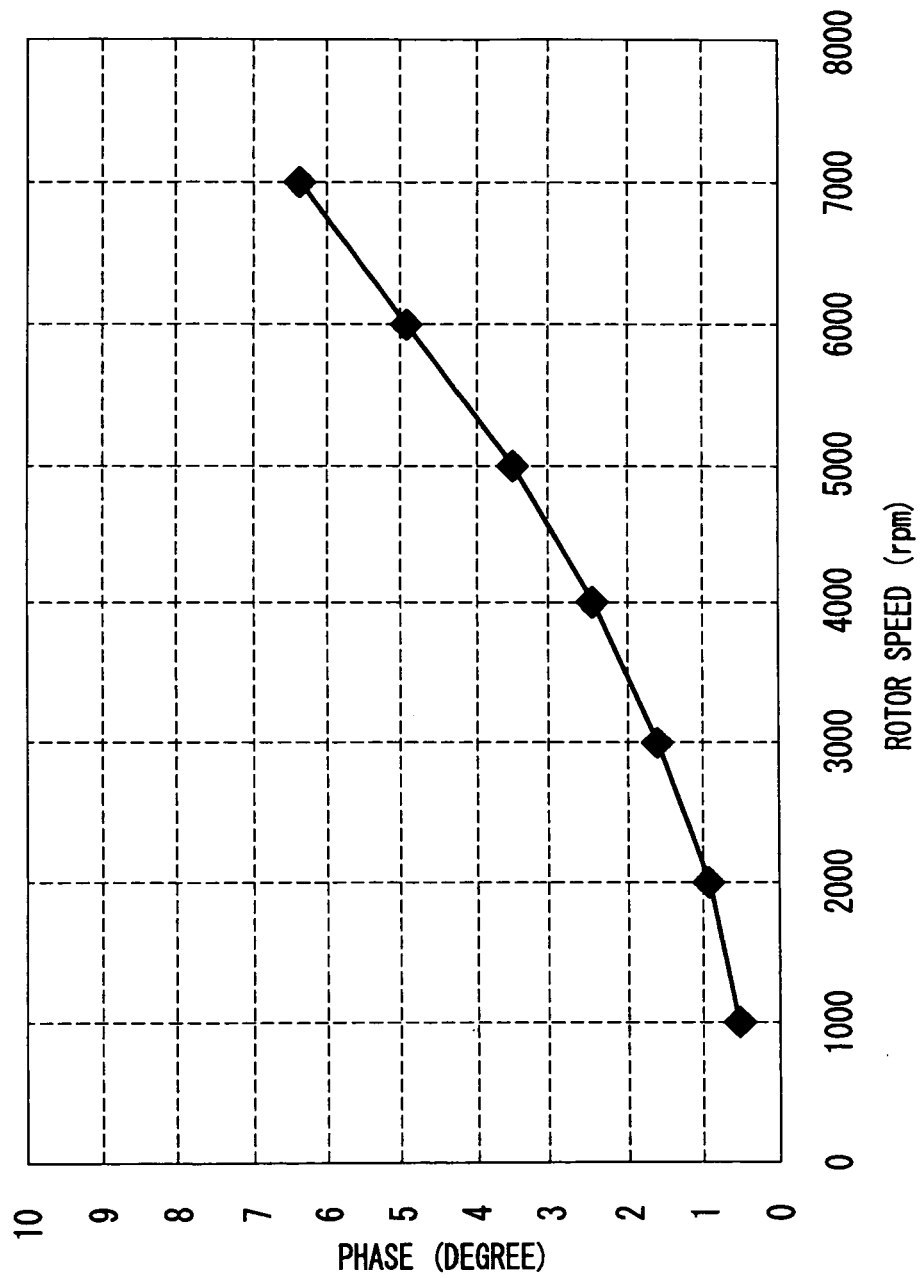
FIG. 23 describes the phase relationship for synchronizing the phase of the induced voltage and motor current.

FIG. 23 is a graph showing the relationship in a small motor between rotor speed (rpm) and the phase Ph1A (degree) of the control voltage Vuin to the induced voltage Eu when the phase of induced voltage Eu and the phase of motor current Iu match. The phase of induced voltage Eu and motor current Iu can be aligned by advancing the phase of control voltage Vuin Ph1A degrees to the phase of induced voltage Eu. For example, if the rotor is turning at a constant 5000 rpm, the phase of induced voltage Eu and the phase of motor current Iu can be substantially aligned by setting adjusting the phase Ph1A of control voltage Vuin to induced voltage Eu to approximately 3.5 degrees.

FIG. 22B shows the signal waveforms when induced voltage Eu and motor current Iu are same phase. The phase difference Ph1A of control voltage Vuin to induced voltage Eu when induced voltage Eu and motor current Iu are same phase is the phase difference Ph1A of motor current Iu to control voltage Vuin. That is, the phase of induced voltage Eu and the motor current Iu can be matched by driving motor current Iu phase difference Ph1A to control voltage Vuin, thereby enabling the most efficient drive. The target value in this case is Ph1A.

Memory 85 stores the relationships shown in FIG. 23. The curve shown in FIG. 23 is for descriptive purposes only, and the actual curve will change according to the motor constant and load, such as the disk load or motor load. The relationships stored in memory 85 must therefore be determined in advance based on the motor constant, load, and other factors.

Figure 24:
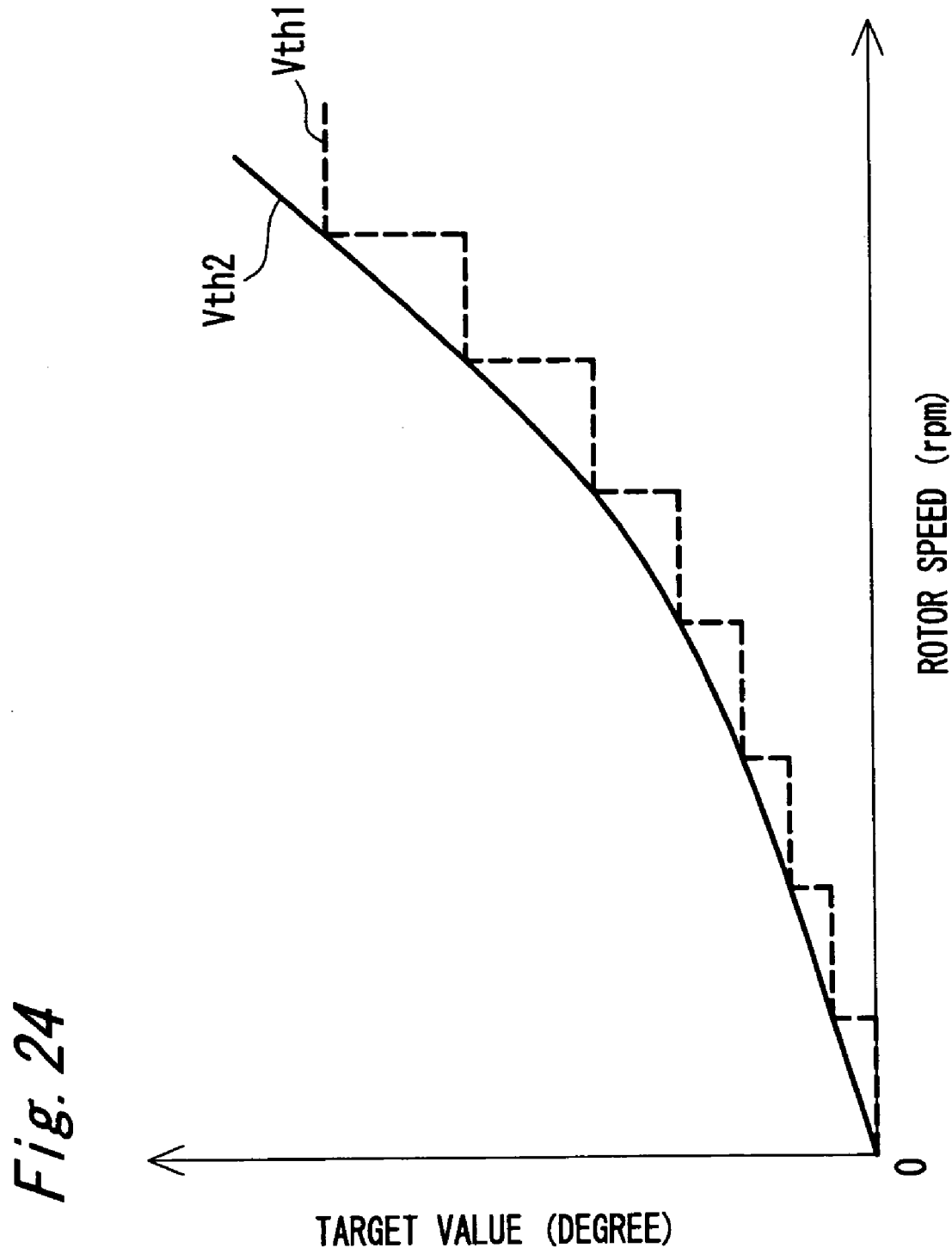
FIG. 24 shows waveforms approximating the relationship shown in FIG. 22A and FIG. 22B.

FIG. 24 shows an approximation of the curve shown in FIG. 23. Target values Vth1 approximate the target value in steps at each rotor speed increment, and target value Vth2 approximates the target values with a quadratic curve. The memory 85 outputs a target value Vth such as Vth1 or Vth2 to phase difference detector 83A according to the rotor speed acquired from the speed signal FG.

The approximation method shown in FIG. 23 can be varied in many ways. For example, a monotonically increasing approximation corresponding to the increase in rotor speed, or a target value of zero could be set at low speed and a specific non-zero value could be set at intermediate and high speeds, or a specific target value could be set regardless of rotor speed. The target value can thus be set to achieve high efficiency drive through the speed range that is actually used.

The phase difference detector 83A compares the latch data L2A of phase difference calculator 84A and target value Vth from memory 85, and outputs the result as phase difference signal PD1. This phase difference signal PD1 is shown in FIG. 21. In period T10, latch data L2A is high relative to target value Vth. That is, the phase difference of the delay of motor current Iu to control voltage Vuin is greater than target value Vth. Therefore, phase difference signal PD1 is set low to advance the phase of control voltage Vuin. The phase of control voltage Vuin is thus advanced from the present phase, and the phase of motor current Iu is also advanced from the present phase. As a result, the phase difference delaying motor current Iu to control voltage Vuin is thus decreased and is closer to target value Vth.

In period T11 latch data L2A is low relative to target value Vth. That is, the phase difference in the delay direction of motor current Iu to control voltage Vuin is smaller than the target value Vth. The phase difference signal PD1 therefore goes high in order to control control voltage Vuin in the phase delay direction. The phase of control voltage Vuin is thus delayed relative to the present phase, and the phase of motor current Iu is also delayed relative to the present phase. The phase difference in the delay direction of motor current Iu to control voltage Vuin thus increases and is closer to the target value Vth. By repeating this process the phase difference between control voltage Vuin and motor current Iu eventually equals to approximately target value Vth.

Operation when pulse signal PB is output in FIG. 21 is described next. In period T11A when pulse signal PB is output, pulse signal PA is held high and the phase of motor current Iu is advanced to control voltage Vuin. Because the falling edge of pulse signal PA does not come during this period, up counting does not occur and latch data L2A outputs zero synchronized to the falling edge of pulse signal PB. The phase difference signal PD1 output by phase difference detector 83A based on comparison of target value Vth and latch data L2A therefore goes high. That is, as in period T11 described above, control voltage Vuin is controlled in the phase delay direction, and the phase difference in the delay direction of motor current Iu to control voltage Vuin thus approaches the target value Vth.

This embodiment of the invention thus enables sensor-less drive without requiring a non-activation period for rotor position detection. More particularly, the motor can be efficiently driven at the ideal phase setting by aligning the phase of the induced voltage and motor current.

The angle pulse signal AP shall not be limited to increments of 1 electric degree, and the pulse length can be desirably set according to the target value Vth. Furthermore, the same effect can be achieved by inputting target value Vth to the phase difference detector 83A from an external target value setting device instead of rendering memory 85 in phase difference generator 80A. The memory 85 and external target value setting device constitute a target value setting unit.

As shown in FIG. 23, if target value Vth changes with the rotor speed, the phase of the induced voltage and motor current will match independently of the rotor speed. Because the rotor speed varies according to the torque control signal EC, the phase of the induced voltage and motor current can be aligned independently of the rotor speed if target value Vth is changed based on torque control signal EC.

Furthermore, phase difference signal PD1 is set to two values based on whether the phase difference of motor current Iu to control voltage Vuin is greater than or less than the target value Vth. However, the phase difference can be converged to the target value Vth more quickly if the difference between this phase difference and target value Vth is used as phase difference signal PD1 and the phase of control voltage Vuin is controlled based on this phase difference signal PD1.

Furthermore, the target value Vth shall not be limited to a value causing the phase of the induced voltage and motor current to match, and could be set to a value causing the phase of the motor current to advance relative to the induced voltage during high speed operation. This enables driving the motor so that the maximum rotor speed can be improved.

Furthermore, the phase of the reference signal U0 output by reference signal generator 81 can be changed instead of providing memory 85 in phase difference generator 80A. More specifically, a signal delaying the phase of the target value Vth could be used as a new reference signal, and the motor could be driven so that the actual phase difference between this new reference signal and the motor current goes to zero. This arrangement achieves the same effect as the foregoing arrangement having memory 85.

Embodiment 3

Figure 25:
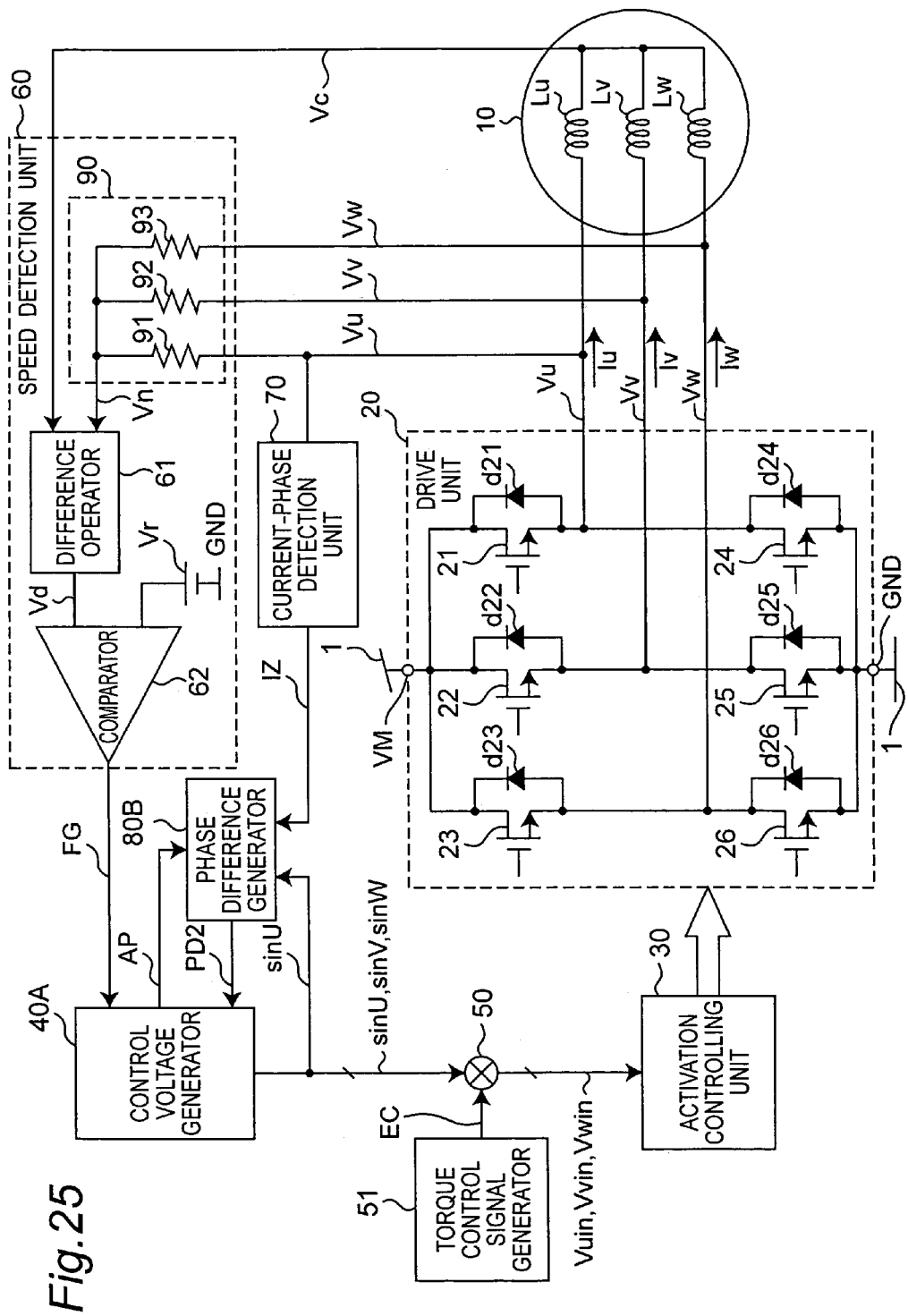
FIG. 25 is a block diagram showing the arrangement of a motor drive apparatus according to a third embodiment of the present invention.

A motor drive apparatus and motor drive method according to a third embodiment of the invention are described next with reference to FIG. 25 to FIG. 27. FIG. 25 is a block diagram of a motor drive apparatus according to this embodiment of the invention. This embodiment differs from the second embodiment in the configuration of the phase difference generator 80B. Other aspects of the arrangement and operation of this embodiment are the same as described in the second embodiment.

Figure 26:
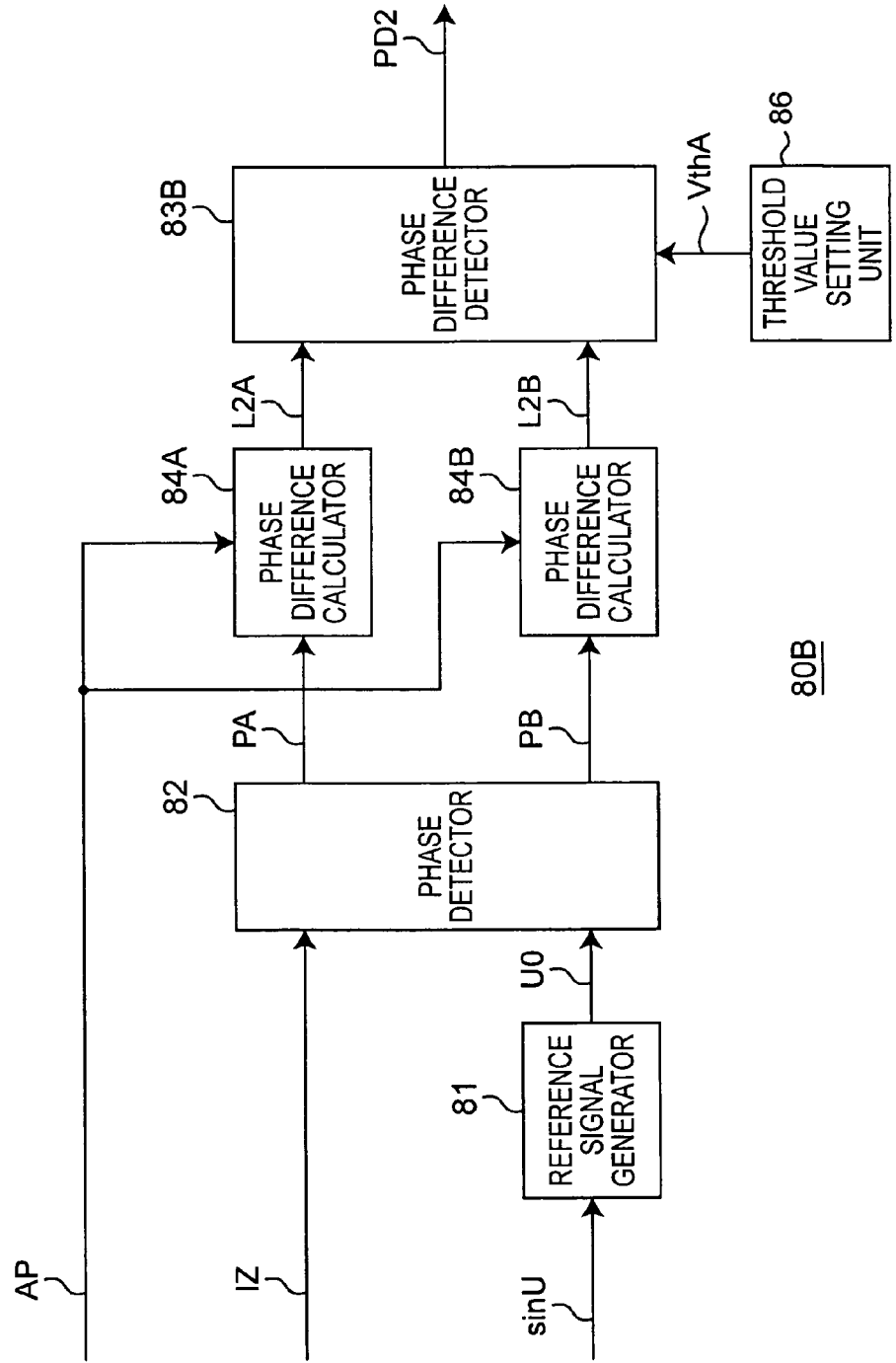
FIG. 26 is a block diagram showing the arrangement of the phase difference generator 80B in FIG. 25.
Figure 27:
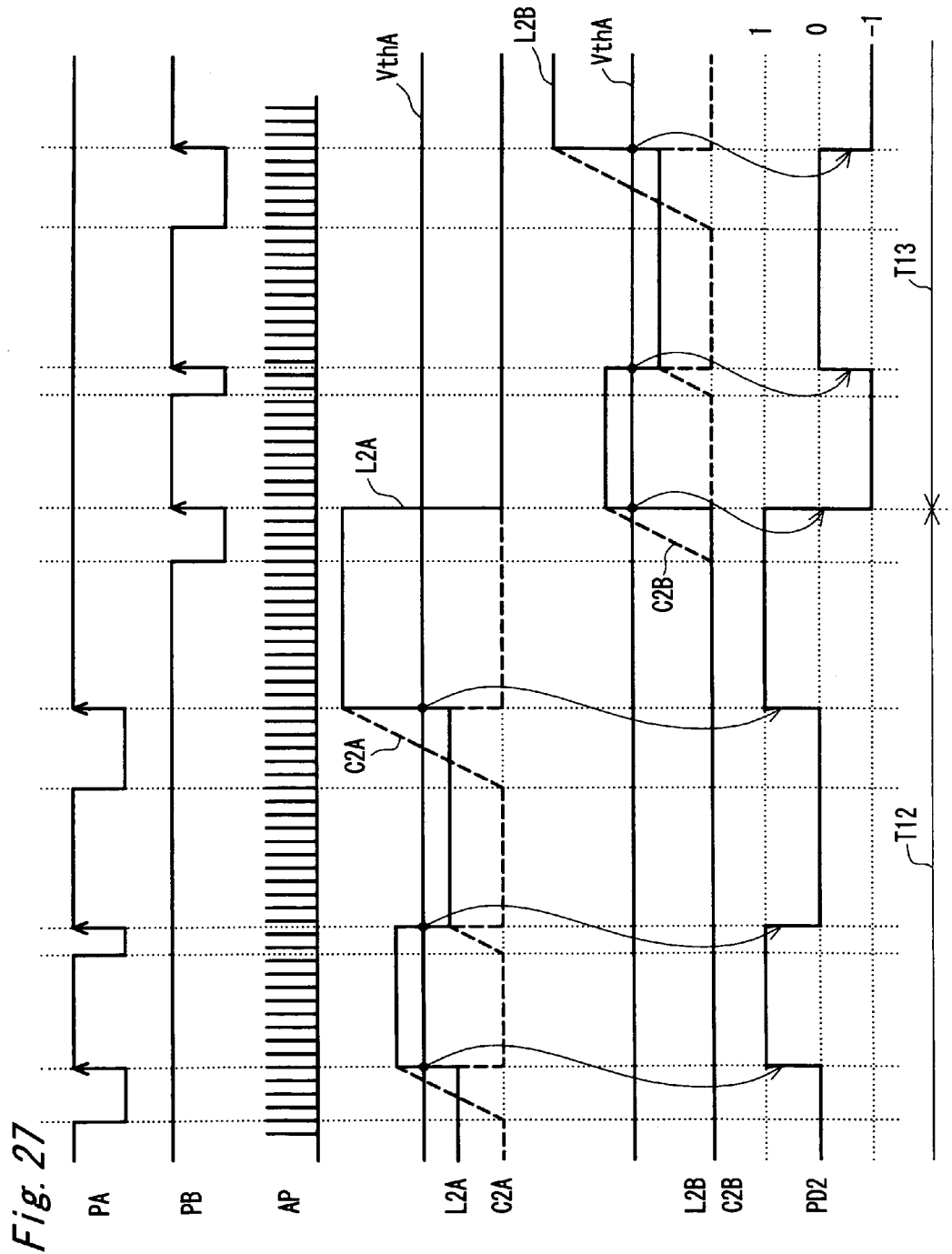
FIG. 27 is a timing chart describing the operation of the phase difference generator 80B in FIG. 26.

FIG. 26 is a block diagram of the phase difference generator 80B. This phase difference generator 80B differs from the phase difference generator 80 of the first embodiment in the inclusion of phase difference calculator 84A and phase difference calculator 84B, phase difference detector 83B, and threshold value setting unit 86. Operation of the phase difference generator 80B is described with reference to the timing chart in FIG. 27. Note that the timing chart in FIG. 27 simply describes the operation of the phase difference generator 80B and the waveforms of the actual operating signals differ from those shown in the figure.

The process through comparing the phase of the current zero cross signal IZ and the phase of the U-phase sinusoidal signal sinU, and outputting pulse signal PA (phase delay signal) and pulse signal PB (phase advance signal), is the same as in the first embodiment of the invention and further description thereof is thus omitted below.

Pulse signal PA and the angle pulse signal AP from control voltage generator 40A are input to phase difference calculator 84A, and pulse signal PB and angle pulse signal AP from control voltage generator 40A are input to phase difference calculator 84B. FIG. 27 shows pulse signal PA, pulse signal PB, and angle pulse signal AP. Phase difference calculator 84A measures the length of the low period in pulse signal PA, and phase difference calculator 84B measure the length of the low period in pulse signal PB.

The operation of phase difference calculator 84A is the same as described in the second embodiment above (see latch data L2A and up count data C2A in FIG. 27), and the operation of phase difference calculator 84B is therefore described below.

Using the angle pulse signal AP as a clock, phase difference calculator 84B starts up counting synchronized to the falling edge of pulse signal PB, latches up count data C2B at the rising edge of pulse signal PB, and resets the up counter. Latch data L2B and up count data C2B in FIG. 27 are shown with the same zero level. The latch data L2B which latched up count data C2B is output to phase difference detector 83B. The angle pulse signal AP has a pulse at 1 electric degree increments. During the low period of pulse signal PB, the value of the up counter (latch data L2B) matches the phase advance of the current zero cross signal IZ to the reference signal U0, which has an edge at the zero cross of U-phase sinusoidal signal sinU. In other words, latch data L2B matches the phase advance of motor current Iu to control voltage Vuin.

The phase difference detector 83B compares latch data L2A and L2B from phase difference calculator 84A and 84B with threshold value VthA from threshold value setting unit 86, and outputs phase difference signal PD2. This phase difference signal PD2 is shown in FIG. 27.

Period T12 is the period during whih pulse signal PA is output, and denotes the phase delay of motor current Iu to control voltage Vuin. Period T13 likewise is the period during which pulse signal PB is output, and denotes the phase advance of motor current Iu to control voltage Vuin. When latch data L2A is high relative to the threshold value VthA from threshold value setting unit 86, phase difference detector 83B outputs phase difference signal PD2 as 1. Likewise when latch data L2B is high relative to threshold value VthA, phase difference detector 83B outputs phase difference signal PD2 as −1. If latch data L2A is less than the threshold value VthA, or latch data L2B is less than threshold value VthA, phase difference detector 83B outputs phase difference signal PD2 as 0. Note that the output values of phase difference signal PD2 shall not be limited to the foregoing, and any three-valued levels can be used insofar as three distinct values are output.

When phase difference signal PD2 outputs 1, the phase of motor current Iu to control voltage Vuin is delayed by the set threshold value VthA or more, and control voltage generator 40A therefore applies control advancing the phase. The phase of control voltage Vuin is therefore advanced relative to the present phase, and the phase difference in the delay direction of motor current Iu to control voltage Vuin is therefore reduced.

When phase difference signal PD2 outputs −1, the phase of motor current Iu to control voltage Vuin is advanced by the set threshold value VthA or more, and the control voltage generator 40A therefore applies control delaying the phase. The phase of control voltage Vuin is therefore delayed relative to the present phase, and the phase difference in the advance direction of motor current Iu to control voltage Vuin is therefore reduced.

When phase difference signal PD2 outputs 0, the absolute value of the phase difference between control voltage Vuin and motor current Iu is within the set threshold value, and phase control by the control voltage generator 40A is therefore not applied.

By repeating this process, the absolute value of the phase difference between control voltage Vuin and motor current Iu eventually settles within the threshold value VthA. Note that threshold value VthA need not be constant, and could vary.

This embodiment of the invention thus enables sensor-less drive without requiring a non-activation period for rotor position detection. Furthermore, because a threshold value is set for generating the phase difference, excessive phase control around the threshold value can be eliminated, and stable sensor-less drive is possible.

The angle pulse signal AP shall not be limited to increments of 1 electric degree, and the pulse length can be desirably set according to the threshold value VthA. The same effect can also be achieved by inputting the threshold value VthA to the phase difference detector 83B from an external threshold value setting unit instead of providing threshold value setting unit 86 in phase difference generator 80B.

Furthermore, the actual target value of the phase difference of motor current Iu to control voltage Vuin is set to zero above, but a specific non-zero could be used. Methods of using a specific non-zero value include shifting the phase of the reference signal U0 of reference signal generator 81 in phase difference generator 80B a specific amount, adding a specific difference to the threshold value applied to latch data L2A and L2B, or adding a specific pulse width difference to the pulse signals PA, PB, and the target value can thus be easily set to a desired non-zero value. Thus comprised, an optimal phase relationship, such as aligning the phase of the induced voltage and motor current, can be set as in the foregoing second embodiment. Furthermore, in addition to the benefits of the second embodiment described above, excessive phase control near the ideal phase relationship can be eliminated, and stable, high efficiency sensor-less can be achieved.

Furthermore, if the target value Vth is varied according to the rotor speed as shown in FIG. 23, the induced voltage and motor current phase can be synchronized regardless of the rotor speed. Because the rotor speed varies according to the torque control signal EC, the induced voltage and motor current phase can be synchronized irrespective of the rotor speed if target value Vth varies according to the torque control signal EC.

The target value is set by an external target value setting unit or other target value setting unit.

Embodiment 4

Figure 28:
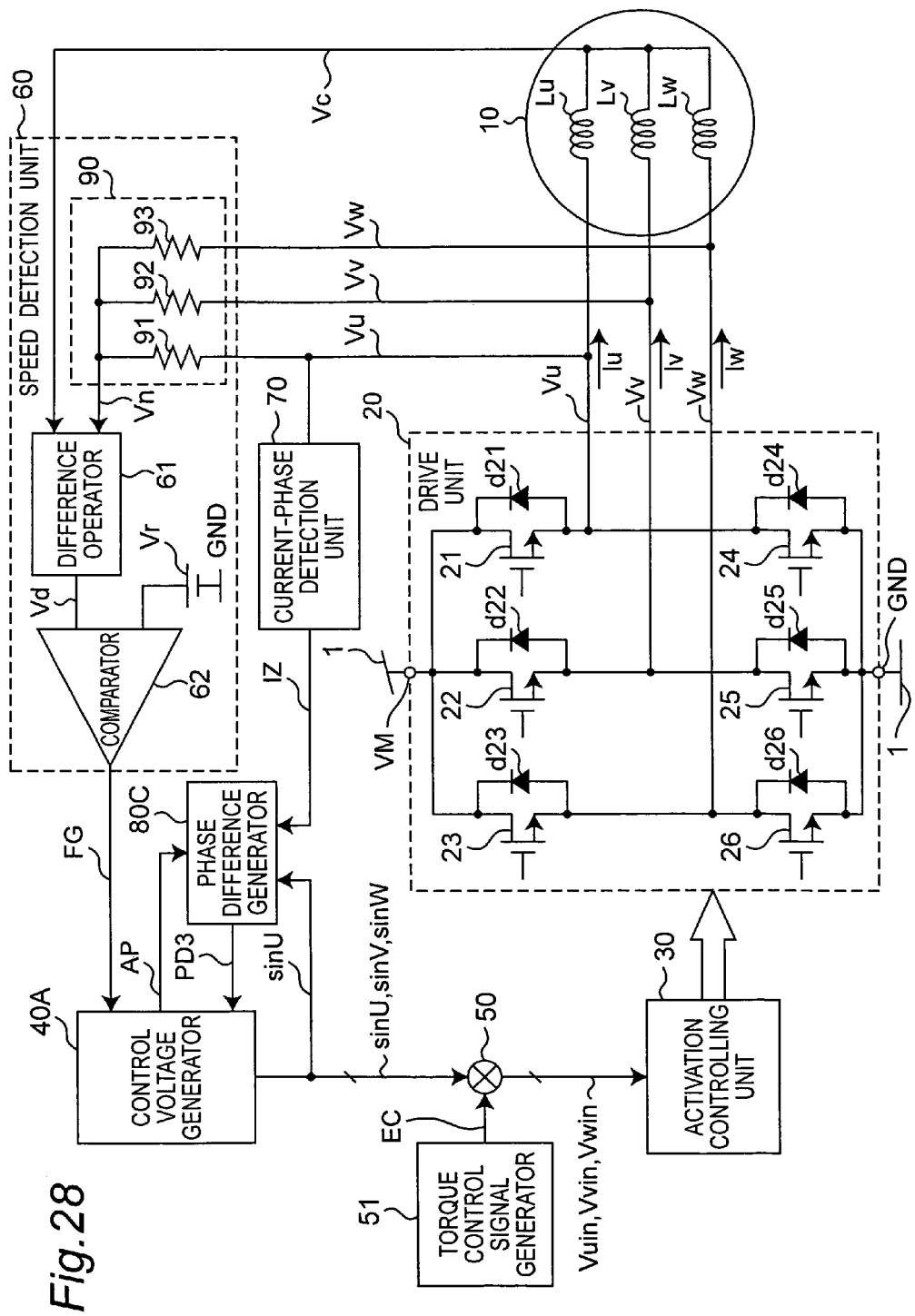
FIG. 28 is a block diagram showing the arrangement of a motor drive apparatus according to a fourth embodiment of the invention.

A motor drive apparatus and motor drive method according to a fourth embodiment of the invention are described next with reference to FIG. 28 to FIG. 30. FIG. 28 is a block diagram of a motor drive apparatus according to this embodiment of the invention. This embodiment differs from the third embodiment in the configuration of the phase difference generator 80C. Other aspects of the arrangement and operation of this embodiment are the same as described in the third embodiment.

Figure 29:
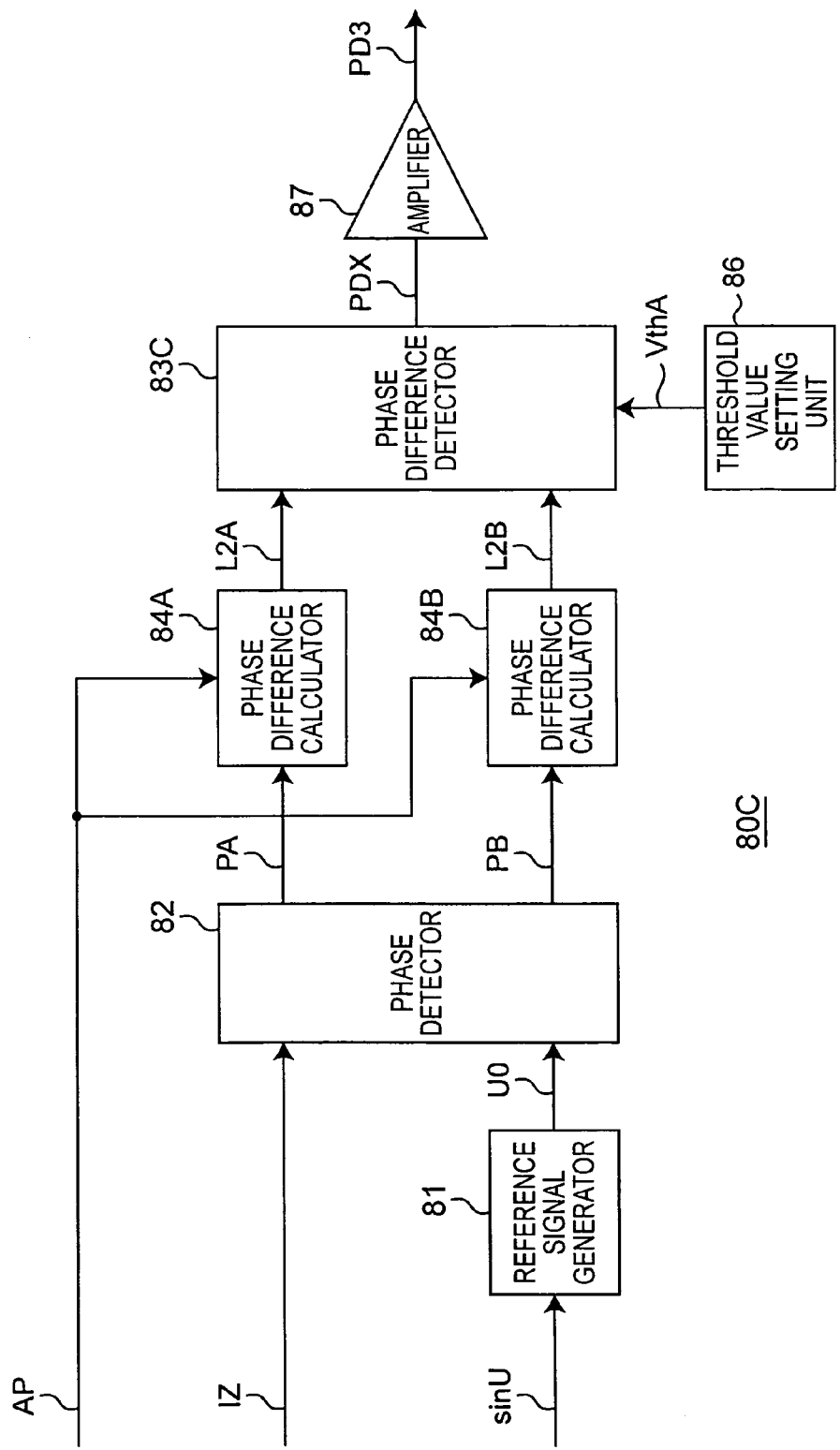
FIG. 29 is a block diagram showing the arrangement of the phase difference generator 80C in FIG. 28.
Figure 30:
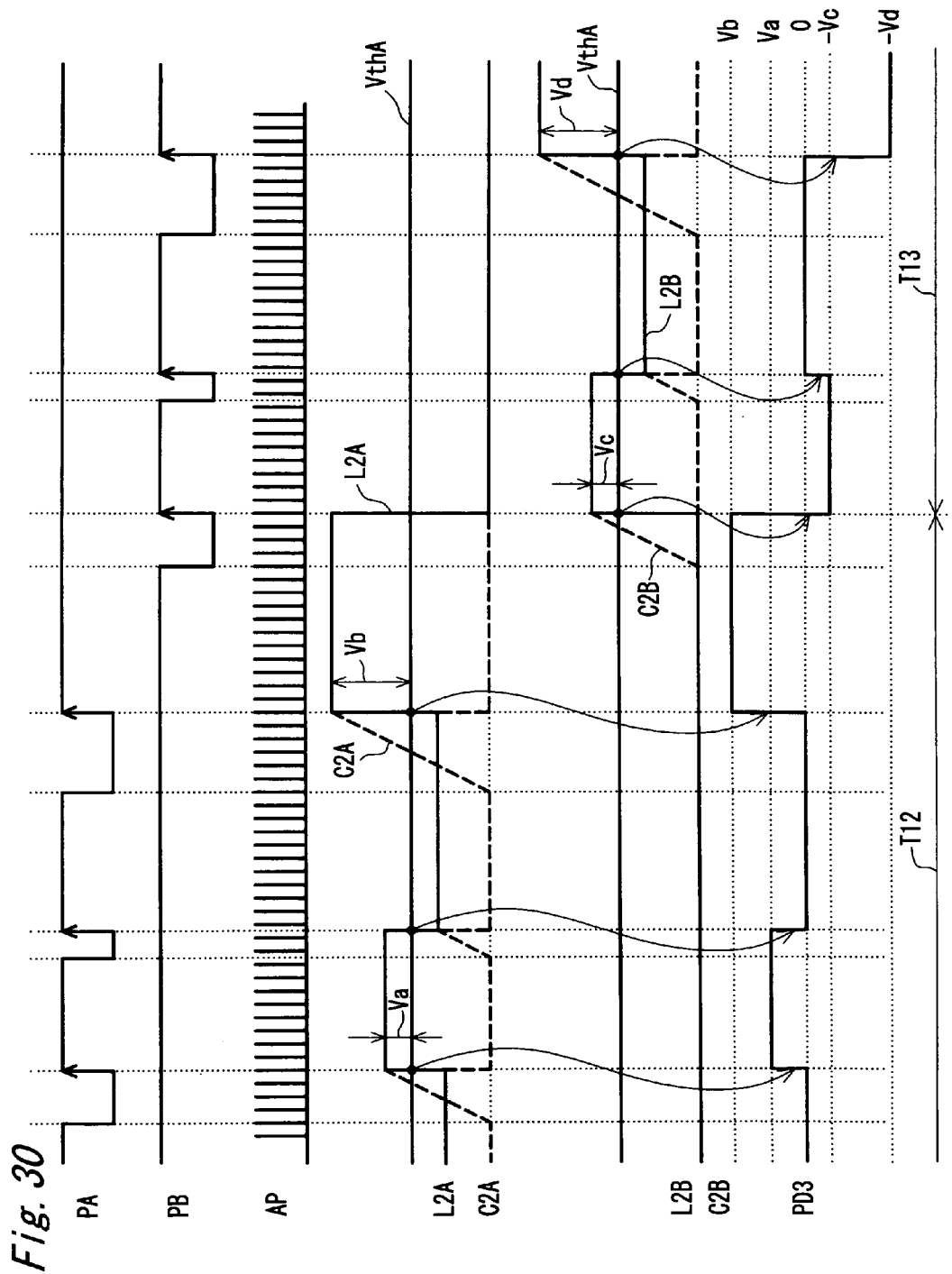
FIG. 30 is a timing chart describing the operation of the phase difference generator 80C in FIG. 29.

FIG. 29 is a block diagram of the phase difference generator 80C. This phase difference generator 80C differs from the phase difference generator 80B of the third embodiment in having phase difference detector 83C and amplifier 87. Operation of the phase difference generator 80C is described with reference to the timing chart in FIG. 30. Note that the timing chart in FIG. 30 simply describes the operation of the phase difference generator 80C and the waveforms of the actual operating signals differ from those shown in the figure.

The process through comparing the phase of the current zero cross signal IZ and the phase of the U-phase sinusoidal signal sinU, outputting pulse signal PA and pulse signal PB, and outputting latch data L2A and L2B from phase difference calculators 84A and 84B, is the same as in the third embodiment of the invention and further description thereof is thus omitted below.

The phase difference detector 83C compares latch data L2A, L2B with threshold value VthA from threshold value setting unit 86, and outputs the result as phase difference signal PD3 through amplifier 87. If latch data L2A, L2B exceed threshold value VthA, phase difference detector 83C directly outputs the difference therebetween. In period T12 when pulse signal PA is output, output is positive. In period T13 when pulse signal PB is output, output is negative. The amplifier 87 amplifies the output of phase difference detector 83C by the amplifier gain, and outputs the result as phase difference signal PD3. PD3 in FIG. 30 represents an amplifier 87 gain of 1. As a result, if latch data L2A exceeds threshold value VthA by Va and Vb in period T12 while pulse signal PA is output, positive Va and Vb are output. If latch data L2B exceeds threshold value VthA by Vc and Vd in period T13 while pulse signal PB is output, −Vc and −Vd are output.

Control voltage generator 40A controls the phase according to the value of phase difference signal PD3. That is, if phase difference signal PD3 is Va, the phase is controlled proportionally to Va to advance the phase of control voltage Vuin. If phase difference signal PD3 is −Vc, the phase is controlled proportionally to Vc to delay the phase of control voltage Vuin. Because the phase is thus controlled according to the phase difference detected by phase difference generator 80C, phase convergence is better compared with the stepped control controlling the phase with two-valued phase advance/delay control as in the foregoing first to third embodiments.

The amplifier 87 gain in this fourth embodiment is constant, but the gain could be variable. Arrangements using an amplifier for proportional control (P control), proportional-integration control (PI control), or proportional-integral-derivative control (PID control) could alternatively be used to yield even better phase convergence. The threshold value VthA can also be changed as desired, and could be set to zero.

Furthermore, the target value of the phase difference of the motor current Iu to the control voltage Vuin is effectively set to zero above, but a specific non-zero value could be used instead. Methods of using a specific non-zero value include shifting the phase of the reference signal U0 of reference signal generator 81 in phase difference generator 80B a specific amount, adding a specific difference to the threshold value applied to latch data L2A and L2B, or adding a specific pulse width difference to the pulse signals PA, PB, and the target value can thus be easily set to a desired non-zero value. Thus comprised, an optimal phase relationship, such as aligning the phase of the induced voltage and motor current, can be set as in the foregoing second embodiment. Furthermore, in addition to the benefits of the second embodiment described above, excessive phase control near the ideal phase relationship can be eliminated, and stable, high efficiency sensor-less can be achieved.

Furthermore, if the target value Vth is varied according to the rotor speed as shown in FIG. 23, the induced voltage and motor current phase can be synchronized regardless of the rotor speed. Because the rotor speed varies according to the torque control signal EC, the induced voltage and motor current phase can be synchronized irrespective of the rotor speed if target value Vth varies according to the torque control signal EC.

This embodiment of the invention thus enables stable sensor-less drive with good phase control convergence without requiring a non-activation period for rotor position detection.

Embodiment 5

Figure 31:
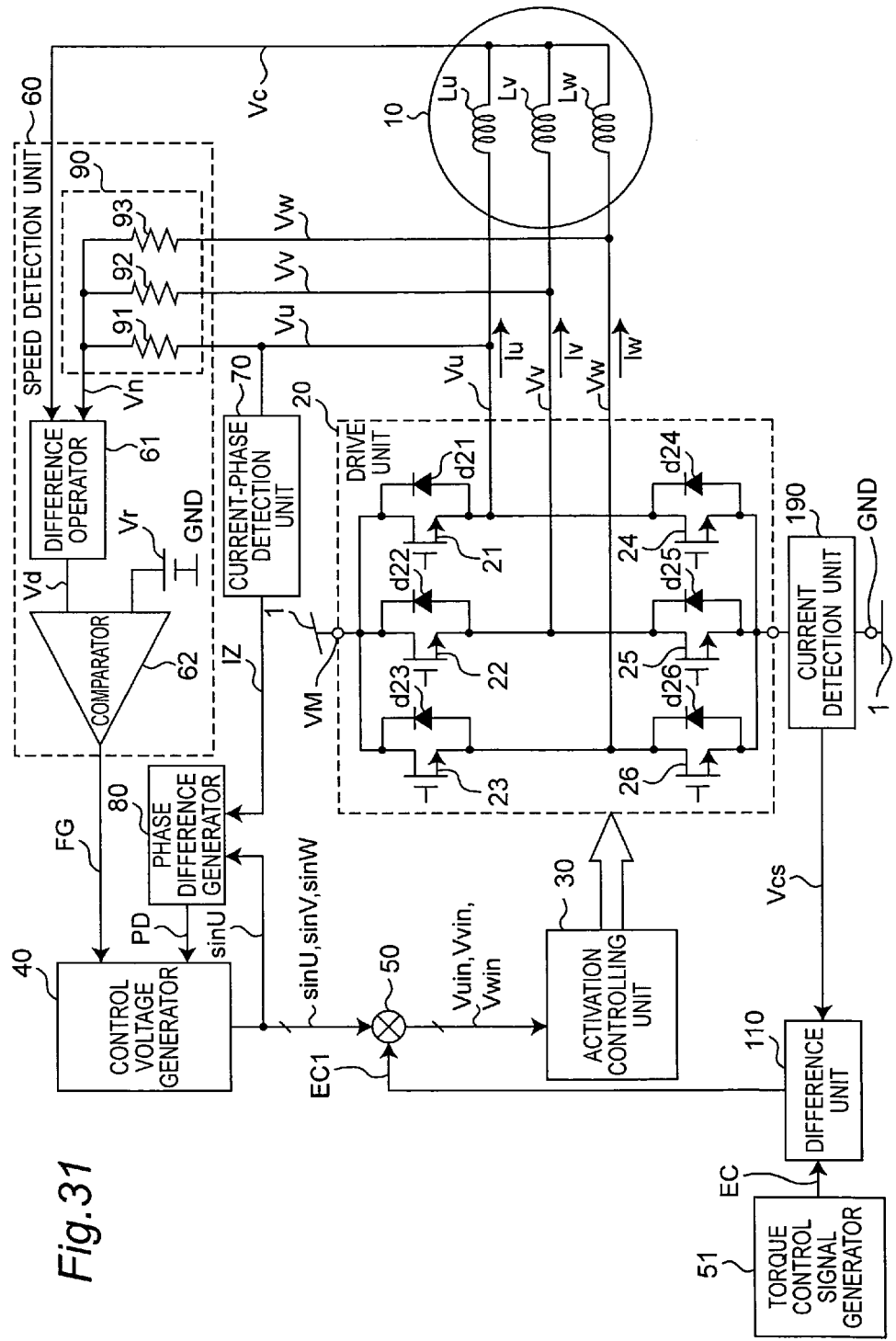
FIG. 31 is a block diagram showing the arrangement of the motor drive apparatus in a fifth embodiment of the invention.

A motor drive apparatus and motor drive method according to a fifth embodiment of the invention are described next with reference to FIG. 31 and FIG. 32. FIG. 31 is a block diagram of a motor drive apparatus according to this embodiment of the invention. This embodiment differs from the first embodiment in the addition of a current detection unit 190 and difference unit 110. Other aspects of the arrangement and operation of this embodiment are the same as described in the first embodiment.

Figure 32:
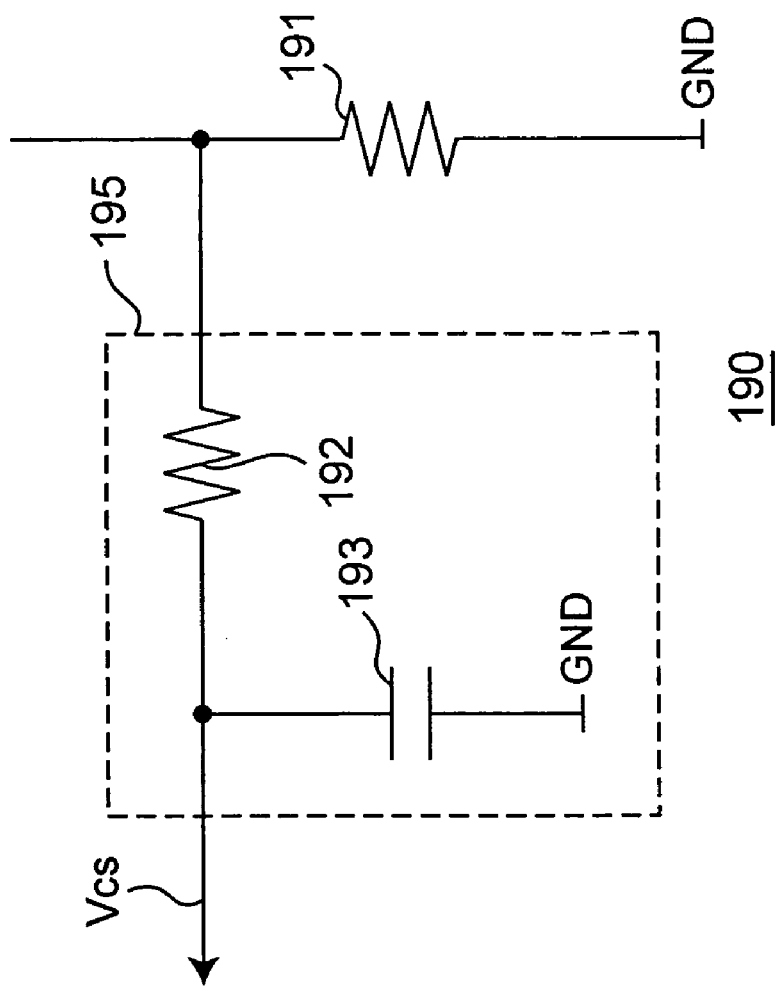
FIG. 32 is a circuit diagram showing the arrangement of the current detection unit 190 in FIG. 31.

FIG. 32 is a block diagram of the current detection unit 190. The current detection unit 190 is composed of current detection resistance 191, and a lowpass filter 195 composed of resistance 192 and capacitance 193. The current detection resistance 191 of current detection unit 190 detects the current flow through drive unit 20. The lowpass filter 195 then averages the voltage detected by current detection resistance 191 and outputs the result as current detection signal Vcs to difference unit 110. The current detection signal Vcs detected by current detection unit 190 represents the average current flow through drive unit 20, and denotes the amount of motor current.

The difference unit 110 is a difference amplifier circuit, for example, that amplifies the difference between torque control signal EC and the current detection signal Vcs output from current detection unit 190, and outputs the result as difference signal EC1 to multiplier 50. Current control causing the current detection signal Vcs detected by current detection unit 190 to become substantially equal to the torque control signal EC is thus applied. This arrangement enables controlling the average current flow through drive unit 20. Stable sensor-less drive during acceleration, deceleration, and constant speed operation of the motor 10 is thus possible while applying sensor-less drive that does not require a non-activation period for rotor position detection. Response is also excellent because current flow through drive unit 20 is constantly detected.

This fifth embodiment is described above based on the first embodiment, but stable sensor-less drive is also possible in the second, third, and fourth embodiments by similarly providing a difference unit 110 and current detection unit 190.

The arrangement of the current detection unit 190 shall also not be limited to the foregoing, and any arrangement which can detect the average current flow through the drive unit 20 can be used.

Embodiment 6

Figure 33A:
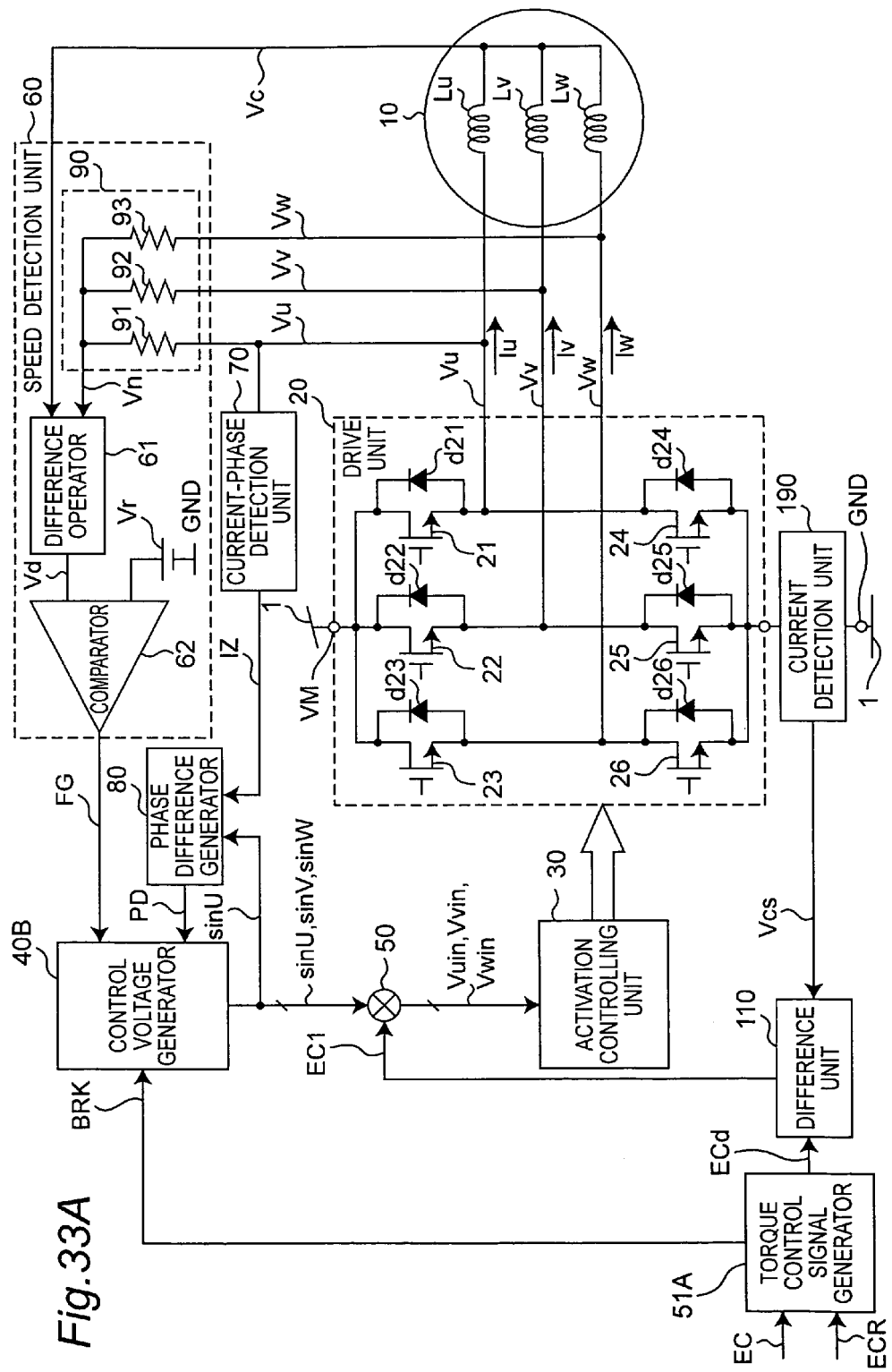
FIG. 33A is a block diagram showing the arrangement of a motor drive apparatus according to a sixth embodiment of the invention.

A motor drive apparatus and motor drive method according to a sixth embodiment of the invention are described next with reference to FIG. 33A to FIG. 38B. FIG. 33A is a block diagram of a motor drive apparatus according to this embodiment of the invention. This embodiment differs from the first embodiment in the arrangement of the control voltage generator 40B and torque control signal generator 51A, inputting signal BRK from the torque control signal generator 51A to control voltage generator 40B, and the addition of current detection unit 190 and difference unit 110. Other aspects of the arrangement and operation of this embodiment are the same as described in the first embodiment.

Figure 33B:
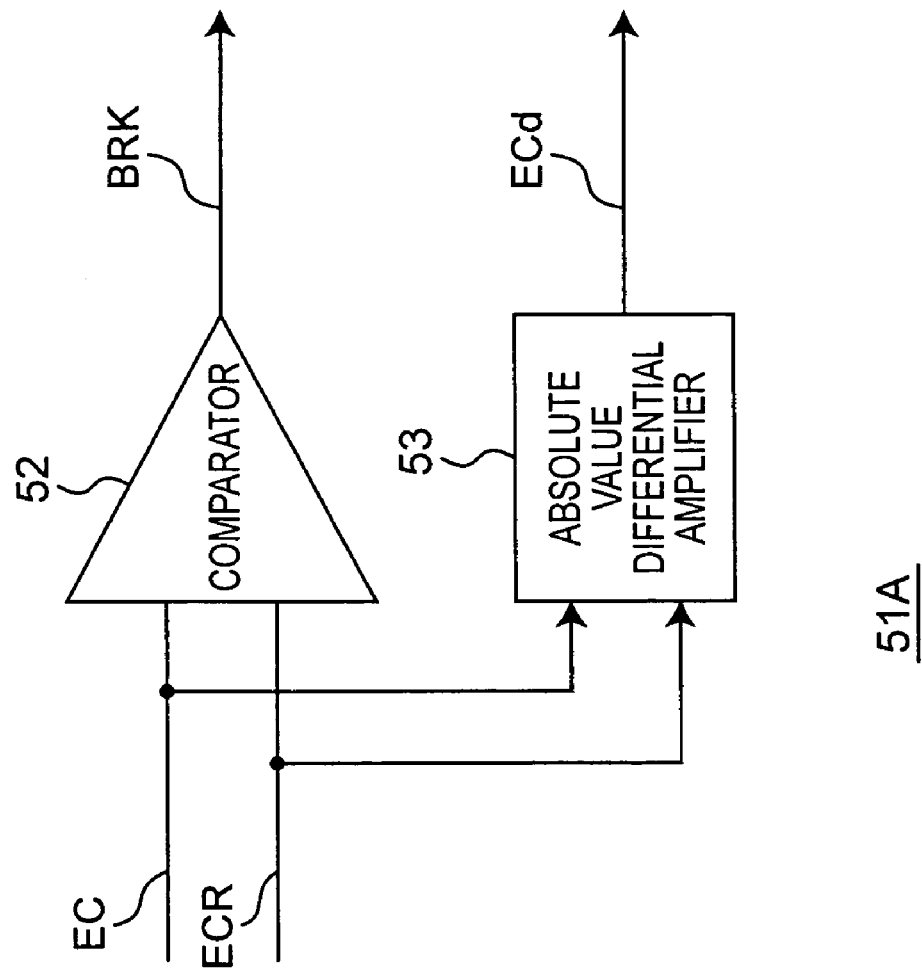
FIG. 33B is a block diagram showing the arrangement of the torque control signal generator 51A in FIG. 33A.
Figure 33C:
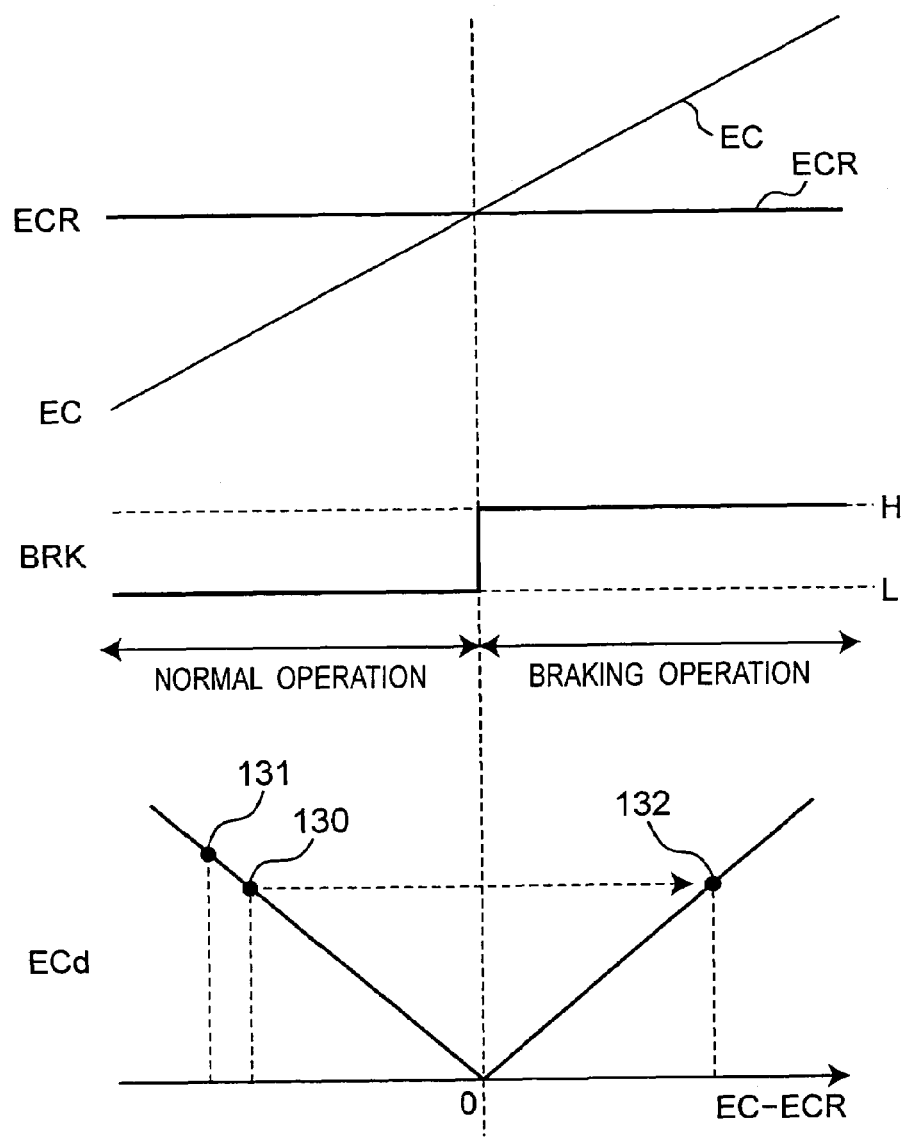
FIG. 33C is a timing chart describing the operation of the torque control signal generator 51A in FIG. 33A.

FIG. 33B is a block diagram showing the arrangement of the torque control signal generator 51A, and FIG. 33C is a timing chart describing the operation of the torque control signal generator 51A. The torque control signal generator 51A is composed of a comparator 52 and an absolute value differential amplifier 53.

Torque control signal EC and reference signal ECR are input to comparator 52, which then outputs signal BRK to control voltage generator 40B. Signal BRK goes high when torque control signal EC is greater than reference signal ECR, and goes low when torque control signal EC is less than reference signal ECR. The motor 10 is driven by switching between normal operation and braking operation according to the state of signal BRK. Braking operation can be accomplished by reverse braking unconditionally applying a reverse current to the motor, and short braking which brakes the motor using the energy generated by the motor. The following description assumes that reverse braking is used.

Note that short braking using signal BRK is possible by turn all of the upper power transistors 21 to 23 or all of the lower power transistors 24 to 26 in the drive unit 20 on.

The torque control signal EC and reference signal ECR are also input to absolute value differential amplifier 53, which outputs signal ECd to difference unit 110. This signal ECd is the absolute value of the difference between torque control signal EC and reference signal ECR amplified by a specific gain, and the torque of motor 10 is controlled using the difference signal of signal ECd and the current detection signal Vcs output from current detection unit 190 output by difference unit 110.

More specifically, the comparator 52 in torque control signal generator 51A outputs signal BRK which between normal operation and braking operation based on the relative strength of reference signal ECR and torque control signal EC, and absolute value differential amplifier 53 outputs signal ECd proportionally to the absolute value of the difference between reference signal ECR and torque control signal EC.

The operation of torque control signal generator 51A is described next with reference to FIG. 33C. Torque is controlled during normal operation by inputting a torque control signal EC less than reference signal ECR (such as point 130). Rotor speed can be increased by setting torque control signal EC even lower relative to reference signal ECR (such as point 131).

To brake the motor after driving at point 130 in FIG. 33C, torque control signal EC is set to a level greater than reference signal ECR (such as point 132). The braking torque is controlled at this time according to the level of torque control signal EC relative to reference signal ECR.

Figure 34:
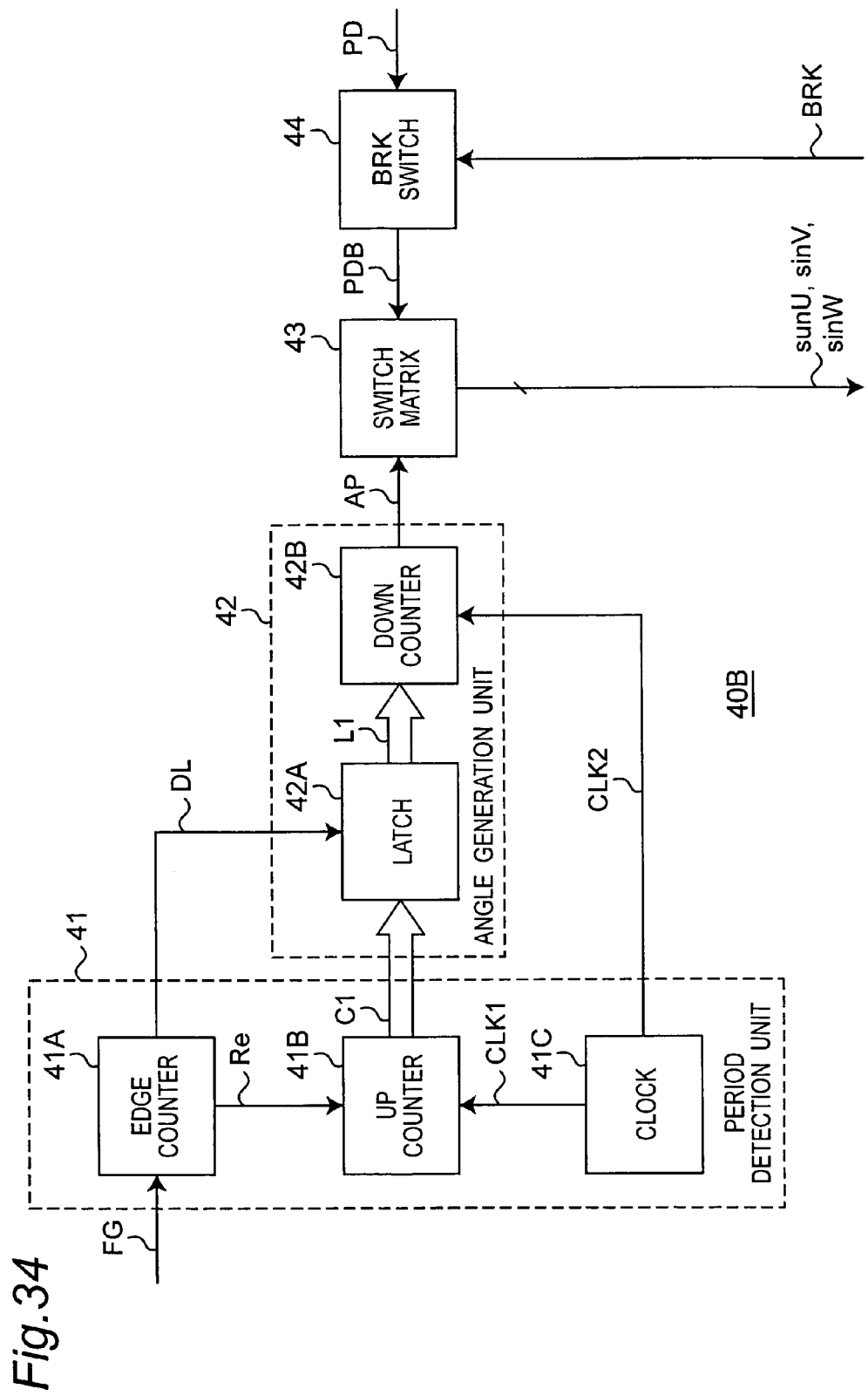
FIG. 34 is a block diagram showing the arrangement of the control voltage generator 40B in FIG. 33A.
Figure 35:
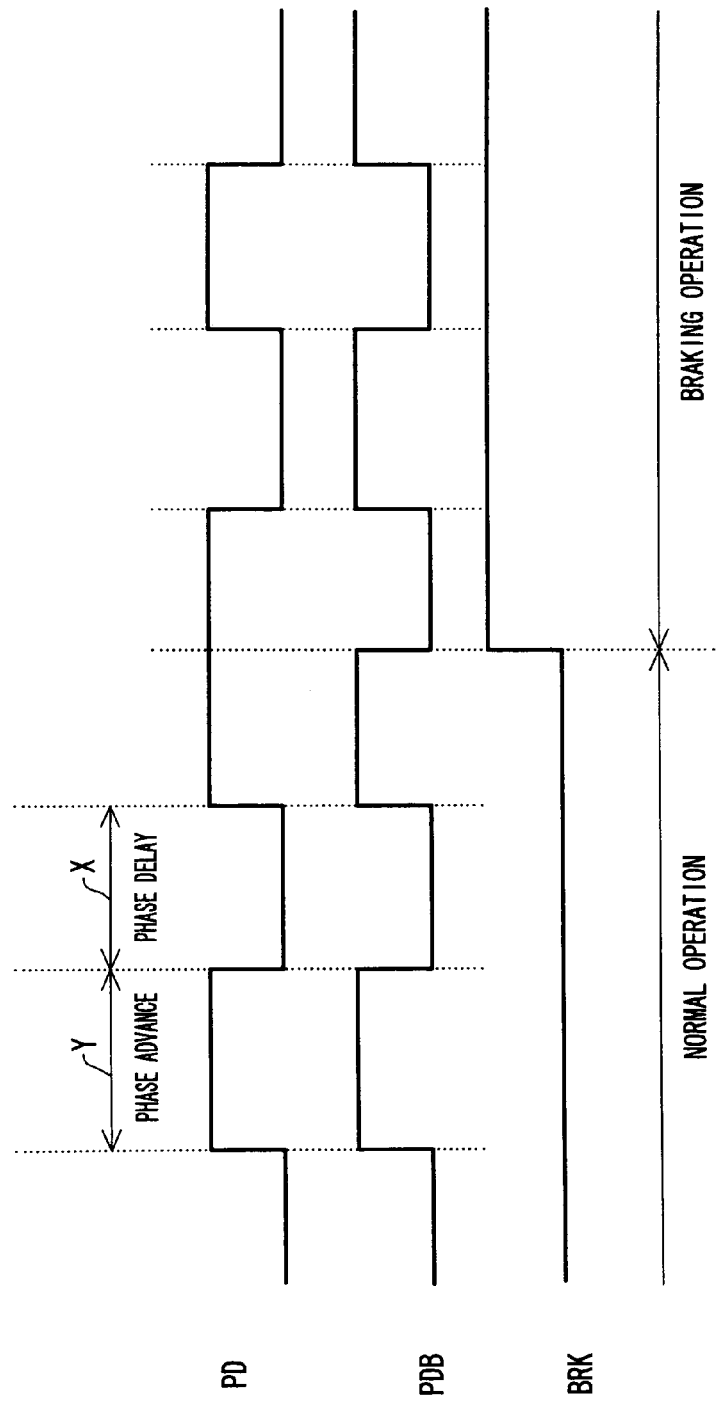
FIG. 35 is a timing chart describing the operation of the BRK switch 44 in FIG. 34.

FIG. 34 is a block diagram of the control voltage generator 40B. The control voltage generator 40B differs from the control voltage generator 40 in the first embodiment in additionally comprising BRK switch 44. FIG. 35 is a timing chart describing the operation of BRK switch 44. Signal BRK is input to BRK switch 44. During normal operation (when signal BRK is low), BRK switch 44 outputs phase difference signal PD from phase difference generator 80 directly to switch matrix 43. During braking operation (when signal BRK is high), BRK switch 44 inverts phase difference signal PD from phase difference generator 80 and outputs the inverse phase difference signal PDB to switch matrix 43.

The inverse phase difference signal PDB during normal operation (when signal BRK is low) is the same as phase difference signal PD and U-phase sinusoidal signal sinU is generated the same as described in the first embodiment. Phase control during normal operation is described briefly with reference to FIG. 13.

When phase difference signal PD is low, current zero cross signal IZ is phase delayed to reference signal U0. The phase of U-phase sinusoidal signal sinU is therefore advanced by specific angle AS at the zero cross of the falling edge of U-phase sinusoidal signal sinU (Z1 in FIG. 13).

When phase difference signal PD is high, current zero cross signal IZ is phase advanced to reference signal U0. The phase of U-phase sinusoidal signal sinU is therefore delayed by specific angle AS at the zero cross of the falling edge of U-phase sinusoidal signal sinU (Z2 in FIG. 13).

During normal operation, the phase of U-phase sinusoidal signal sinU is thus delayed if the phase of current zero cross signal IZ is advanced to the phase of reference signal U0, but if the phase of current zero cross signal IZ is delayed relative to the phase of reference signal U0, phase control advances the phase of U-phase sinusoidal signal sinU.

The method of generating U-phase sinusoidal signal sinU during reverse braking (when signal BRK is high) is described next with reference to FIG. 36.

The inverse phase difference signal PDB during reverse braking is the phase difference signal PD inverted by the BRK switch 44. The direction of phase control is thus the reverse of that used during normal operation. Phase control during reverse braking is described more specifically below.

Figure 36:
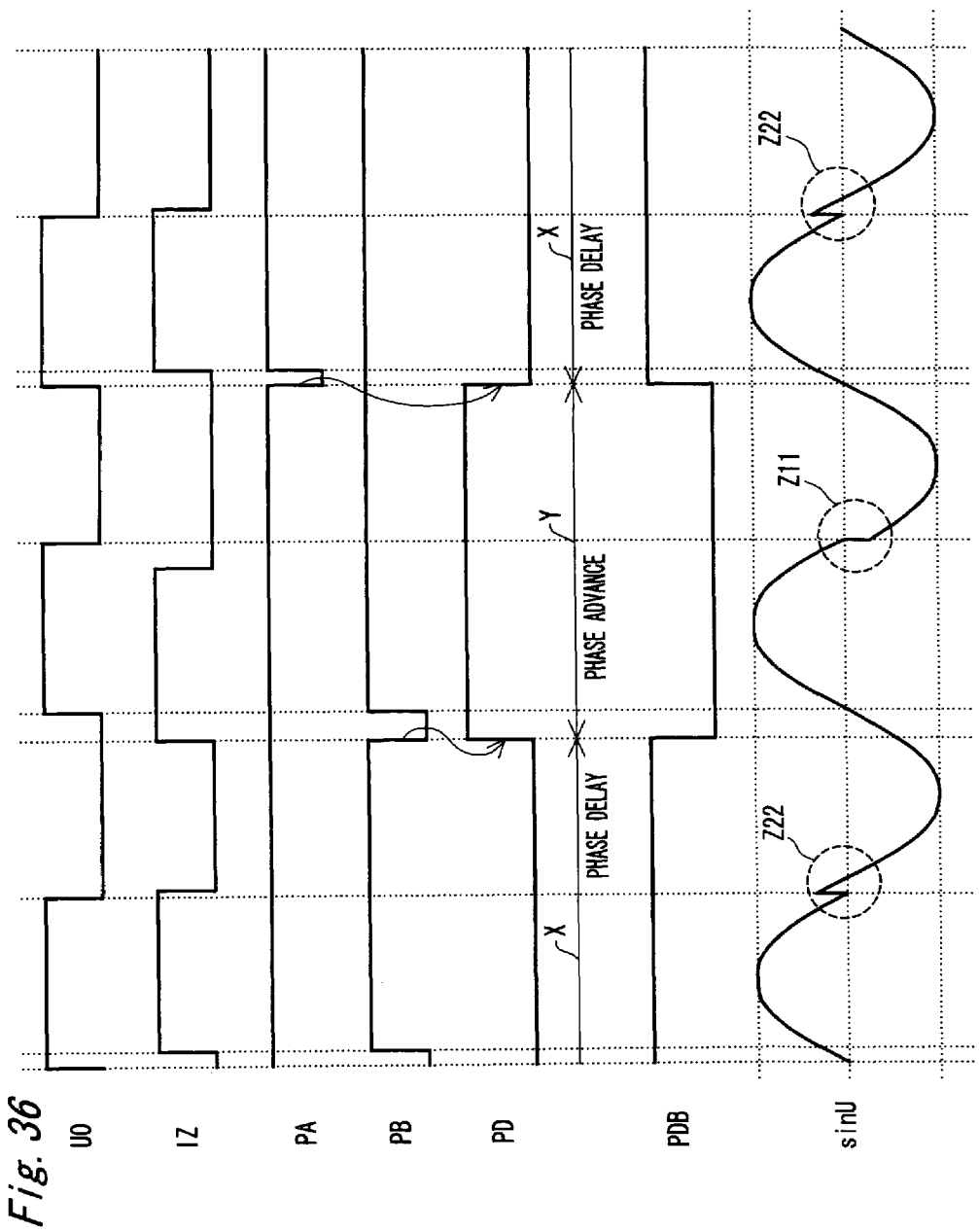
FIG. 36 is a timing chart describing the operation of the control voltage generator 40B in FIG. 34.

When inverse phase difference signal PDB is low, that is, when current zero cross signal IZ is phase advanced relative to reference signal U0, the phase of U-phase sinusoidal signal sinU is advanced by specific angle AS at the zero cross of the falling edge of U-phase sinusoidal signal sinU (Z11 in FIG. 36).

Conversely, if inverse phase difference signal PDB is high, that is, current zero cross signal IZ is phase delayed to reference signal U0, the phase of U-phase sinusoidal signal sinU is delayed by specific angle AS at the zero cross of the falling edge of U-phase sinusoidal signal sinU (Z22 in FIG. 36).

If the phase of current zero cross signal IZ is thus advanced relative to reference signal U0 during reverse braking, phase control advances the phase of U-phase sinusoidal signal sinU, and if current zero cross signal IZ is delayed relative to reference signal U0, the phase of U-phase sinusoidal signal sinU is delayed.

Why reverse braking is thus possible by simply reversing the direction of phase control is described below.

FIG. 37A and FIG. 37B show the phase relationship for the U phase only of the motor current, induced voltage, and control voltage during reverse braking, and current zero cross signal IZ and reference signal U0 with an edge at the zero cross of the control voltage. Note that when switching from normal operation to braking operation, a motor current that is reverse phase to the phase of the induced voltage flows, and the motor current is therefore larger than during normal operation. Control reducing the amplitude of control voltage Vuin is therefore applied by current detection unit 190 and difference unit 110.

FIG. 37A shows the phase relationship when U-phase control voltage Vuin is advanced phase Ph1 to U-phase induced voltage Eu. The U-phase motor current Iu at this time is thus advanced phase Phd to U-phase control voltage Vuin. During normal operation, the control voltage generator 40B delays the phase of the control voltage (in the direction of arrow 120 in FIG. 37A) if the phase of U-phase motor current Iu is detected to be advanced as described in the first embodiment, and the phase of the motor current is thus delayed. Conversely, if the U-phase motor current Iu is detected to be delayed, the phase of the control voltage is advanced, thus advancing the phase of the motor current.

By repeating this control loop the U-phase control voltage Vuin and U-phase motor current Iu are driven at substantially the same phase as U-phase induced voltage Eu as described in the first embodiment (see FIG. 22A and FIG. 22B).

On the other hand, if the phase of the U-phase motor current Iu is advanced and the control voltage generator 40B controls the phase of the control voltage to advance (the direction of arrow 121 in FIG. 37A), that is, reverses the direction of phase control from that during normal operation, the phase of the motor current advances, and the phase of U-phase control voltage Vuin and the phase of U-phase motor current Iu are synchronized at the phase shown in FIG. 37B. Because the U-phase motor current Iu drives the motor nearly reverse phase to the U-phase induced voltage Eu, braking torque is produced and the motor 10 slows down its speed.

Operation when the U-phase motor current Iu is advanced to U-phase control voltage Vuin is described above. When the phase of U-phase motor current Iu is delayed relative to U-phase control voltage Vuin, phase control still is reversed from the directions used during normal operation, that is, phase is controlled in the phase delay direction. Reverse braking control is thus enabled by reversing the direction of phase control based on signal BRK input.

By thus reversing the direction of phase control during reverse braking relative to the direction used during normal operation, sensor-less drive without requiring a non-activation period for rotor position detection is possible during both reverse braking and normal operation. More specifically, vibration and acoustic noise resulting from the non-activation period can also be reduced during reverse braking.

Figures 38A, 38B:
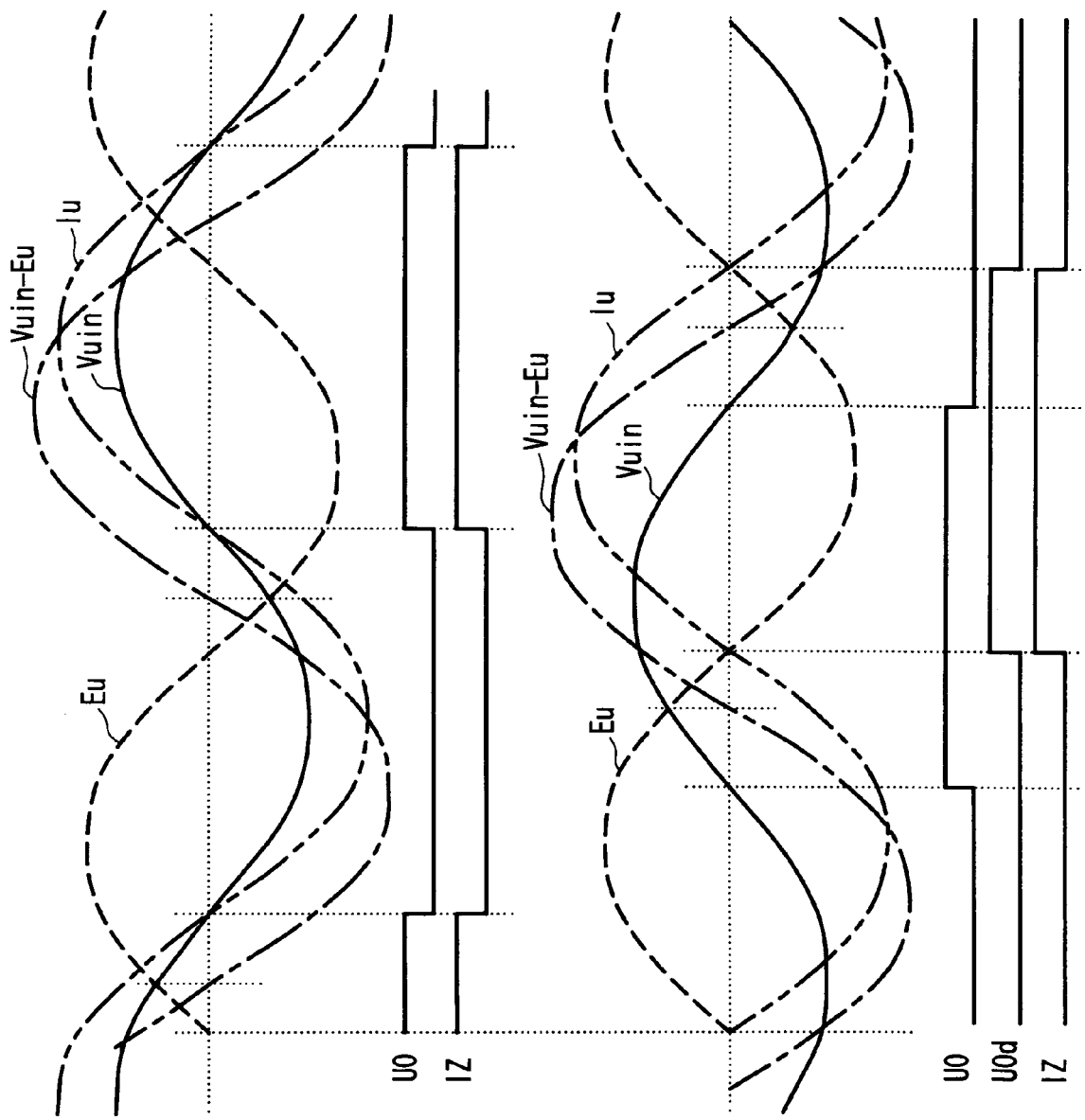
FIG. 38A is a timing chart describing the phase relationship of the control voltage and motor current during reverse braking.
FIG. 38B is a timing chart describing the phase relationship of the control voltage and motor current during reverse braking when the brake torque is greatest.
Figure 39:
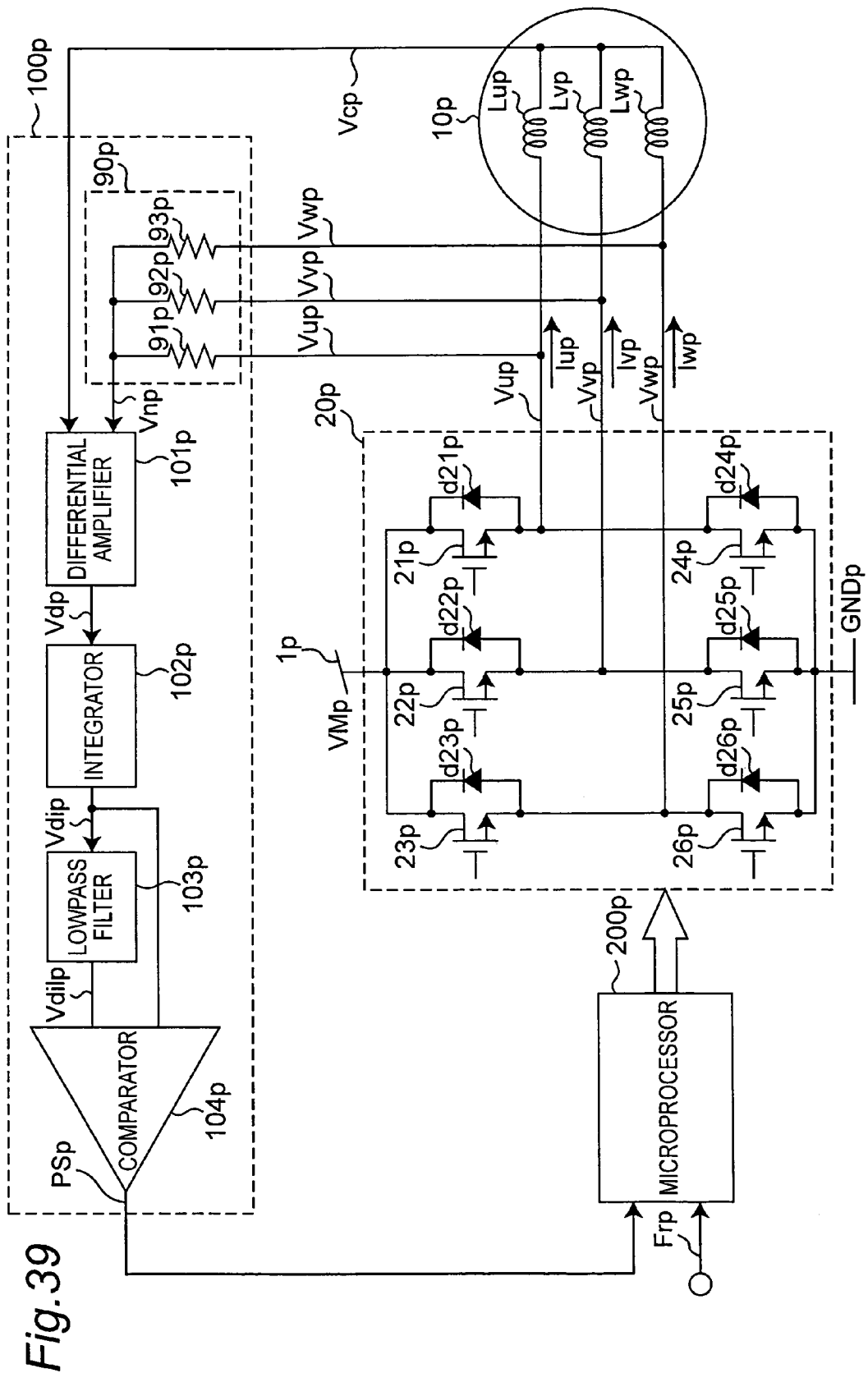
FIG. 39 is a block diagram showing the arrangement of a conventional motor drive apparatus.
Figure 40:
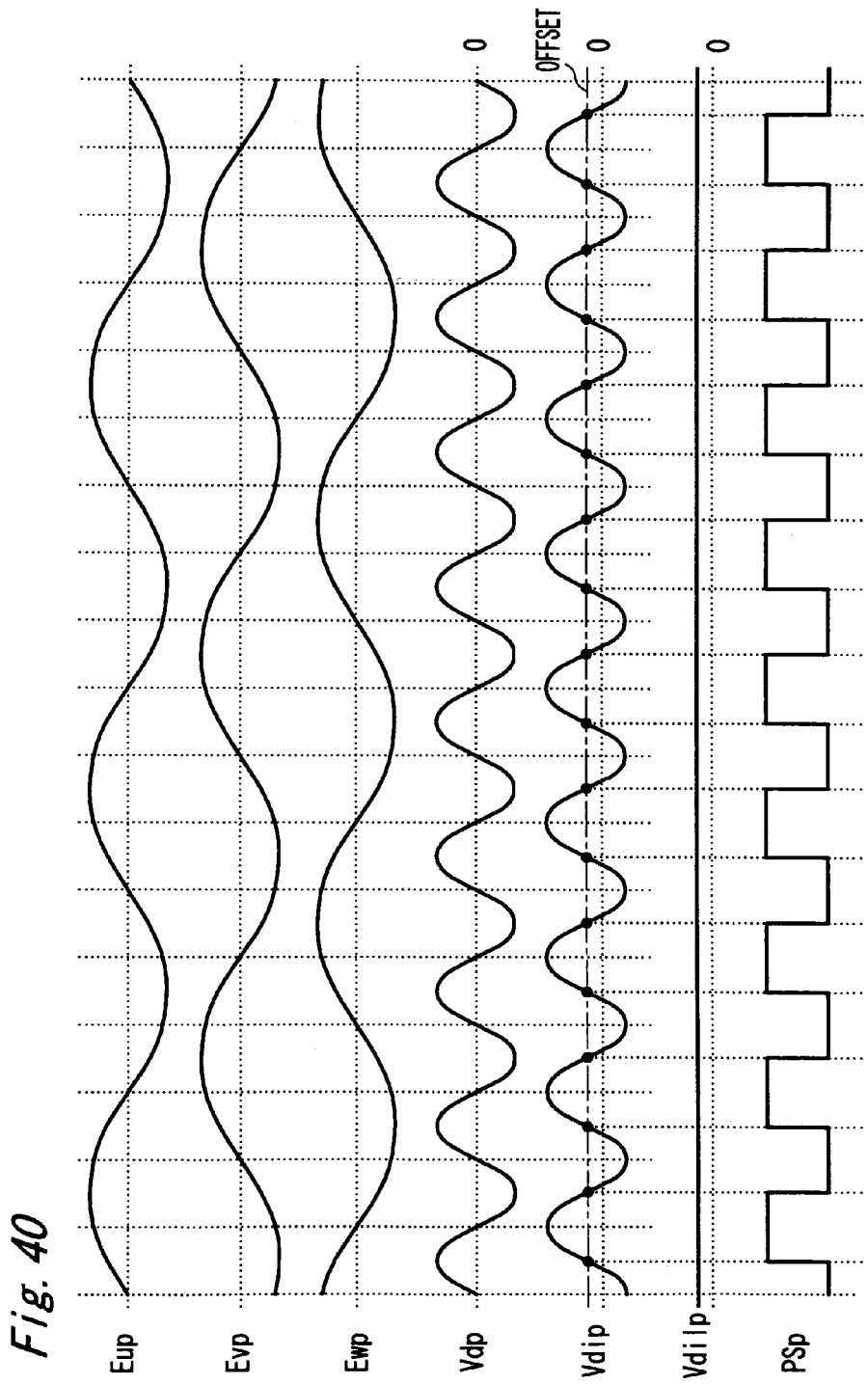
FIG. 40 is a timing chart describing the operation of the position detection unit 100*p* of the conventional motor drive apparatus shown in FIG. 39.

As shown in FIG. 37B, the phase relationship between the U-phase induced voltage Eu and U-phase motor current Iu during reverse braking is not completely reverse phase. More specifically, because reverse braking using a low brake torque is applied, the reverse braking time tends to increase. FIG. 38A and FIG. 38B show the phase relationship of when the brake torque is increased, that is, the induced voltage and motor current are reverse phase. FIG. 38A is the same as FIG. 37B, and phase control drives the phase difference between the reference signal U0 and current zero cross signal IZ actually to zero. FIG. 38B shows the phase relationship when the brake torque is greatest, that is, when the induced voltage and motor current are reverse phase. The signals shown in FIG. 38B differ from those in FIG. 38A in that the reference signal is changed from U0 to U0*d*. That is, in FIG. 38B phase control drives the actual phase difference between current zero cross signal IZ and the new reference signal U0*d* to zero. By thus changing the reference signal from U0 to the phase-delayed U0*d*, the U-phase motor current Iu can be drive reverse phase to U-phase induced voltage Eu, that is, brake torque can be maximized. Thus changing the reference signal from U0 to phase-delayed U0*d* in addition to reversing the direction of phase control during reverse braking thus enables reverse braking with a shorter braking time.

The phase delay of the new reference signal U0*d* to reference signal U0 is preferably increased as the rotor speed increases, and preferably increased as the torque control signal level increases. Further preferably, the phase delay preferably decreases monotonically according to the rotor speed during deceleration. This is because if the rotor speed decreases due to reverse braking, the induced voltage drops proportionally, and if the phase is controlled using the same new reference signal U0*d*, the phase of the induced voltage and motor current will shift from reverse phase.

The reason for adding current detection unit 190 and difference unit 110 in the fifth and sixth embodiments is described next.

If reverse braking is applied during high speed operation, the motor current becomes significantly higher than during normal operation and a large current flow continues. If the motor drive apparatus of the fifth embodiment is composed in a semiconductor IC device, heat can cause the motor drive apparatus to malfunction and possibly even fail completely. This problem is avoided, however, as a result of the current detection unit 190 detecting the current flow through the drive unit 20 and the difference unit 110 controlling the amplitude of the drive control signal. Furthermore, inputting the torque control signal EC directly to the multiplier 50 offers the advantage of superior response compared with an arrangement controlling the amplitude of the drive control signal.

As described above, the present invention is also effective with reverse braking. More specifically, if the direction of phase control is reversed from that during normal operation by signal BRK, sensor-less drive not requiring a non-activation period for rotor position detection is enabled as during normal operation. Vibration and acoustic noise accompanying the non-activation period can thus also be reduced during reverse braking. Furthermore, delaying the phase of the reference signal during reverse braking relative to the phase of the reference signal during normal operation enables braking operation with the maximum brake torque, and can thus shorten the braking time.

The sixth embodiment of the invention shall not be limited to the phase control method of the first embodiment, and the same effect is afforded using the phase control method of the second to fourth embodiments by reversing the direction of phase control from that during normal operation.

It will thus be apparent that the motor drive apparatus and motor drive method of the present invention as described hereinabove enables reducing both cost and size by sensorless drive. Vibration and acoustic noise can also be reduced because a non-activation period is not required for rotor position detection.

Furthermore, a loss of efficiency resulting from rotor position detection error, and undulations and loss of synchronization due to insufficient torque are also prevented, and high efficiency, stable motor drive is thus possible.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor drive apparatus for driving an N phase (where N is an integer of 2 or more) motor by an N phase PWM drive signal, comprising:
 a speed detection unit operable to detect the rotor speed of said N phase motor and outputting a speed signal containing a frequency component related to said rotor speed;
 a drive control signal generator operable to generate a first voltage drive control signal and a second voltage drive control signal;
 a drive signal generator operable to generate said PWM drive signal based on said first voltage drive control signal;
 a drive output unit operable to supply power to said N phase motor based on said PWM drive signal;
 a current phase detection unit operable to detect a zero cross phase of a motor current flowing to said N phase motor; and
 a phase difference generator operable to detect a phase difference between the zero cross phase of said motor current and the phase of said second voltage drive control signal to generate a phase difference signal;
 wherein said drive control signal generator comprises:
  a control voltage generator operable to output said second voltage drive control signal at a frequency determined by said speed signal, the phase of said second voltage drive control signal being controlled based on said phase difference signal;
  a torque control signal generator operable to generate a torque control signal specifying the torque of said N phase motor; and
  a multiplier operable to control the amplitude of said first voltage drive control signal based on said second voltage drive control signal and said torque control signal.

2. The motor drive apparatus described in claim 1, further comprising:
 a current detection unit operable to detect current flowing through said drive output unit, and outputting a current detection signal; and
 a difference unit operable to generate a difference signal for said torque control signal and said current detection signal;
 wherein said multiplier controls the amplitude of said first voltage drive control signal based on said difference signal.

3. The motor drive apparatus described in claim 1, further comprising:
 a target value setting unit operable to set a target value;
 wherein said drive control signal generator applies control driving said phase difference signal to substantially equal said target value.

4. The motor drive apparatus described in claim 3, wherein said drive control signal generator applies control based on the polarity of the difference between said phase difference signal and said target value.

5. The motor drive apparatus described in claim 3, wherein said drive control signal generator applies control based on the polarity of the difference between said phase difference signal and said target value, and the absolute value of said difference.

6. The motor drive apparatus described in claim 3, wherein said drive control signal generator applies control based on the polarity of the difference between said phase difference signal and said target value when the absolute value of said difference is greater than or equal to a specified threshold value.

7. The motor drive apparatus described in claim 3, wherein when the absolute value of the difference between said phase difference signal and said target value is greater than or equal to a specified threshold value, said drive control signal generator applies control based on the amount by which said threshold value is exceeded.

8. The motor drive apparatus described in claim 3, wherein said drive control signal generator applies control delaying the phase of said second voltage drive control signal when said phase difference signal is less than or equal to said target value, and advancing the phase of said second voltage drive control signal when said phase difference signal is greater than or equal to said target value.

9. The motor drive apparatus described in claim 3, further comprising:
 a braking period detection unit operable to detect a braking period during which a brake of said N phase motor is applied;
 wherein said drive control signal generator applies control advancing the phase of said second voltage drive control signal when said phase difference signal is less than or equal to said target value during said braking period, and delaying the phase of said second voltage drive control signal when said phase difference signal is greater than or equal to said target value.

10. The motor drive apparatus described in claim 3, wherein said target value increases monotonically according to the increase in said rotor speed.

11. The motor drive apparatus described in claim 3, wherein said target value varies according to said torque control signal level.

12. The motor drive apparatus described in claim 3, wherein said target value is set based on the relationship between said rotor speed and said phase difference signal.

13. The motor drive apparatus described in claim 3, wherein said target value is zero.

14. The motor drive apparatus described in claim 1, wherein said N phase motor includes N phase windings each connected commonly at one end to a common node terminal and the other end generating N phase motor terminal voltages representing motor terminal voltages of said N phase motor; and
 said speed detection unit comprises a pseudo neutral point generating unit operable to generate a pseudo neutral point voltage representing the average of said N motor terminal voltages; and
  a neutral point comparison unit for comparing the motor neutral point voltage at said common node terminal with said pseudo neutral point voltage.

15. The motor drive apparatus described in claim 14, wherein said neutral point comparison unit comprises:
 a difference unit operable to generate a difference voltage between said motor neutral point voltage and said pseudo neutral point voltage; and
 a comparator for comparing said difference voltage with a specific reference voltage.

16. The motor drive apparatus described in claim 1, wherein said drive control signal generator comprises a period detection unit for detecting the period of said speed signal, and said second voltage drive control signal generated by said drive control signal generator contains information denoting said period.

17. The motor drive apparatus described in claim 16, wherein said drive control signal generator comprises an averaging processor for calculating the average period detected by said period detection unit, and said second voltage drive control signal generated by said drive control signal generator contains information denoting average period.

18. The motor drive apparatus described in claim 17, wherein said drive control signal generator comprises an angle generation unit for dividing said period detected by said period detection unit into a specific ratio, and generates said second voltage drive control signal based on output from said angle generation unit.

19. The motor drive apparatus described in claim 1, wherein said drive control signal generator generates said second voltage drive control signal representing a sinusoidal wave.

20. The motor drive apparatus described in claim 1, wherein said drive control signal generator generates said second voltage drive control signal containing a harmonic component contained in the induced voltage of said N phase motor.

21. The motor drive apparatus described in claim 1, wherein said drive control signal generator generates said second voltage control signal containing a third harmonic component.

22. The motor drive apparatus described in claim 1, wherein said current phase detection unit comprises:

at least one of a first comparator for comparing a motor terminal voltage of said N phase motor and a specific high level with a specific first offset level, and a second comparator for comparing said motor terminal voltage and a specific low level with a specific second offset level; and a phase detection unit for detecting the phase of said motor current based on output from at least one of said first comparator and second comparator.

23. The motor drive apparatus described in claim 1, wherein said current phase detection unit detects at least one phase of said motor current; and said phase difference generator outputs the phase difference between said at least one phase and at least one phase of said second voltage drive control signal.

24. The motor drive apparatus described in claim 1, further comprising a drive control signal setting unit operable to set the frequency of said second voltage drive control signal; and a low speed period detection unit operable to detect a low speed period denoting startup or low speed operation of said N phase motor;

wherein said drive control signal generator generates said second voltage drive control signal based on the output frequency of said drive control signal setting unit in said low speed period.

25. The motor drive apparatus described in claim 24, wherein said second voltage drive control signal is a signal having a non-activation period in said low speed period, and detects the magnetic pole position of the rotor during said non-activation period.

26. A motor drive method for driving an N phase (where N is an integer of 2 or more) motor by an N phase PWM drive signal, comprising:

detecting the rotor speed of said N phase motor and outputting a speed signal containing a frequency component related to said rotor speed;

generating a first voltage drive control signal and a second voltage drive control signal;

generating said PWM drive signal based on said first voltage drive control signal;

supplying power to said N phase motor based on said PWM drive signal;

detecting a zero cross phase of a motor current flowing to said N phase motor; and detecting a phase difference between the zero cross phase of said motor current and the phase of said second voltage drive control signal to generate a phase difference signal;

wherein said generating voltage drive control signal comprises:

outputting said second voltage drive control signal at a frequency determined by said speed signal, the phase of said second voltage drive control signal being controlled based on said phase difference signal;

generating a torque control signal specifying the torque of said N phase motor; and controlling the amplitude of said first voltage drive control signal based on said second voltage drive control signal and said torque control signal.

27. The motor drive method described in claim 26, wherein control drives said phase difference signal to zero.

28. The motor drive method described in claim 26, further comprising:

setting the frequency of said second voltage drive control signal; and detecting a low speed period denoting startup or low speed operation of said N phase motor;

wherein said generating voltage drive control signal is generating said second voltage drive control signal based on the frequency of said second voltage drive control signal set in said low speed period.

* * * * *

UNITED STATES PATENT AND TRADEMARK OFFICE
CERTIFICATE OF CORRECTION

PATENT NO. : 7,626,350 B2 Page 1 of 1
APPLICATION NO. : 11/220006
DATED : December 1, 2009
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-first Day of December, 2010

David J. Kappos
*Director of the United States Patent and Trademark Office*